(12) United States Patent
Saunkeah et al.

(10) Patent No.: US 12,511,681 B2
(45) Date of Patent: *Dec. 30, 2025

(54) SYSTEMS AND METHODS FOR PREDICTIVE GIFT SUBSCRIPTIONS

(71) Applicant: SYNCHRONY BANK, Stamford, CT (US)

(72) Inventors: Gabriel Saunkeah, Stamford, CT (US); Paul Simpson, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 192 days.

This patent is subject to a terminal disclaimer.

(21) Appl. No.: 18/166,522

(22) Filed: Feb. 9, 2023

(65) Prior Publication Data
US 2023/0325902 A1    Oct. 12, 2023

Related U.S. Application Data

(63) Continuation of application No. 17/746,098, filed on May 17, 2022, now Pat. No. 11,615,456.

(60) Provisional application No. 63/190,137, filed on May 18, 2021.

(51) Int. Cl.
*G06Q 30/00* (2023.01)
*G06Q 30/0601* (2023.01)

(52) U.S. Cl.
CPC ... *G06Q 30/0631* (2013.01); *G06Q 30/06315* (2025.08); *G06Q 30/06331* (2025.08)

(58) Field of Classification Search
CPC .............. G06Q 30/00; G06Q 30/0601; G06Q 30/0605; G06Q 30/0207
See application file for complete search history.

(56) References Cited

U.S. PATENT DOCUMENTS

| | | | |
|---|---|---|---|
| 6,542,874 B1* | 4/2003 | Walker | G06Q 30/0635 |
| | | | 705/16 |
| 9,760,936 B1* | 9/2017 | Shaw | G06Q 30/0633 |
| 2001/0039519 A1* | 11/2001 | Richards | G06Q 30/0206 |
| | | | 705/26.7 |

(Continued)

OTHER PUBLICATIONS

Veale, Kylie. "Internet gift economies: Voluntary payment schemes as tangible reciprocity." First Monday (2003). (Year: 2003).*

(Continued)

*Primary Examiner* — Christopher B Seibert
(74) *Attorney, Agent, or Firm* — Polsinelli LLP

(57) ABSTRACT

Systems and methods for predictive gift subscriptions are provided. A gift subscription service may store a gift subscription and a profile associated with a gift recipient. The gift subscription service may then identify a time to send a gift to the gift recipient and associate a computational model with the gift recipient and the profile. When the gift subscription service determines a change in the profile, the gift subscription service may then update the computational model associated with the gift recipient in real-time by applying a machine learning algorithm to the change in the profile and use the updated computation model to formulate a prediction for the gift recipient that may then be used to identify a set of gifts to present to the gift recipient. The gift subscription service may then present the set of gifts to the gift recipient.

21 Claims, 18 Drawing Sheets

(56) References Cited

U.S. PATENT DOCUMENTS

| | | | | |
|---|---|---|---|---|
| 2002/0042775 A1* | 4/2002 | Nelson | G06Q 10/02 | 705/5 |
| 2004/0002918 A1* | 1/2004 | McCarthy | G06Q 20/04 | 705/40 |
| 2004/0225605 A1* | 11/2004 | Rowe | G07F 17/3281 | 705/39 |
| 2007/0175984 A1* | 8/2007 | Khandaker | G07F 7/10 | 705/41 |
| 2007/0214080 A1* | 9/2007 | Babi | G06Q 20/108 | 705/42 |
| 2008/0040240 A1* | 2/2008 | Covington | G06Q 30/0633 | 705/26.8 |
| 2008/0243637 A1* | 10/2008 | Chan | G06Q 30/02 | 705/26.1 |
| 2010/0299194 A1* | 11/2010 | Snyder | G06Q 30/0211 | 705/14.23 |
| 2011/0029370 A1* | 2/2011 | Roeding | H04L 67/52 | 705/14.38 |
| 2011/0311164 A1* | 12/2011 | Badharudeen | G06Q 20/3278 | 235/383 |
| 2012/0010936 A1* | 1/2012 | Satyavolu | G06Q 40/02 | 705/14.25 |
| 2012/0150643 A1* | 6/2012 | Wolfe | G06Q 20/34 | 705/41 |
| 2012/0150728 A1* | 6/2012 | Isaacson | G06Q 30/0226 | 705/39 |
| 2012/0226614 A1* | 9/2012 | Gura | G06Q 30/0605 | 705/44 |
| 2013/0030945 A1* | 1/2013 | Polt | G06Q 30/06 | 705/26.81 |
| 2013/0073369 A1* | 3/2013 | Begum | G06Q 30/0208 | 705/26.1 |
| 2013/0096997 A1* | 4/2013 | Benedikt | G06Q 30/0605 | 705/26.8 |
| 2013/0132294 A1* | 5/2013 | Schvey | G06Q 30/0207 | 705/319 |
| 2013/0166445 A1* | 6/2013 | Isaacson | G06Q 20/10 | 705/41 |
| 2013/0179268 A1* | 7/2013 | Hu | G06Q 30/0207 | 705/14.66 |
| 2013/0211890 A1* | 8/2013 | Heitmueller | G06Q 30/0253 | 705/14.24 |
| 2013/0311266 A1* | 11/2013 | Vichich | G06Q 30/0207 | 705/14.27 |
| 2013/0332307 A1 | 12/2013 | Linden et al. | | |
| 2013/0332308 A1* | 12/2013 | Linden | G06Q 30/0631 | 705/26.7 |
| 2014/0019283 A1* | 1/2014 | Daley | G06Q 30/06 | 705/26.2 |
| 2014/0207610 A1 | 7/2014 | Erez et al. | | |
| 2017/0083962 A1 | 3/2017 | Agarwal | | |
| 2018/0012243 A1* | 1/2018 | Yin | G06Q 20/322 | |

OTHER PUBLICATIONS

Gupta, Aditya, Meike Eilert, and James W. Gentry. "Can I surprise myself? A conceptual framework of surprise self-gifting among consumers." Journal of Retailing and Consumer Services 54 (2020): 101712. (Year: 2020).*

International Search Report and Written Opinion mailed Sep. 21, 2022 in International Application PCT/US2022/029562.

"Here's Exactly how Stitch Fix Works From Start to Finish," Blair Lamb, Apr. 13, 2016.

Madison Durham, "31 awesome gift subscription boxes and services for every type of person," Nov. 3, 2020.

Alex Hern, "Google says machine learning is the future. So I tried it myself," Jun. 28, 2016.

Jennifer Wei, "Recommended for You: How machine learning helps you choose what to consume next," Aug. 28, 2017.

"Machine Learning: What it is and why it matters," SAS, Jan. 7, 2014.

Office Action mailed Aug. 9, 2022 in U.S. Appl. No. 17/746,098.

Notice of Allowance mailed Nov. 21, 2022 in U.S. Appl. No. 17/746,098.

* cited by examiner

FIG. 8

SYSTEMS AND METHODS FOR PREDICTIVE GIFT SUBSCRIPTIONS

CROSS-REFERENCE TO RELATED APPLICATIONS

The present patent application is a continuation of U.S. patent application Ser. No. 17/746,098 filed May 17, 2022, which claims the priority benefit of U.S. Provisional Patent Application 63/190,137 filed May 18, 2021, the disclosures of which are incorporated herein by reference in their entireties.

FIELD

The present disclosure relates generally to determination of gifts associated with a gift subscription. In one example, the systems and methods described herein may be used to predict gifts for a recipient of a gift subscription and iteratively improve the prediction based on the actions of the gift recipient with respect to the predictive gift subscription. Further, the systems and methods described herein may be used to automate the fulfillment of the predictive gift subscription while minimizing the active solicitation of information from the gift recipient or the gift giver.

SUMMARY

Disclosed embodiments may provide a framework to predict a set of gifts for a recipient of a gift subscription and to iteratively improve the prediction based on the actions of the gift recipient with respect to the predictive gift subscription. Further, the framework is provided to automate the fulfillment of the predictive gift subscription. According to some embodiments, a computer-implemented method is provided. The computer-implemented method comprises storing information regarding a gift subscription for a gift recipient and a profile associated with the gift recipient. The gift subscription includes a plurality of gifts to be sent over a period of time. The computer-implemented method further comprises identifying a time to send a gift to the gift recipient. The computer-implemented method further comprises associating a computational model with the gift recipient and the profile. The computer-implemented method further comprises dynamically determining a change in the profile. The computer-implemented method further comprises updating the computational model associated with the gift recipient in real-time based on the change in the profile. The computational model is updated in real-time by applying a machine learning algorithm to the change in the profile. The computer-implemented method further comprises formulating a prediction using the updated computational model. The computer-implemented method further comprises identifying a set of gifts to present to the gift recipient. The set of gifts are identified using the prediction. The computer-implemented method further comprises presenting the set of gifts.

In some embodiments, the computer-implemented method further comprises determining a current age associated with the gift recipient. The computer-implemented method further comprises updating the profile using the current age. The computer-implemented method further comprises updating the computational model in real-time based on the current age. The computational model is updated in real-time by applying the machine learning algorithm to the updated profile.

In some embodiments, the computer-implemented method further comprises determining one or more current demographics associated with the gift recipient. The computer-implemented method further comprises updating the profile using the one or more current demographics. The computer-implemented method further comprises updating the computational model in real-time based on the one or more current demographics. The computational model is updated in real-time by applying the machine learning algorithm to the updated profile.

In some embodiments, the computer-implemented method further comprises receiving a gift selection associated with the gift recipient. The computer-implemented method further comprises initiating a gift action based on the gift selection.

In some embodiments, the computer-implemented method further comprises receiving a gift selection associated with the gift recipient. The computer-implemented method further comprises updating the profile using the gift selection. The computer-implemented method further comprises updating the computational model in real-time based on the gift selection. The computational model is updated in real-time by applying the machine learning algorithm to the updated profile.

In some embodiments, the computer-implemented method further comprises identifying a future time to send a future gift to the gift recipient. The future time is identified using the prediction. The computer-implemented method further comprises identifying a future set of gifts to present to the gift recipient at the future time. The future set of gifts is identified using the prediction. The computer-implemented method further comprises presenting the future set of gifts at the future time.

In some embodiments, the computer-implemented method further comprises receiving a future gift selection from a future set of gifts. The future set of gifts are identified based on the prediction. Further, the future set of gifts are presented at a future time identified based on the prediction. The computer-implemented method further comprises updating the profile using the future gift selection. The computer-implemented method further comprises updating the computational model in real-time based on the future gift selection. The computational model is updated in real-time by applying the machine learning algorithm to the updated profile.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

FIG. 8 shows an illustrative example of an environment in which predictive gift subscription options based on recipient demographics are chosen in accordance with at least one embodiment;

Figure 1:
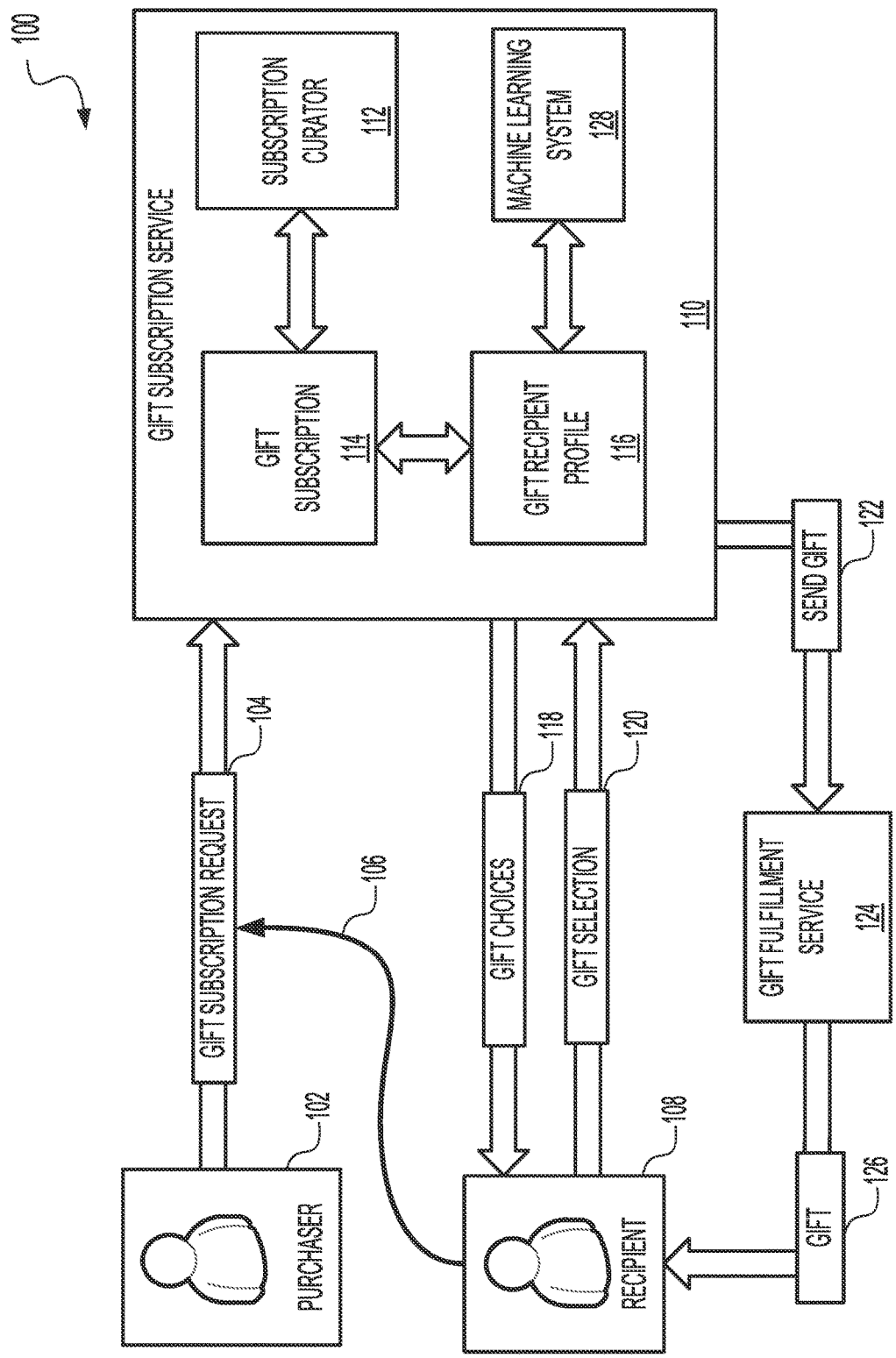
FIG. 1 shows an illustrative example of an environment in which a predictive gift subscription is implemented in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

Additionally, in the appended figures, similar components and/or features may refer back to an earlier described component. For example, a component and/or feature may be described as " . . . the gift subscription service 202 (which is the same as the gift subscription service 110 described herein at least in connection with FIG. 1) . . . ." Such references are bi-directional in that, a later reference back such as " . . . the gift subscription service 1608 (which is the same as the gift subscription service 110 described herein at least in connection with FIG. 1) . . . " is indicative that components and/or features described with respect to gift subscription service 110 and with respect to the gift subscription service 202 are both incorporated into the components and/or features of the gift subscription service 1608 and vice versa.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Gift subscription models are targeted to consumers subscribing for themselves and this targeting tends to break down when the purchaser is not the recipient. Selecting gifts or gift choices for a subscription is typically done based on personal knowledge gathered from intake questions, which can often be incorrect or outdated when provided by the purchaser on behalf of the recipient. The ability to effectively predict and provide gifts or gift choices can have an overall negative effect on the customer experience in cases where the recipient is not the purchaser. For example, receiving gift choices that are unwanted or unrelated to the needs or preferences of a gift recipient can cause the recipient to not use, not like, or ignore the gift choices, thereby reducing the effect of the gift.

Disclosed embodiments may provide a framework to generate a predictive model for gift subscriptions where the gift recipient is not the gift purchaser and to update this predictive model through interaction with a gift subscription while minimizing and/or eliminating knowledge gathering using intake questions and minimizing and/or eliminating other active solicitation of information from the gift recipient or the gift giver. Through this framework, a predictive model of the gift recipient may be generated, the predictive model of the gift recipient may be updated based on gift recommendations, gift selections, known or predicted demographics of the gift recipient, seasonal and/or other events, elapsed time intervals, and other such factors, and the predictive model may be used to generate gift recommendations for the gift recipient. As the gift predictions are generated over time, the predictive model can be updated in real-time as gift recommendations are presented and corresponding gift selections are made to further tailor the gift recommendations to the gift recipient. Such prediction while minimizing and/or eliminating the active solicitation of information from the gift recipient or the gift giver reduces the burden of both the gift giver and the gift recipient during the course of a predictive gift subscription.

FIG. 1 shows an illustrative example of an environment 100 in which a predictive gift subscription is implemented in accordance with at least one embodiment. In the example environment 100 illustrated in FIG. 1, a purchaser 102 (also referred to herein as a "gift purchaser" or a "gift subscription purchaser") submits a gift subscription request 104 to a gift subscription service 110. As used herein, the gift subscription request is a request for a predictive gift subscription in that the gift subscription request allows the subscription service 110 to predict gift choices for a recipient 108 based on a model of the profile of the recipient 108. The gift subscription service 110 may be implemented to allow a purchaser 102 to purchase a recurring gift subscription while reducing the overall interactive element of purchasing such gifts. For example, a gift subscription service 110 may be implemented to allow a purchaser 102 to purchase a recurring gift where gifts are provided to a gift recipient such as the recipient 108 (also referred to herein as a "gift recipient" or a "gift subscription recipient") on a recurring basis. In such an embodiment, the predictive gift subscription dynamically updates the model of the profile of the recipient 108 as gift selections are made to validate or repudiate predictions over the course of the predictive gift subscription. In an embodiment, the model of the profile of the recipient 108 can be edited directly by the gift purchaser and/or by the gift recipient. In another example, a gift subscription service 110 may be implemented to allow a purchaser 102 to purchase a recurring gift for their self, where gifts are provided to the purchaser 102 on a recurring basis. In another example, a gift subscription service 110 may be implemented to allow a purchaser 102 to purchase a recurring gift for a plurality of recipients, where gifts are provided to the recipients on a recurring basis. As used herein and unless otherwise made clear explicitly or by context, a "predictive gift subscription" may be referred to simply as a "gift subscription."

In an embodiment, a gift subscription service 110 can provide a framework to identify gift categories, curate predictive gift subscriptions, present gift alternatives (e.g., alternate gifts, gift cards, cryptocurrencies in an amount equivalent to the value of a gift, etc.), coordinate gift fulfilment, present gift rewards, dynamically update predictive gift subscriptions, generate single gifts (e.g., for special occasions), coordinate responses to gifts (e.g., thank you notes and gifts in response), and provide other services related to gifts, predictive gift subscriptions, and/or gift fulfilment.

In an embodiment, a gift subscription service 110 can provide systems and methods such as those described herein to generate a predictive model for gift subscriptions where the recipient 108 is not the purchaser 102. In an embodiment, a gift subscription service 110 can provide systems and methods such as those described herein to update a predictive model through interaction with a predictive gift subscription. In an embodiment, a gift subscription service 110 can provide systems and methods such as those described herein to reduce or eliminate a knowledge gathering step of the gift subscription process by, for example, reducing and/or eliminating intake questions to the purchaser 102. In an embodiment, a gift subscription service 110 can provide systems and methods such as those described herein to reduce or eliminate a knowledge gathering step of the gift subscription process by, for example, reducing and/or eliminating other active solicitation of information from the recipient 108 or the purchaser 102. In an embodiment, a gift subscription service 110 can provide systems and methods such as those described herein to generate a predictive model of the recipient 108. In an embodiment, a gift subscription service 110 can provide systems and methods such as those described herein to update a predictive model of the gift recipient based on gift recommendations, gift selections, regifting of any of the gifts associated with the gift selections to other recipients, known or predicted demographics of the recipient 108, seasonal and/or other events, elapsed time intervals, and other such factors. In an embodiment, a gift subscription service 110 can provide systems and methods such as those described herein to use a predictive model to generate gift recommendations for the recipient 108. In such an embodiment, as the gift predictions are generated, the predictive model can be updated in real-time to further tailor the gift recommendations to the recipient 108. Such further tailoring of the gift recommendations while continuing to reduce and/or eliminate the active solicitation of information from the recipient 108 or the purchaser 102 may reduce the burden of both the purchaser 102 and the recipient 108 during the course of a predictive gift subscription.

Figure 18:
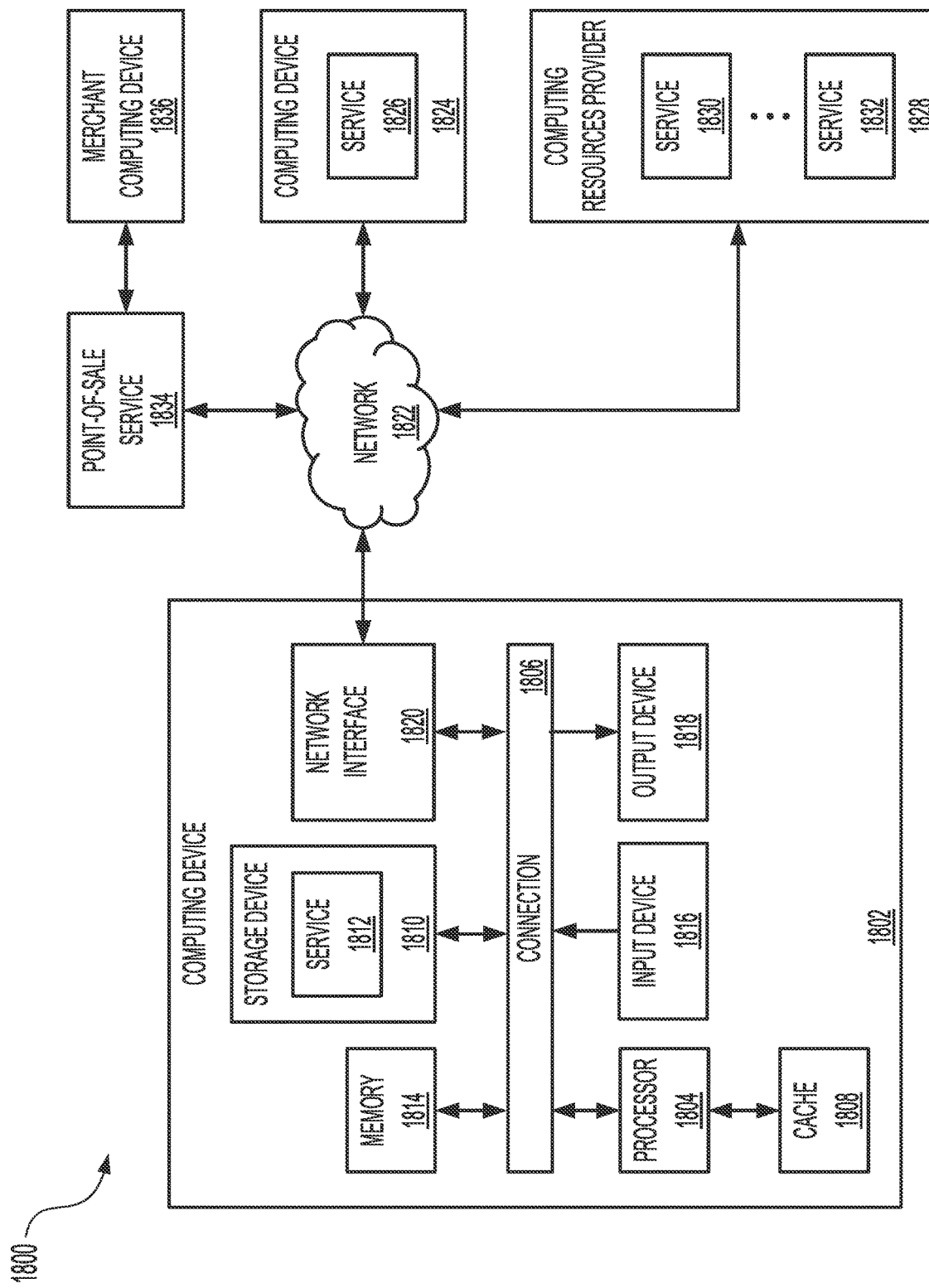
FIG. 18 shows a computing system architecture including various components in electrical communication with each other in accordance with various embodiments.

In an embodiment, a gift purchaser 102 submits a gift subscription request 104 to the gift subscription service 110 using a computing device (not shown) such as the computing device 1802 described herein at least in connection with FIG. 18 and over a network (not shown) such as the network 1822 described herein at least in connection with FIG. 18. The computing device may be, for example, a laptop computer, a desktop computer, a smartphone, a tablet, a smart watch, or some other such computing device such as those described herein. In an embodiment, the gift purchaser 102 submits the gift subscription request 104 to the gift subscription service 110 using an application provided by the gift subscription service 110 and installed onto the computing device. In an embodiment, the gift purchaser 102 submits the gift subscription request 104 to the gift subscription service 110 using a web service maintained by the gift subscription service 110. In an embodiment, the gift purchaser 102 submits the gift subscription request 104 to the gift subscription service 110 using a web service maintained on behalf of the gift subscription service 110 by a third party service (e.g., a service such as the service 1830 or the service 1832 maintained by a computing resources provider 1828 described herein at least in connection with FIG. 18). In an embodiment, the gift purchaser 102 submits the gift subscription request 104 to the gift subscription service 110 using a kiosk or other point-of-sale service provided by and/or on behalf of the gift subscription service 110 (e.g., a point-of-sale service such as the point-of-sale service 1834 described herein at least in connection with FIG. 18). In such an embodiment, the kiosk or other point-of-sale service may be located at a merchant's location (e.g., at a "brick-and-mortar" store), at a central location (e.g., at a high traffic public venue), or at some other such location. In an embodiment, the point-of-sale service can be located in a mobile location (e.g., in a vehicle and/or some other mobile location). For example, a point-of-sale service can be located in the passenger area of a taxi, or in the back of the seat in a ride share, or on a bus, or on an airplane. In some embodiments, the application, web service, or point-of-sale service provided by the gift subscription service 110 is contextual and can be dynamically updated for different content based on one or more factors such as those described herein (e.g., location of the gift purchaser 102, demographics of the gift purchaser 102 and/or the gift recipient 108, or other such factors).

In an embodiment, the gift purchaser 102 is a person. In another embodiment, the gift purchaser interacts with an automated process (also referred to herein as a "bot"). In such an embodiment, the bot may be configured to engage and interact with the gift recipient 108, and may also be configured to engage and interact with the gift subscription service 110 on behalf of the gift recipient 108. For example, the gift subscription service 110 may utilize information about the gift recipient 108 as input to a machine learning algorithm or artificial intelligence to generate a gift profile 116 (described in more detail below) for the gift recipient 108. The bot may also be configured to autonomously interact with the gift recipient 108 to generate gift recommendations, receive gift selections, coordinate gift fulfilment, and perform other tasks related to the gift subscription service 110 such as those described herein. The bot may be configured according to the parameters or characteristics of the gift recipient 108 as defined in the gift profile 116. As the bot communicates with the gift recipient 108 over time, the bot may be updated to improve the bot's interaction with the gift recipient 108. In an embodiment, the automated process (or "bot") described herein is an "assistant" to the gift purchaser 102 that is configured to autonomously interact with the gift recipient 108 to generate gift recommendations, receive gift selections, coordinate gift fulfilment, and perform other tasks related to the gift subscription service 110 such as those described herein.

When a gift purchaser 102 submits a gift subscription request 104 to a gift subscription service 110, the gift subscription request 104 may be a request to present gifts and/or gift choices for a gift recipient 108. In the example environment 100 illustrated in FIG. 1, the gift purchaser 102 and the gift recipient 108 are different entities. In an embodiment, the gift recipient 108 is the same entity as the gift purchaser 102. In such an embodiment, the gift purchaser may be submitting a gift subscription request 104 to receive a curated gift subscription for their self. In an embodiment, the gift recipient 108 is a plurality of entities. In such an embodiment, the gift recipient 108 may be, for example, the nieces and nephews of the of the gift purchaser 102, or may be some other such group. In an embodiment a gift subscription request 104 for a plurality of entities is managed by the gift subscription service 110 as a single predictive gift subscription. In an embodiment, a gift subscription request 104 for a plurality of entities is managed by the gift subscription service 110 as a plurality of predictive gift subscriptions.

In an embodiment, a gift subscription request 104 is submitted to the gift subscription service 110 with little information 106 about the gift recipient 108. Such a gift subscription request 104 may state little more than the name and contact information for the gift recipient 108 (e.g., "I want to send a gift subscription to my nephew Charles Brown, this is his contact information"). In an embodiment, a gift subscription request 104 is submitted to the gift subscription service 110 with no information about the gift recipient 108 (e.g., "I want to send a gift subscription"). In such an embodiment, the gift subscription service 110 may use systems and methods to determine a minimal amount of information about the gift recipient 108 by, for example, querying the gift purchaser 102 for the name and/or contact information of the gift recipient 108. As may be contemplated, a gift subscription request 104 may be submitted to the gift subscription service 110 with considerably more information 106 about the gift recipient 108. For example, the gift subscription request 104 may state "I want to send a gift subscription to my nephew Charles Brown. He is eight years old, has a dog, likes model airplanes, and lives in Lynnwood, Washington. This is his contact information."

In some embodiments, when the gift subscription service 110 receives the gift subscription request 104, the gift subscription service 110 creates and stores a gift subscription 114 (also referred to herein as a "subscription") corresponding to the gift subscription request 104 for the predictive gift subscription. The gift subscription service 110 may store the gift subscription 114 using a storage device such as the storage device 1810 described herein at least in connection with FIG. 18. In some embodiments, when the gift subscription service 110 receives the gift subscription request 104, the gift subscription service 110 creates and stores a gift recipient profile 116 (also referred to herein as a "profile") associated with the gift recipient 108, also using a storage device such as the storage device 1810 described herein at least in connection with FIG. 18. In an embodiment, the gift subscription service 110 may associate the gift recipient profile 116 with the gift subscription 114 corresponding to the gift subscription request 104 for the predictive gift subscription.

It should be noted that, although FIG. 1 illustrates a single gift subscription 114 that is associated with a single gift recipient profile 116, a plurality of gift subscriptions may be associated with a gift recipient profile 116 (e.g., where a gift recipient 108 is a gift recipient for a plurality of gift subscriptions), or a single gift subscription 114 may be associated with a plurality of gift recipient profiles (e.g., where a gift subscription 114 has multiple recipients and/or where a gift recipient 108 has multiple profiles), or a plurality of gift subscriptions may be associated with a plurality of gift recipient profiles (e.g., where a plurality of gift subscriptions are associated with multiple recipients and/or where gift recipients have multiple profiles). In the above examples, a gift recipient 114 may have multiple profiles when, for example, the gift recipient 108 has a first profile for one time of the year (e.g., based on demographics) and a second profile for another time of the year. In an embodiment, the multiple profiles of the gift recipient 108 are stored as a single gift recipient profile 116. In another embodiment, the multiple profiles of the gift recipient 108 are stored as multiple profiles.

In an embodiment, the multiple profiles of a gift recipient 114 may include shared information and may also include exclusive information. For example, common demographic information about a gift recipient 108 (e.g., name, age, location, etc.) may be shared across multiple profiles of the gift recipient 108 while some information may be contextual and not shared. For example, a "pet owner" profile for a gift recipient 108 may include information about the pet that would not be relevant to the "exercise equipment" profile of the gift recipient 108 and, conversely, the exercise clothing preferences for the gift recipient 108 may not be relevant to the "pet owner" profile. In an embodiment, multiple profiles of a gift recipient 108 with shared and exclusive information are stored as a single profile, as described above. In such an embodiment, the systems and methods described herein that are used to analyze the profile may also be configured to determine the parts of the profile to use in that analysis (e.g., to use the "exercise equipment" elements for some analyses and to use the "pet owner" elements for other analyses).

In an embodiment, the gift subscription service 110 analyzes the gift subscription 114 and/or the gift recipient profile 116 to determine whether the gift subscription service 110 has enough information to begin to fulfill the gift subscription request 104. In an embodiment, the gift subscription service 110 analyzes the gift subscription 114 and/or the gift recipient profile 116 using one or more systems and methods to determine a minimal set of information needed to begin to fulfill the gift subscription request 104.

In an illustrative example, the gift subscription service 110 may determine that the minimal amount of information needed to begin to fulfill the gift subscription request 104 is only the contact information for the gift recipient 108. From this minimal set of information, the gift subscription service 110 may begin generating gift choices 118 to send to the gift recipient 108 and then use responses to those gift choices 118 to update and refine the gift recipient profile 116.

In another example, the gift subscription service 110 may determine that the minimal amount of information needed to begin to fulfill the gift subscription request 104 is more than just the contact information for the gift recipient 108 and thus the gift subscription service 110 may request other demographic information about the gift recipient 108 (e.g., age, location, interests, etc.). The gift subscription service 110 may request information from the gift purchaser 102 and/or or the gift recipient 108 to obtain this demographic information. From this minimal set of information, the gift subscription service 110 may then begin generating gift choices 118 to send to the gift recipient 108. In an embodiment, the gift subscription service 110 obtains additional demographic information about the gift recipient 108 using context such as, for example, exchanges with the gift purchaser 102 regarding the gift recipient 108. As described above, the profile of the recipient 108 may be edited directly to, for example, provide the other demographic information about the gift recipient 108 (i.e., by the gift purchaser 102 and/or by the gift recipient 108).

In an embodiment, the gift subscription service 110 uses one or more machine learning algorithms and/or artificial intelligence techniques (illustrated in FIG. 1 as the "machine learning system 128) to analyze the gift subscription 114 and/or the gift recipient profile 116 so as to determine whether the gift subscription service has enough information to fulfill the gift subscription request 104. For instance, the gift subscription service 110 may use the machine learning system 128 to implement and dynamically train a clustering algorithm to identify similar profiles and subscriptions based on one or more vectors (e.g., age, geographic location, other demographic information, etc.). In some embodiments, the machine learning system 128 can perform such clustering and obtain partial matches among other profiles and subscriptions using these vectors. In some instances, a dataset of profile and/or subscription characteristics corresponding to other gift subscription requests may be analyzed using a clustering algorithm to identify different types of profiles and/or subscriptions associated with the gift subscription service 110.

Example clustering algorithms that may trained using sample profile and/or subscription datasets to analyze the gift subscription 114 and/or the gift recipient profile 116 so as to determine whether the gift subscription service 110 has enough information to begin to fulfill the gift subscription request 104 may include a k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning algorithm, the gift subscription service 110 may determine that enough information is present in the gift subscription 114 and/or the gift recipient profile 116 to begin to fulfill the gift subscription request 104. Conversely, the gift subscription service 110 may determine that not enough information is present in the gift subscription 114 and/or the gift recipient profile 116 to begin to fulfill the gift subscription request 104 and, accordingly, the gift subscription service 110 may prompt the gift recipient 108 to provide additional information so that the gift subscription service 110 may begin to fulfill the gift subscription request 104.

In an embodiment, if the gift subscription service 110 prompts the gift recipient 108 to provide additional information to fulfill the gift subscription request 104, the gift subscription service 110 can update the gift recipient profile 116 to incorporate any additional information provided by the gift recipient 108. As the additional information is obtained, the clustering algorithm may be retrained in real-time according to the updated gift recipient profile 116 such that the machine learning system 128 may perform re-clustering of the profiles (including the updated gift recipient profile 116) and corresponding subscriptions in real-time based on the one or more vectors. Thus, as new gift recipient profiles 116 are generated and updated in real-time, the machine learning system 128 may continuously train the clustering algorithm to more accurately cluster the set of profiles maintained by the gift subscription service 110.

When the gift subscription service 110 determines that there is enough information to begin to fulfill the gift subscription request 104, the gift subscription service 110 may then begin to fulfill the gift subscription request 104. In an embodiment, the gift subscription service 110 first makes a determination about when to send a set of gift choices 118 to the gift recipient 108. The determination may be stated in the gift subscription request (e.g., "send a monthly gift for a year") or may be determined by the gift subscription service 110 using one or more factors associated with the gift subscription 114 and/or the gift recipient profile 116. As an example, the gift subscription may be for a newborn infant and may be for the first year of the infant's life. Such a gift subscription might include a gift at birth, appropriate to a newborn, a gift at the 3-month point of new clothes, a gift at the 6-month point of an age-appropriate developmental toy, a gift at the 9-month point of more new clothes sized for a 9-month old, and finally a gift at the 1-year mark. With such a gift subscription, the gift subscription service 110 may use the birth date of the gift recipient and the aforementioned gift intervals to make the determination about when to send a set of gift choices 118 to the gift recipient 108.

In an embodiment, the gift subscription service 110 makes a determination about when to send a set of gift choices 118 to the gift recipient 108 using one or more machine learning algorithms and/or artificial intelligence techniques of the machine learning system 128 (such as those described herein) to analyze the gift subscription 114 and/or the gift recipient profile 116. For example, the gift subscription service 110 may use the machine learning system 128 to implement an algorithm (e.g., a clustering algorithm) to identify similar profiles and subscriptions based on one or more vectors (e.g., age, geographic location, other demographic information, etc.) and may use that analysis to determine when to send the set of gift choices 118 to the gift recipient 108. In some embodiments, the machine learning system 128 can perform such clustering and obtain partial matches among other profiles and subscriptions using these vectors. In some instances, a dataset of profile and/or subscription characteristics corresponding to other gift subscription requests may be analyzed using a clustering algorithm to identify different types of profiles and/or subscriptions associated with the gift subscription service 110. In such instances, the analysis may be used to determine when to send the set of gift choices 118 to the gift recipient 108.

When the gift subscription service 110 has determined when to send the set of gift choices 118 to the gift recipient 108, the gift subscription service 110 may then determine which gifts to include in the set of gift choices 118 that will be presented to the gift recipient 108 at the determined time. In an embodiment, the gift subscription service 110 determines which gifts to include in the set of gift choices 118 that will be presented to the gift recipient 108 at or near the same time that the gift subscription service 110 determines when to send the set of gift choices 118 to the gift recipient 108. In an embodiment, the gift subscription service 110 determines which gifts to include in the set of gift choices 118 that will be presented to the gift recipient 108 at or near the time that the set of gift choices 118 will be sent to the gift recipient 108. In an embodiment, the gift subscription service 110 determines which gifts to include in the set of gift choices 118 that will be presented to the gift recipient 108 in between the time that the gift subscription service 110 determines when to send the set of gift choices 118 to the gift recipient 108 and the time that the set of gift choices 118 will be sent to the gift recipient 108.

In an embodiment, the determination of which gifts to include in the set of gift choices 118 that will be presented to the gift recipient 108 is based on a variety of factors including, but not limited to, the gift subscription 114, the gift recipient profile 116, the determined time that the set of gift choices 118 will be presented to the gift recipient 108, and other such factors. In an embodiment, the gift subscription service 110 makes a determination about which gifts to include in the set of gift choices 118 that will be presented to the gift recipient 108 using one or more machine learning algorithms and/or artificial intelligence techniques of the machine learning system 128 (such as those described herein) to analyze the gift subscription 114, the gift recipient profile 116, the determined time that the set of gift choices 118 will be presented to the gift recipient 108, and/or other such factors. For example, the gift subscription service 110 may use the machine learning system 128 to implement an algorithm (e.g., a clustering algorithm) to identify similar profiles, subscriptions, determined times, and/or other factors based on one or more vectors and may use that analysis to determine which gifts to include in the set of gift choices 118 that will be presented to the gift recipient 108. In some embodiments, the machine learning system 128 can perform such clustering and obtain partial matches among other profiles, subscriptions, determined times, and/or other factors using these vectors. In some instances, a dataset of characteristics corresponding to other gift subscription requests may be analyzed using a clustering algorithm to identify different types of profiles, subscriptions, determined times, etc. associated with the gift subscription service 110. In such instances, the analysis may be used to determine which gifts to include in the set of gift choices 118 that will be presented to the gift recipient 108.

In an embodiment, the one or more machine learning algorithms and/or artificial intelligence techniques may be dynamically trained using supervised training techniques. For example, a machine learning algorithm or artificial intelligence may be trained using a dataset of sample gift subscriptions, gift recipient profiles, presented gift choices, and gift selections. As an illustrative example, an evaluator of the machine learning algorithm or artificial intelligence (e.g., an administrator of the gift subscription service 110, independent parties introduced to perform such evaluations, etc.) may review the gift selections pertaining to the presented gift choices and corresponding to a particular gift subscription and gift recipient profile to determine whether the gift choices presented to a gift recipient should or should not have been presented. In some instances, an evaluator may act as a gift recipient that may interact with the gift subscription service 110 in different ways to determine whether the machine learning algorithm or artificial intelligence is accurately providing (or not providing) particular gift choices. Based on this feedback, the machine learning algorithm or artificial intelligence may be re-trained to more accurately determine what gift choices may be presented to gift recipients based on their gift recipient profiles, gift subscriptions, and time in which the choices are to be provided.

As described above, in an embodiment, a gift recipient profile 116 can be edited directly by the gift purchaser 102 and/or by the gift recipient 108. For example, the purchaser and/or the recipient may edit information about the age or birthdate of the recipient 108. In an embodiment, the gift purchaser 102 and/or the gift recipient 108 can create the gift recipient profile 116 "from scratch" using, for example, an application provided by the gift subscription service 110. In such an embodiment, the machine learning system 128 may use the edited or created gift recipient profile 116 to determine which gifts to include in the set of gift choices 118 presented to the gift recipient 108 (i.e., as described above). In an embodiment, the act of editing and/or creating a profile (e.g., the gift recipient profile 116) can be included in the profile and analyzed by the machine learning system 128 so that, for example, if several gift recipients with similar profiles (as determined using techniques described herein) perform the same edit action on their profiles, the machine learning system 128 may present an option to perform that edit action to other gift recipients with similar profiles. In some embodiments, the machine learning system 128 can perform that edit action and dynamically update the profile using techniques such as those described herein.

In an embodiment, a subscription curator 112 associated with the gift subscription service 110 makes one or more adjustments to a gift subscription 114 either before or after the gift subscription 114 is created. In an embodiment, a subscription curator 112 is associated with the gift subscription when, for example, the subscription curator 112 has a reputation for selecting well-received gift choices. For example, a famous children's designer may curate a gift subscription of children's clothing. In such an example, a gift subscription request 104 may be "I want a gift subscription curated by F. Amos Designer for my nephew Charles and here is his contact information." The gifts of the gift choices 118 presented to the gift recipient 108 may then be selected (in whole or in part) by the subscription curator 112 (e.g., by F. Amos Designer). In another embodiment, the subscription curator 112 is secondary to the process in that the gift subscription curator 112 may make adjustments to the gift subscription 114 but the final selection of the gifts in the set of gift choices 118 presented to the gift recipient 108 is selected by the gift subscription service 110. For example, the subscription curator 112 may provide a large list of possible gift choices and the gift subscription service 110 may then select gifts from that large list of possible gift choices for the set of gift choices 118 presented to the gift recipient 108 (e.g., using the systems and methods described herein).

In an embodiment, when a gift purchaser 102 selects a gift subscription based around a subscription curator 112, that subscription selection is included in the profile of the gift recipient 108. For example, a gift subscription request 104 for "a gift subscription curated by F. Amos Designer for my nephew Charles" provides information about the gift recipient 108 that is provided indirectly by the gift purchaser 102. The machine learning system 128 may use this information to determine which gifts to include in the set of gift choices 118 presented to the gift recipient 108 (e.g., in addition to selections made by F. Amos Designer) and the machine learning system 128 may also use this information to determine which gifts to include in the set of gift choices 118 presented to gift recipients with similar profiles.

Although not illustrated herein, in an embodiment, the gift subscription service 110 uses information provided by the gift purchaser 102 to generate a profile of the gift purchaser 102 that may be used in other interactions between the purchaser 102 and the gift subscription service 110. For example, if the gift purchaser 102 selects gift subscriptions for several friends with similar profile information (e.g., for a plurality of people with similar demographic information) and the gift purchaser 102 always selects a particular type of subscription and/or always selects a particular subscription curator 112, the gift subscription service 110 may build a profile of the purchaser 102, may use the systems and methods described herein to use that profile information along with the profile information of other gift purchasers to provide subscription suggestions and/or options to the gift purchaser 102 on subsequent interactions. For example, a gift purchaser 102 that selects "a gift subscription curated by F. Amos Designer" for multiple relatives of a certain age may receive a suggestion to use that curated subscription on subsequent subscription purchases for any other entity of that certain age.

In an embodiment, the gift subscription service 110 uses other information provided by the gift purchaser 102 to generate and/or update the profile of the gift purchaser 102 so that the profile may be used in other interactions between the purchaser 102 and the gift subscription service 110. For example, as described above, the gift subscription service 110 may use the profile to generate and/or update a predictive model of the gift recipient 108 based on gift recommendations, gift selections, known or predicted demographics of the gift recipient, seasonal and/or other events, elapsed time intervals, and/or other such factors. That updated predictive model may then be used by the machine learning system 128 to determine which gifts to include in the set of gift choices 118 presented to the gift recipient 108. The machine learning system 128 may also use this information to determine which gifts to include in the set of gift choices 118 presented to other gift recipients with similar profiles. For example, seasonal gift selections made by the gift purchaser 102 for a recipient 108 may cause the gift subscription service 110 and/or the machine learning system 128 to prefer seasonal gifts in the set of gift choices 118 presented to the gift recipient 108 and/or to other gift recipients with similar profiles.

In the embodiment where the gift subscription service 110 uses information provided by the gift purchaser 102 to generate a profile of the gift purchaser 102, this other information (e.g., information about gift recommendations, gift selections, known or predicted demographics of the gift recipient, seasonal and/or other events, elapsed time intervals, and/or other such factors) may also be used to update the profile of the gift purchaser 102. For example, if the gift purchaser 102 selects several gift subscriptions with seasonal gifts, the gift subscription service 110 may build a profile of the purchaser 102 based on those selections and may use the systems and methods described herein to use that profile information along with the profile information of other gift purchasers to provide seasonal gift subscription suggestions and/or options to the gift purchaser 102 on subsequent interactions. For example, seasonal gifts chosen to include in the set of gift choices 118 presented to the gift recipient 108 may cause the gift subscription service 110 and/or the machine learning system 128 to prefer seasonal gifts in the set of gift choices 118 presented to other gift recipients associated with the gift purchaser 102.

In an embodiment, the subscription curator 112 is an automated process or "bot." The bot (also referred to herein as a "subscription curator bot") may be configured to automatically adjust the gift subscription 114 using techniques such as those described herein. For example, as described herein, the gift subscription service 110 may utilize information about the gift recipient 108 as input to a machine learning algorithm or artificial intelligence to generate the gift profile 116 and also to configure the subscription curator bot that may update the gift subscription 114. The subscription curator bot may also be configured to autonomously interact with the gift recipient 108 to update the gift subscription 114. The subscription curator bot may also be configured to generate gift recommendations, receive gift selections, coordinate gift fulfilment, and perform other tasks related to the gift subscription service 110 including, but not limited to, those tasks performed by the subscription curator 112. The subscription curator bot may be configured according to the parameters or characteristics of the gift recipient 108 as defined in the gift profile 116. As the subscription curator bot operates over time, the subscription curator bot may be updated to improve the bot's interaction with the gift recipient 108 and/or the gift subscription profile 116. In an embodiment, the subscription curator bot uses information and analysis performed by the gift subscription service 110 and/or the machine learning system 128 to dynamically update its own analyses and performance characteristics.

In an embodiment, the gift recipient 108 receives the set of gift choices 118 from the gift subscription service 110 using a computing device (not shown) such as the computing device 1802 described herein at least in connection with FIG. 18 and over a network (not shown) such as the network 1822 also described herein at least in connection with FIG. 18. The computing device may be, for example, a laptop computer, a desktop computer, a smartphone, a tablet, a smart watch, or some other such computing device such as those described herein. In an embodiment, the gift recipient 108 receives the set of gift choices 118 from the gift subscription service 110 using an application provided by the gift subscription service 110 and installed onto the computing device. In an embodiment, the gift recipient 108 receives the set of gift choices 118 from the gift subscription service 110 using a web service maintained by the gift subscription service 110. In an embodiment, the gift recipient 108 receives the set of gift choices 118 from the gift subscription service 110 using a web service maintained on behalf of the gift subscription service 110 by a third party service (e.g., services such as the service 1830 or the service 1832 maintained by a computing resources provider 1828 described herein at least in connection with FIG. 18). In an embodiment, the gift recipient 108 receives the set of gift choices 118 from the gift subscription service 110 using a kiosk or other point-of-sale service provided by and/or on behalf of the gift subscription service 110 (e.g., a point-of-sale service such as the point-of-sale service 1834 described herein at least in connection with FIG. 18). In such an embodiment, the kiosk or other point-of-sale service may be located at a merchant's location (e.g., at a "brick-and-mortar" store), at a central location (e.g., at a high traffic public venue), or at some other such location. In some embodiments, the application, web service, or point-of-sale service provided by the gift subscription service 110 is contextual and can be dynamically updated for different content based on one or more factors such as those described herein (e.g., location of the gift recipient 108, demographics of the gift recipient 108, or other such factors).

In an embodiment, when the gift recipient 108 receives the set of gift choices 118, the gift recipient will then make a gift selection 120. In an embodiment, the gift recipient 108 makes the gift selection 120 by choosing one of the gifts from the set of gift choices 118 (e.g., if the set of gift choices includes a red t-shirt, a yellow t-shirt, and a blue t-shirt, the gift recipient 108 may select the red t-shirt). In an embodiment, the gift recipient 108 makes the gift selection 120 by choosing a gift that is not one of the gifts from the set of gift choices 118 (e.g., if the set of gift choices includes a red t-shirt, a yellow t-shirt, and a blue t-shirt, the gift recipient 108 may select a green t-shirt, or a hat, or a pair of pants). In an embodiment, the gift recipient 108 makes the gift selection 120 by not choosing any gift from the set of gift choices 118 (e.g., if the set of gift choices includes a red t-shirt, a yellow t-shirt, and a blue t-shirt, the gift recipient 108 chooses to not accept any of the gift selections). In an embodiment, the gift recipient 108 makes the gift selection 120 by not choosing any gift from the set of gift choices 118 and instead elects to choose an alternative form of the gift (e.g., a gift card, credit, cryptocurrency, future value, regifting of any of the provided gift choices to another entity, etc.). In choosing to select a "future value," the gift recipient may apply the value of the current gift selections (e.g., the t-shirts) to gifts of the next interval, thereby increasing the value of next interval's gift and, correspondingly, increasing the range of available gifts available for that interval.

When the gift recipient 108 makes a gift selection 120 and communicates that gift selection to the gift subscription service 110 using a computing device and over a network such as those described herein (e.g., using a computing device such as the computing device 1802 over a network such as the network 1822 as described herein at least in connection with FIG. 18), the gift subscription service may then update the gift recipient profile 116 and/or update the gift subscription 114 according to the gift selection 120. As may be contemplated, any of the possible gift selection choices described herein including, but not limited to, selecting one of the gifts from the gift choices 118, selecting a different gift, selecting no gift, opting for an alternative gift may be used by the gift subscription service 110 to update the gift recipient profile 116 and/or update the gift subscription 114. In any of these instances, the presentation of a set of choices (e.g., the gift choices 118) and a response to that set of choices (e.g., the gift selection 120) may provide information that can be added to the gift recipient profile 116 and/or the gift subscription 114. For example, when a gift recipient selects no gift, that selection may be used by the gift subscription service 110 to update the gift recipient profile 116 and/or update the gift subscription 114. In such an example, the updated profile and/or the updated subscription may allow the gift recipient to "pool" the amount and select a more valuable gift at the next gift selection iteration. Additionally, the more valuable gift from the pooling may also change the types of gifts that may be offered to the gift recipient (based on, for example, that increased value). Further details about the gift selection 120 process are provided herein below.

It should be noted that when the gift recipient 108 makes a gift selection 120 and communicates that gift selection to the gift subscription service 110 and when the gift subscription service updates the gift recipient profile 116 and/or updates the gift subscription 114 according to the gift selection 120, other factors of the gift selection 120 may be used to update the gift recipient profile 116 and/or update the gift subscription 114 in addition to those described herein. For example, selections from available goods that are only available at certain times of the year may have a different impact on the gift recipient profile 116 as compared to selections from available goods that are always available. Similarly, selections from a particular brand (e.g., due to brand loyalty) may have an impact on whether selections from that brand are preferred in the future, whether selections from other brands are not preferred in the future, and/or whether selections from related brands are preferred. In an example, a brand or collection of brands may have a definable design aesthetic and that design aesthetic may be used by the gift selection service 114 to prefer gift choices that share that design aesthetic and/or not prefer gift choices that have a different design aesthetic. As may be contemplated, such other factors of the gift selection 120 that may be used to update the gift recipient profile 116 and/or update the gift subscription 114 may be considered as within the scope of the present disclosure. As examples of other factors of the gift selection 120 that may be used to update the gift recipient profile 116 and/or update the gift subscription 114, the sizes of items chosen (e.g., clothing, shoes, sporting goods, etc.), the colors of items chosen, and/or the inventory availability of items chosen (e.g., whether the items are in stock, scarce, not available at the present time but arriving in stock soon, or not available) are all factors that the gift selection 120 may use to update the gift recipient profile 116 and/or update the gift subscription 114.

The updated gift recipient profile 116 and/or the updated gift subscription may then be used for future analysis performed by the gift subscription service 110 with respect to the gift subscription 114 using, in some embodiments, the machine learning system 128. For example, a gift selection 120 in response to the set of gift choices 118 that selects one of the gifts from the set of gift choices 118 (e.g., when the set of gift choices includes a red t-shirt, a yellow t-shirt, and a blue t-shirt, and the gift recipient 108 selects the red t-shirt) may be an indicator that the gifts in the set of gift choices 118 were appropriate choices for a gift recipient 108 having a particular set of demographics (i.e., a gift recipient profile with a particular set of characteristics). This indicator may be used by the by the gift subscription service 110 to determine future gift choices for the gift recipient 108, and may also be used by the gift subscription service 110 to determine gift choices for other gift recipients with the same or similar gift recipient profile.

As described herein, the gift subscription service 110 makes determinations about which gifts to include in the set of gift choices 118 that will be presented to the gift recipient 108 using one or more machine learning algorithms and/or artificial intelligence techniques of the machine learning system 128. When the gift subscription service 110 uses the machine learning system 128 to implement an algorithm (e.g., a clustering algorithm) to identify similar profiles, subscriptions, determined times, and/or other factors and uses that analysis to determine which gifts to include in the set of gift choices 118 that will be presented to the gift recipient 108, the gift subscription service 110 bases subsequent (or future) determinations based on the updated (i.e., post gift selection) gift recipient profile 116 and/or gift subscription. As an example of how determined times may impact the analysis used to determine which gifts to include in the set of gift choices 118 that will be presented to the gift recipient 108, some gifts may be available at some times of the year and may not be available at other times of the year. For example, winter themed gifts may be scarce or unavailable during the summer and summertime gifts may be scarce or unavailable during the winter. Accordingly, the time of the year (i.e., the determined time) may be used to determine which gifts to include in the set of gift choices 118 that will be presented to the gift recipient 108 as unavailable gifts may not be sent to the gift recipient. As described above, other factors may impact the analysis used to determine which gifts to include in the set of gift choices 118 that will be presented to the gift recipient 108 (e.g., size, color, availability, etc.).

In an embodiment, the machine learning system 128 dynamically, and in real-time, updates the machine learning algorithm or artificial intelligence used to determine what gifts are to be presented as gift choices to different gift recipients as gift selections are made by gift recipients. For example, the machine learning system 128 may automatically use a gift selection 120 made by the gift recipient 108 from the one or more gift choices 118 provided by the gift subscription service 110 to dynamically update the dataset of gift subscriptions, gift recipient profiles, presented gift choices, and gift selections used to train the machine learning algorithm or artificial intelligence. The gift recipient's gift selection 120 may serve as a form of feedback that may be used to determine whether the machine learning algorithm or artificial intelligence is presenting gift choices that may be appealing to gift recipients having similar profiles and subscriptions as the gift recipient 108. Further, because the machine learning algorithm or artificial intelligence is implemented to simultaneously, and in real-time, provide gift choices for different gift recipients and for different gift subscriptions, the machine learning algorithm or artificial intelligence may be dynamically trained in real-time using the gift selections made by these different gift recipients as these gift selections are received. This may allow for the continuous, iterative, and real-time training of the machine learning algorithm or artificial intelligence implemented to identify gift choices that may be presented to gift recipients.

In an embodiment, gifts chosen when the gift recipient 108 makes a gift selection 120 and communicates that gift selection to the gift subscription service 110 can impact how the gift subscription service 110 makes determinations about which gifts to include in the set of gift choices 118 that will be presented to the gift recipient 108. For example, a gift recipient 108 may have a year-long gift subscription for baby items. If the gift recipient 108 chooses diapers in the first two intervals, the gift subscription service 110 (e.g., the machine learning system 128) may determine that diapers should always be included in the set of gift choices 118 that will be presented to the gift recipient 108. In an embodiment, not illustrated in FIG. 1, the gift subscription service 110 (e.g., the machine learning system 128) can use the information about the repeated diaper orders to communicate with the gift recipient 108 and invite the gift recipient 108 to always add diapers to the set of gift choices 118 that will be presented to the gift recipient 108. In an embodiment, the gift subscription service 110 (e.g., the machine learning system 128) can automatically add diapers to the set of gift choices 118 that will be presented to the gift recipient 108 (i.e., without inviting the gift recipient 108 to always add diapers to the set of gift choices 118).

As described herein, in some embodiments, the machine learning system 128 can perform clustering and obtain partial matches among other profiles and/or subscriptions. In some instances, a dataset of characteristics corresponding to other gift recipient profiles and/or gift subscriptions may be analyzed using a clustering algorithm to identify different types of profiles and subscriptions associated with the gift subscription service 110 and thereby to inform future gift choice recommendations. As may be contemplated, other analysis by the gift subscription service 110 including, but not limited to, the determination of whether there is enough information to begin the process of fulfilling the gift subscription request 104, the determination of when to send the set of gift choices 118 to the gift recipient, and other such analysis.

When the gift subscription service 110 receives the gift selection 120 from the gift recipient, in an embodiment, the gift subscription service begins a process to provide the gift to the gift recipient 108. In an embodiment, the gift subscription service 110 initiates a process to send the gift 122 to the gift recipient 108. In an embodiment, the process to send the gift 122 to the gift recipient 108 includes sending a message to a gift fulfillment service 124 which may then initiate one or more processes to obtain the gift 126, package the gift 126, and deliver the gift 126 to the gift recipient. In an embodiment, the gift fulfillment service 124 is part of the gift subscription service 110. In an embodiment, the gift fulfillment service 124 is a third-party service that is separate from the gift subscription service. In an embodiment, information regarding the processes of providing the gift 126 to the gift recipient 108 is included in the gift recipient profile 116 and/or in the gift subscription 114. In an embodiment, the process to send the gift 122 to the gift recipient 108 is initiated by sending a message or other such communication to a retailer so that the retailer acts as the gift fulfilment service 124. For example, the gift subscription service 110 may use an online service of a retailer to select and purchase the selected gift and the retailer may then package the gift and deliver the gift to the gift recipient. In an embodiment, the process to send the gift 122 to the gift recipient 108 is initiated by sending a message or other such communication to a retail service of a computing resources provider such as the computing resources provider 1828 described herein at least in connection with FIG. 18.

It should be noted that for the various analyses described herein, the various operations performed by the gift subscription service 110 may be performed using one or more machine learning algorithms or artificial intelligence techniques such as those described herein and that the gift subscription service 110 is configured to provide such analyses using very little initial information about the gift recipient 108. For example, as described herein, the gift subscription service 110 can begin to fulfill a gift subscription request 104 with little or no information about the gift recipient 108 whereas a traditional gift subscription service may solicit information from the gift purchaser 102 and/or the gift recipient 108 before beginning to fulfill a gift subscription. The gift subscription service 110 described herein may begin to fulfill a gift subscription without soliciting such information. Thus, unlike other gift subscription services, the gift subscription service 110 described herein uses gathered knowledge and analysis of past gift subscriptions to make informed gift subscription predictions to present to the gift recipient 108. It should also be noted that the gift subscription service 110 described herein uses information presented during the gift subscription (e.g., the gift selection 120) to dynamically and continuously update the gift recipient profile 116 and/or the gift subscription 114, thereby improving subsequent gift choices presented to the gift recipient 108.

Figure 2:
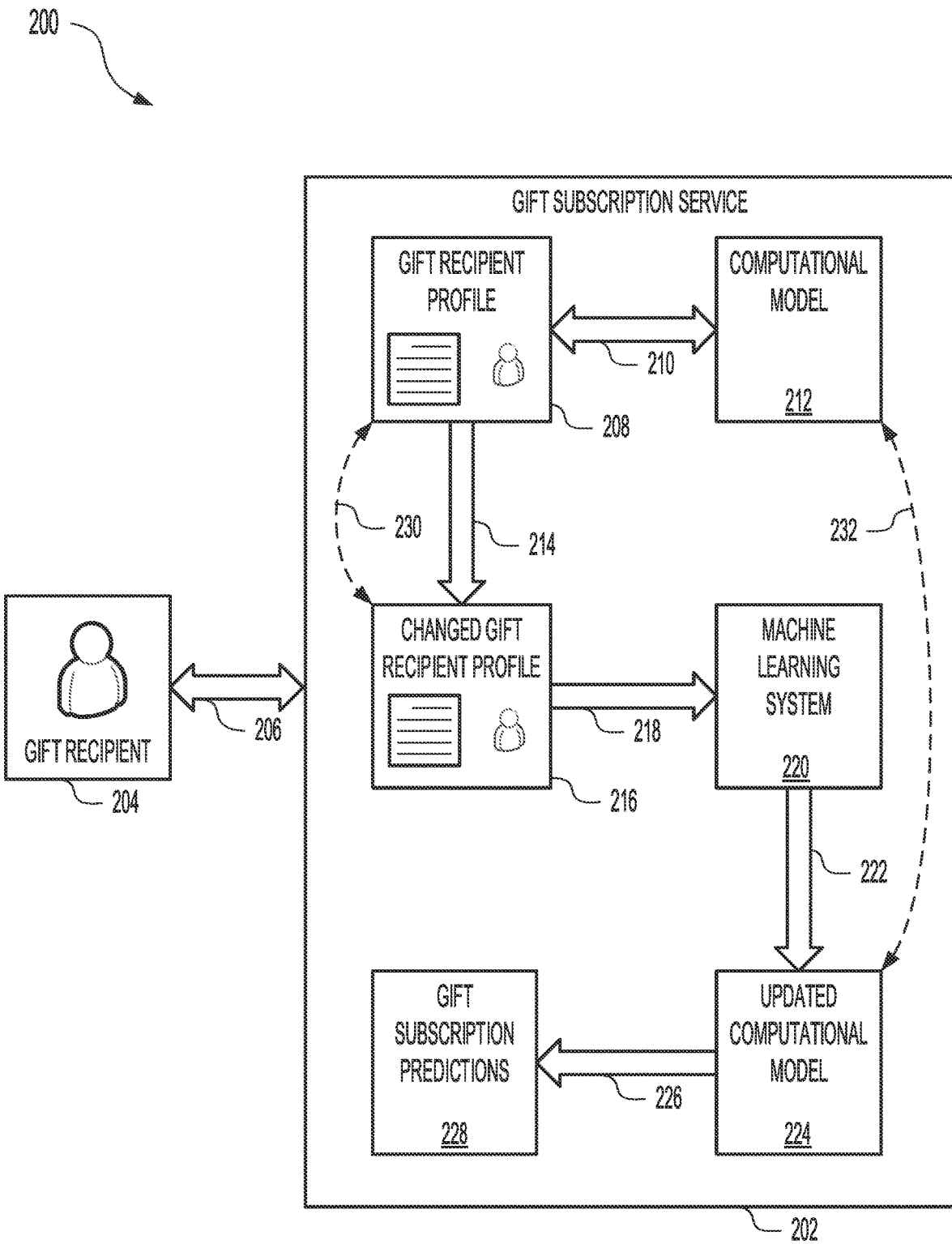
FIG. 2 shows an illustrative example of an environment for generating gift predictions using an updated computation model in accordance with at least one embodiment.

FIG. 2 shows an illustrative example of an environment 200 for generating gift predictions (also referred to herein as a "predictions") using an updated computational model in accordance with at least one embodiment. A gift recipient 204 (which is the same as the gift recipient 108 described herein at least in connection with FIG. 1) interacts 206 with a gift subscription service 202 (which is the same as the gift subscription service 110 described herein at least in connection with FIG. 1) during the course of a gift subscription, as described herein. Actions of the gift recipient 204 when the gift recipient interacts 206 with the gift subscription service 202 may include receiving gift choices, providing gift selections, receiving gifts, generating thank you notes, interacting with a subscription curator, and other such actions including, but not limited to those described herein. In an embodiment, the gift recipient 204 interacts 206 with the gift subscription service 202 using a computing device (not shown) such as the computing device 1802 described herein at least in connection with FIG. 18 over a network (also not shown) such as the network 1822, also described herein at least in connection with FIG. 18.

When a gift recipient profile 208 is established by the gift subscription service 202 using methods such as those described herein, the gift subscription service 202 may also create a computational model 212 and associate 210 the computational model 212 with the gift recipient 204 by associating the computational model 212 with the gift recipient profile 208. In an embodiment, the computational model 212 is an algorithmic representation of the gift recipient profile 208 that is used by systems of the gift subscription service 202 (e.g., the machine learning system 220) to make determinations and/or predictions about the gift subscription. As described herein at least with respect to FIG. 1, the determinations and/or predictions about the gift subscription include, but are not limited to, determinations of whether sufficient information exists in the gift recipient profile 208 to begin fulfilling the gift subscription, predictions of the next interval to send gift choices to the gift recipient 204, determinations of which gifts to include in the set of gift choices that are presented to the gift recipient 204, and other such predictions and determinations.

In an embodiment, the computational model 212 is dynamically and continuously updated in real-time by the gift subscription service 202 during the course of the gift subscription for the gift recipient 204. As an illustrative example of how a computational model 212 for a gift recipient profile 208 may be configured, consider a gift subscription that is created in response to a gift subscription request "I want to start a gift subscription for my nephew and here is his contact information." This is a gift subscription request that does not include much information, but it does include some information. For example, the gift subscription service 202 may be able to determine, with some degree of certainty, that Charles is male. The gift subscription service 202 may also be able to determine something about Charles' age although possibly without much certainty. The determinations that Charles is probably male and his age probably falls within a certain age-range may form the basis for the computational model 212 of the gift recipient Charles. This computational model 212 may then be used to determine when to send the first set of gift choices to Charles as well as to determine what gifts to include in that first set of gift choices.

As used herein, a computational model 212 is a set of one or more computer algorithms that may be executed on computer systems (e.g., computer systems of the gift subscription service) to model a particular system. In this case, a computational model 212 is a model of the gift recipient profile 218 and of the interaction of that gift recipient profile with the gift subscription service 202. In certain systems, such an interaction might be deterministically solved to make predictions about the system (e.g., used to generate predictions for the gift recipient 204). However, for a system such as the interaction of the gift recipient profile 208 with the gift subscription may not be easily deterministically solved. Such a system may be complex and nonlinear and, accordingly, an analytical solution may not be readily apparent. A computational model is used in such systems to, for example, provide iterative experimentation on the model by adjusting parameters of the model using the computer systems and then making predictions about the model based on these iterative experiments. Such computational models may also be referred to as simulations and/or simulation models. There are many different types of computational models including, but not limited to, neural network models, computational cognition, time-reversible models, agent-based models, and so on.

In an embodiment, a computational model such as the computational model 212 is updated by evaluating predictions (e.g., predictions of a set of gifts that can be used in a set of gift choices that yield good results) and using that evaluation to further tune the computational model. For example, selection of a particular set of gifts based on a particular type of profile may be modeled and the computational model may model a likely positive outcome. The gift selection that is made may provide a validation or a repudiation of that prediction. For example, when a gift is selected from the set of predicted gifts, that may be considered a validation of the prediction. Conversely, when no gift is selected from the set of predicted gifts, or an alternative gift is selected as opposed to any of the gifts provided in the set of predicted gifts, such a response may be considered a repudiation of the prediction. As described herein, gift selections are used to update the gift recipient profile and, consequently, the validations and/or repudiations of the prediction may be used to update the computational model to improve the ability of the computational model to make successful predictions. As may be contemplated, a computational model 212 may also be updated using information obtained from other gift recipients, other gift subscriptions, and/or other gift recipient profiles of the gift subscription service. Determinations about the applicability of information obtained from other gift recipients, other gift subscriptions, and/or other gift recipient profiles of the gift subscription service may be made by a system such as the machine learning system 220 using machine learning algorithms and/or artificial intelligence techniques such as those described herein.

The computational model 212 may be updated in real-time as gift selections (or lack thereof) are made from presented sets of predicted gifts. As noted above, gift selections made by a gift recipient associated with the gift recipient profile 208 and by other gift recipients may be evaluated in real-time as these gift selections are made in order to determine whether these gift selections serve as validations and/or repudiations of the predictions made by the computational model 212 associated with the gift recipient profile 208 for the gift recipient 204. Thus, the computational model 212 may be continuously and dynamically updated in real-time as gift selections are made by the gift recipient 204 and other gift recipients in response to presented gift choices.

When new information about the gift recipient 204 (e.g., Charles) is received by the gift subscription service such as, for example, a gift selection from the gift choices the gift recipient profile 208 may be updated based on the new information about the gift recipient 204 that was received. Continuing the illustrative example from above, consider gift subscription choices sent to the gift recipient, and a gift selection that is received in response. If Charles selects the yellow t-shirt and also selects a size 8, the gift subscription service 202 may be able to narrow down the estimate of Charles' age and may also be able to have greater certainty about that estimate. It should be noted that the gift subscription service 202 may also add the fact that Charles preferred the yellow t-shirt to the gift recipient profile 208. The changed gift recipient profile 216 (which, as indicated by the dashed line 230, is the gift recipient profile 208 with the new information incorporated) may then be analyzed to update the computational model of the gift recipient profile. In an embodiment, the changed gift recipient profile 216 is provided 128 as input to the machine learning system 220 (which is the same as the machine learning system 128 described herein at least with respect to FIG. 1), which may then use the changed gift recipient profile 216 to generate 222 an updated computational model 224 (which, as indicated by the dashed line 232, is the computational model 212 with the new information with the information in the changed gift recipient profile 216 incorporated into the model).

When the updated computational model 224 is generated, the updated computational model 224 may be used 226 for subsequent gift subscription determinations and predictions 228 made by the gift subscription service. As may be contemplated, the gift recipient profile and the computational model may be continually and dynamically updated in real-time and as gift selections are made so that the changed gift recipient profile 216 becomes the gift recipient profile 208 and the updated computational model 224 becomes the computational model 212 for subsequent processing of the gift subscription.

Figure 3:
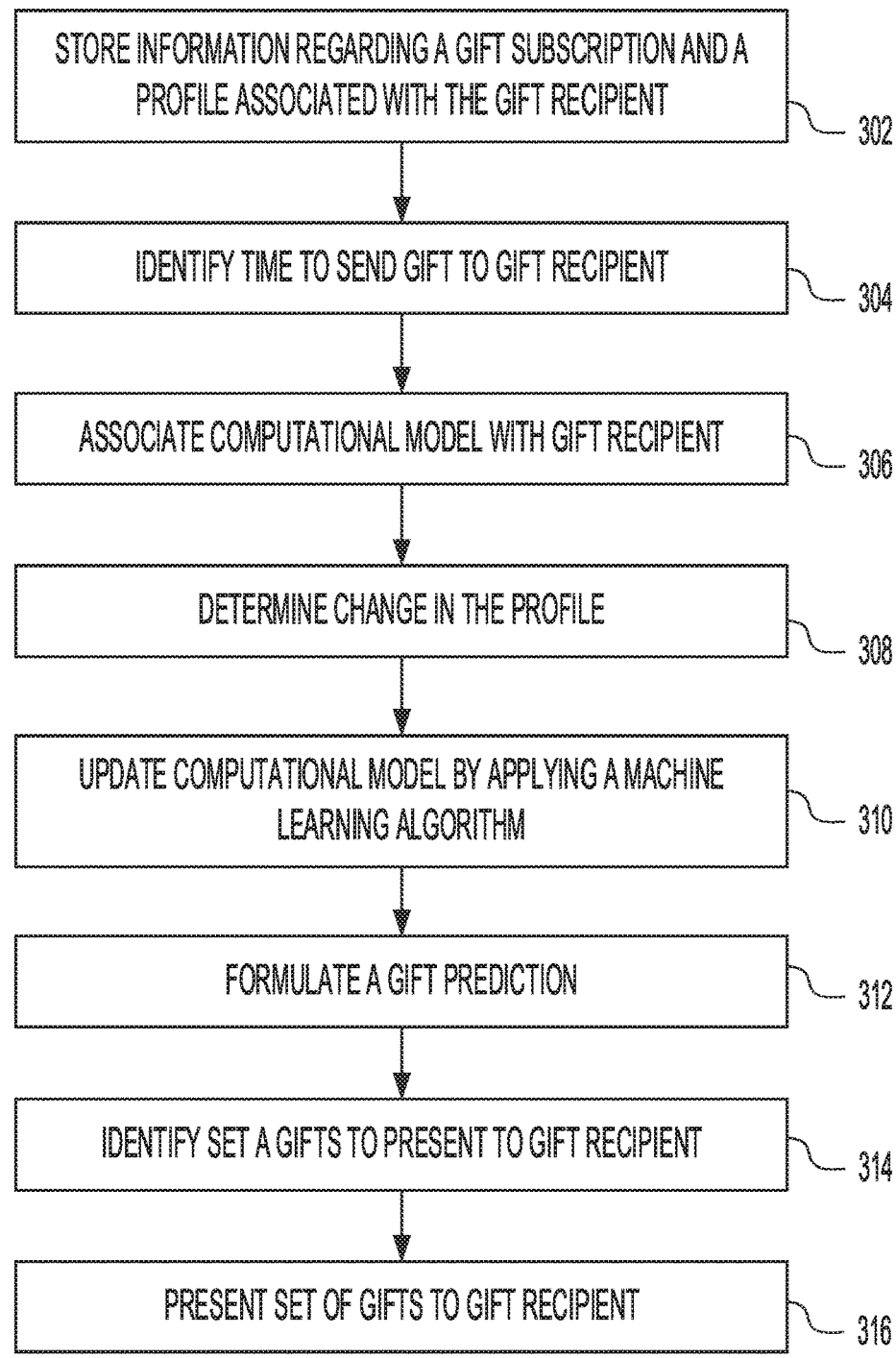
FIG. 3 shows an illustrative example of a process for generating recommendations for a predictive gift subscription in accordance with at least one embodiment.

FIG. 3 shows an illustrative example of a process 300 for generating recommendations for a predictive gift subscription in accordance with at least one embodiment. A service such as the gift subscription service 110 described herein at least in connection with FIG. 1 may perform the example process 300 illustrated in FIG. 3.

At step 302 of the example process 300 illustrated in FIG. 3, the gift subscription service stores information regarding a gift subscription for a gift recipient and a profile associated with the gift recipient. In an embodiment, the gift subscription includes a plurality of gifts to be sent to the gift recipient over a period of time. In an embodiment, a gift subscription is created in response to a gift subscription request (not shown here) as described herein. In an embodiment, a gift subscription is a definition of the parameters for providing gift selections to the gift recipient over the course of the subscription. In an embodiment, a gift subscription may be shared with a plurality of gift recipients. In an embodiment, the profile (also referred to herein as a gift profile) is created when the gift subscription is initiated and dynamically and continuously updated as described herein.

At step 304 of the example process 300 illustrated in FIG. 3, the gift subscription service identifies a time to send a gift to the gift recipient. In an embodiment, the time is identified based on the gift subscription that is associated with the gift recipient (e.g., in step 302). In an embodiment, the time is identified based on the gift recipient profile that is associated with the gift recipient (e.g., in step 302). For example, at step 304, the gift subscription service may identify that a time to send a gift to the gift recipient is at the beginning of the following month. This may be based on the gift subscription (e.g., that a gift subscription that is for monthly gifts) and may also be based on the gift recipient profile (e.g., that the gift recipient prefers to receive a gift on or around the first day of the month).

In an embodiment, the gift subscription service identifies a time to send a gift to the gift recipient using one or more machine learning algorithms and/or artificial intelligence techniques (such as those described herein) to analyze the gift subscription and/or the gift recipient profile. For example, the gift subscription service may use a machine learning system to implement an algorithm (e.g., a clustering algorithm) to identify similar profiles and subscriptions based on one or more vectors (e.g., age, geographic location, other demographic information, etc.) and may use that analysis to determine when to send a gift to the gift recipient 108. In some embodiments, the machine learning system can perform such clustering and obtain partial matches among other profiles and subscriptions using these vectors. In some instances, a dataset of profile and/or subscription characteristics corresponding to other gift subscription requests may be analyzed using a clustering algorithm to identify different types of profiles and/or subscriptions associated with the gift subscription service. In such instances, the analysis may be used to determine when to send a gift to the gift recipient.

At step 306 of the example process 300 illustrated in FIG. 3, the gift subscription service associates a computational model with the gift recipient and the profile. In an embodiment, the computational model is dynamically and continuously updated in real-time by the gift subscription service during the course of the gift subscription and as gift selections are made by the gift recipient, as described herein. As an illustrative example of how a computational model for a gift recipient profile may be configured, a gift subscription that is created in response to a gift subscription request "I want to start a gift subscription for my nephew and here is his contact information" may be used as the basis for a computational model associated with the gift recipient as described herein. For example, the gift subscription service may be able to determine that the gift recipient is male and may also be able to determine something about his age. The determinations that the gift recipient is probably male and that his age probably falls within a certain range may form the basis for the computational model associated with the gift recipient.

As described herein, a computational model is a set of one or more computer algorithms that may be executed on computer systems to model a complex system. In this case, a computational model of the gift recipient profile and the interaction of that gift recipient profile with the gift subscription service may not be easily deterministically solved. Such a system may be complex and nonlinear and, accordingly, an analytical solution may not readily apparent. A computational model may be used to provide iterative experimentation, adjusting parameters of the model at each iteration, and making predictions about the model based on these iterative experiments. Such a computational model may be updated by evaluating predictions (e.g., predictions of a set of gifts that can be used in a set of gift choices that yield good results) and using that evaluation to further improve the computational model as described herein. When gift selections are used to update the gift recipient profile, the computational model may be updated in real-time and as these gift selections are made to improve the ability of the computational model to make successful predictions. In an embodiment, a computational model can be updated using information obtained from other gift recipients, other gift subscriptions, and/or other gift recipient profiles of the gift subscription service. Determinations about the applicability of information obtained from other gift recipients, other gift subscriptions, and/or other gift recipient profiles of the gift subscription service may be made by a system such as the machine learning system and using machine learning algorithms and/or artificial intelligence techniques such as those described herein.

At step 308 of the example process 300 illustrated in FIG. 3, the gift subscription service determines a change in the profile. In an embodiment, a change in the profile occurs in real-time when the gift recipient interacts with the gift subscription service by, for example, selecting a gift from the gift choices, or selecting a different gift not in the gift choices, or electing not to receive a gift, or electing to receive an alternate valued item in lieu of the gift, or electing to receive a future value in lieu if the gift that may, for example, be pooled with the amount for a subsequent selection, and/or other such actions. In an embodiment, a change in the profile occurs when some other information is received by the gift subscription service that relates to the gift subscription, the gift recipient, or some other such element associated with the gift subscription service.

At step 310 of the example process 300 illustrated in FIG. 3, the gift subscription service updates the computational model associated with the gift recipient. In an embodiment, the gift subscription service updates the computational model by applying a machine learning algorithm to the change in the profile using techniques such as those described herein. For example, the gift subscription service may update the computational model associated with the gift recipient using one or more machine learning algorithms and/or artificial intelligence techniques (such as those described herein) to analyze the gift subscription, the gift recipient profile, and/or changes to the gift recipient profile performed in real-time and as gift selections are made. As described herein, the gift subscription service may a machine learning algorithm (e.g., a clustering algorithm) to identify similar profiles and subscriptions and may use that analysis to update the computational model associated with the gift recipient. In some embodiments, the machine learning system can perform such clustering and obtain partial matches among other profiles and subscriptions using these vectors. In some instances, a dataset of profile and/or subscription characteristics corresponding to other gift subscription requests may be analyzed using a clustering algorithm to identify different types of profiles and/or subscriptions associated with the gift subscription service. In such instances, the analysis may be used to update the computational model associated with the gift recipient.

At step 312 of the example process 300 illustrated in FIG. 3, the gift subscription service formulates a gift prediction using the updated computational model. In an embodiment, the gift prediction (also referred to herein as a "prediction") is a set of gift choices such as the set of gift choices 118 described herein at least in connection with FIG. 1. In an embodiment, the prediction is formulated based on the gift profile of the gift recipient (i.e., based on demographics of the gift recipient). In an embodiment, the prediction is formulated based on the time identified to send the gift to the gift recipient (e.g., the time identified in step 304) as that identified time may impact the gift choices presented to the gift recipient in the formulated gift prediction. In an embodiment, the prediction is formulated based on the gift subscription (e.g., a gift subscription that targets a particular type of gift may cause the gift subscription service to select gifts for the set of gifts of the prediction from that type of gift). In an embodiment, the prediction is a set of one more gifts. In an embodiment, the prediction is one more categories of gifts (e.g., t-shirts, or model airplanes, or baby clothes).

In an embodiment, the prediction is formulated by analyzing and/or processing the updated computational model using a system such as the machine learning system 128 described herein at least in connection with FIG. 1. For example, the gift subscription service may formulate the prediction using one or more machine learning algorithms and/or artificial intelligence techniques (such as those described herein) to analyze the updated computational model, to identify similar profiles and subscriptions, and to use that analysis to formulate the prediction. In some embodiments, the machine learning system can perform clustering and obtain partial matches among other profiles and subscriptions using the updated computational profile. In some instances, a dataset of computational profiles corresponding to other gift recipients may be analyzed using a clustering algorithm to identify different types of profiles and/or subscriptions. In such instances, the analysis may be used to formulate a prediction for the gift recipient.

At step 314 of the example process 300 illustrated in FIG. 3, the gift subscription service identifies a set of gifts to send to the gift recipient using the prediction formulated a step 310. In an embodiment where the prediction is a set of one or more gifts, the set of gifts may be a subset of the set of gifts of the prediction. In an embodiment where the prediction is one or more gift categories, the set of gifts may be selected from a library of gifts of that category maintained by the gift subscription service. In an embodiment where the prediction is one or more gift categories, the set of gifts may be selected based on the gift subscription (e.g., selected from a set of gifts defined in a gift subscription and/or from a set of gifts in a curated gift subscription).

At step 316 of the example process 300 illustrated in FIG. 3, the gift subscription service presents the set of gifts to the gift recipient using the techniques described herein (e.g., by displaying the gift choices to the gift recipient on a computing device using an application or web service of the gift subscription service).

Figure 4:
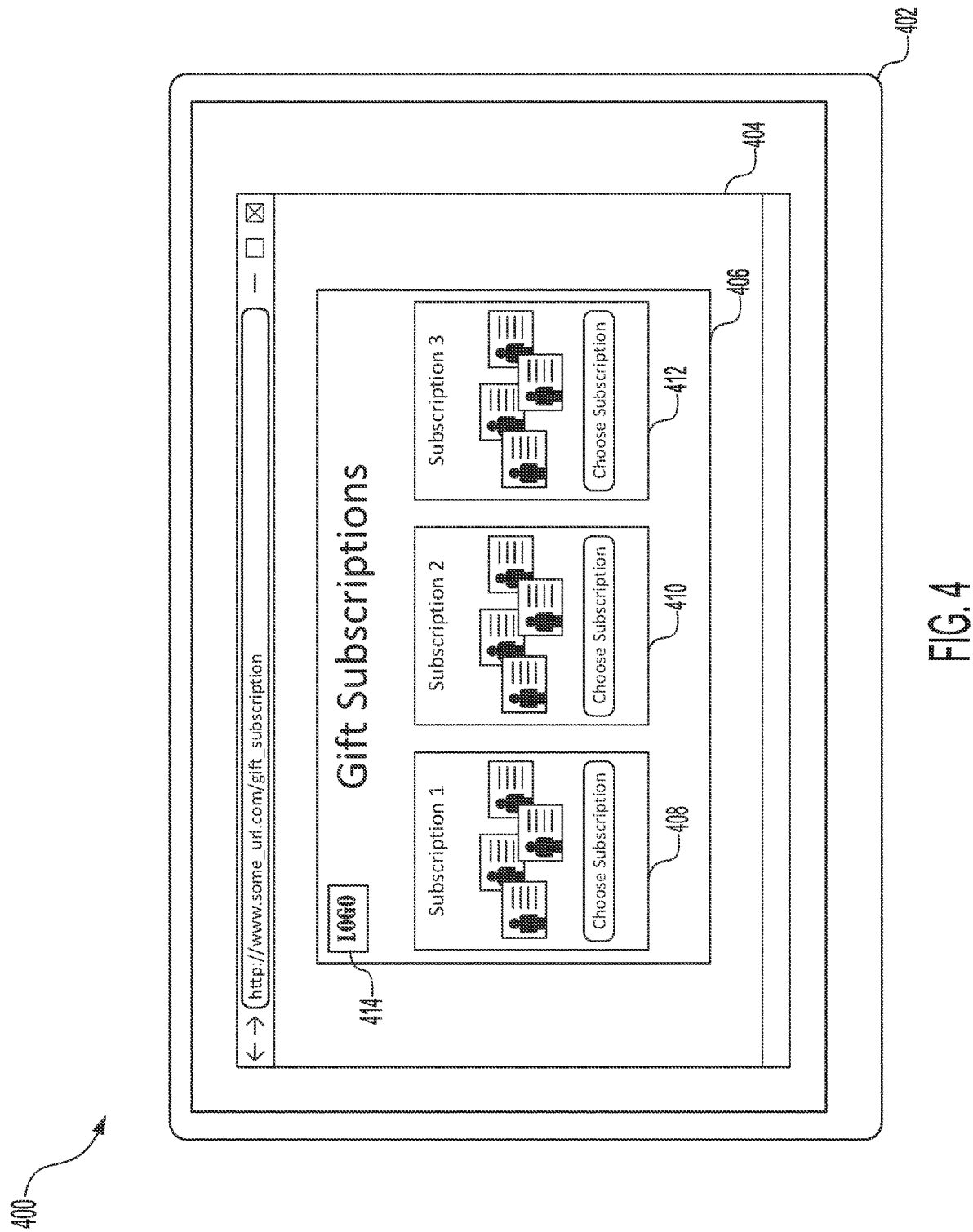
FIG. 4 shows an illustrative example of an environment in which predictive gift subscription options are chosen in accordance with at least one embodiment.

FIG. 4 shows an illustrative example of an environment 400 in which predictive gift subscription options are chosen in accordance with at least one embodiment. In an embodiment, a computing device 402 is used to display an application 404. In an embodiment, a gift recipient (e.g., the recipient 108 described herein at least in connection with FIG. 1) interacts with systems of the gift subscription service (e.g., the gift subscription service 110, also described herein at least in connection with FIG. 1) via the computing device 402 and using the application 404. In an embodiment, a gift subscription purchaser (e.g., the purchaser 102 described herein at least in connection with FIG. 1) interacts with systems of the gift subscription service via the computing device 402 and using the application 404. In an embodiment, the application 404 displays user interface elements including, but not limited to, icons, text, buttons, dropdown lists, radio buttons, check boxes, and visual canvases to convey information obtained from systems of the gift subscription service, obtained from a third-party (e.g., the gift fulfillment service 124 described herein at least in connection with FIG. 1), and/or obtained from other sources. In an embodiment, the application 404 uses those user interface elements to obtain information from the gift recipient and/or the gift purchaser to provide the obtained information to systems of the gift subscription service, to a third-party, and/or to other information subscribers.

In an embodiment, the application 404 receives the obtained information via a network interface (e.g., the network interface 1820 described herein at least in connection with FIG. 18) that is associated with the computing device 402 (e.g., the computing device 1802, the computing device 1824, a computing device associated with the computing resources provider 1828, and/or a merchant computing device 1836, all described herein at least in connection with FIG. 18). In an embodiment, the application 404 provides the information obtained from the gift recipient via the network interface that is associated with the computing device 402. The computing device 402 may be a desktop computer, a laptop computer, a tablet computer, a smart phone, a wearable device (e.g., a smart watch or smart glasses), a virtual reality device, an augmented reality device, or some other such device.

In an embodiment, user interface elements of the application 404 are used to display a gift subscription window 406 that contains information including, but not limited to, one or more gift subscription options. As an example, the gift subscription option 408 may include a description of a gift subscription that includes information such as the type of subscription, details about some or all of the possible gifts, a frequency associated with the gift subscription (e.g., monthly, quarterly, etc.), a cost of the gift subscription, and other such information such as that described herein. The gift subscription option 408 may also include one or more user interface elements such as, for example, a button to choose the gift subscription option 408. In an embodiment, the gift subscription options are options based on interests (e.g., skateboarding, music, novelty t-shirts, etc.). In an embodiment, the gift subscription options are based on an age and/or an age category of the gift recipient (e.g., newborn, infant, child, teen, adult, etc.). In an embodiment, the gift subscription options are for special interest option (e.g., for pet owners, for fans of a particular sports team, etc.). In an embodiment, the gift subscription options are not targeted to a particular interest, age, age category, special interest, or other such categories. As described herein, in an embodiment, the gift subscription options are curated by a gift subscription curator such as the gift subscription curator 112 described herein at least in connection with FIG. 1.

In an embodiment, the gift subscription window 406 is displayed to the gift subscription purchaser so that the gift subscription purchaser may select a gift subscription option associated with a gift subscription. In an embodiment, the gift subscription window 406 is displayed to the gift subscription recipient so that the gift subscription recipient may select a gift subscription option associated with a gift subscription.

The gift subscription window 406 may also include additional gift subscription options (e.g., gift subscription option 410 and gift subscription option 412) that may include descriptions of additional gift subscriptions selectable by the gift subscription purchaser and/or the gift subscription recipient. Such additional gift subscription options may also include descriptions of gift subscriptions that may also include information such as the type of subscription, details about some or all of the possible gifts, a frequency associated with the gift subscription (e.g., monthly, quarterly, etc.), a cost of the gift subscription, and other such information such as that described herein. The gift subscription options (e.g., gift subscription option 410 and gift subscription option 412) may also include one or more user interface elements such as, for example, a button to choose the associated gift subscription option.

In an embodiment, the gift subscription window 406 includes various decorative user interface options such as, for example, the logo 414. In an embodiment, the logo 414 and/or other decorative user interface elements of the gift subscription window 406 can be dynamically altered to conform to a merchant's design esthetic. For example, the logo 414 and/or other decorative user interface elements of the gift subscription window 406 can be updated to display a logo for a manufacturer, retailer, or a designer associated with the gift subscription. Such logos and other design elements may be used to attach a "brand" to the gift subscription window 406. Such logos and other decorative design elements may be obtained from a library of such design elements maintained by the gift subscription service.

Figure 5:
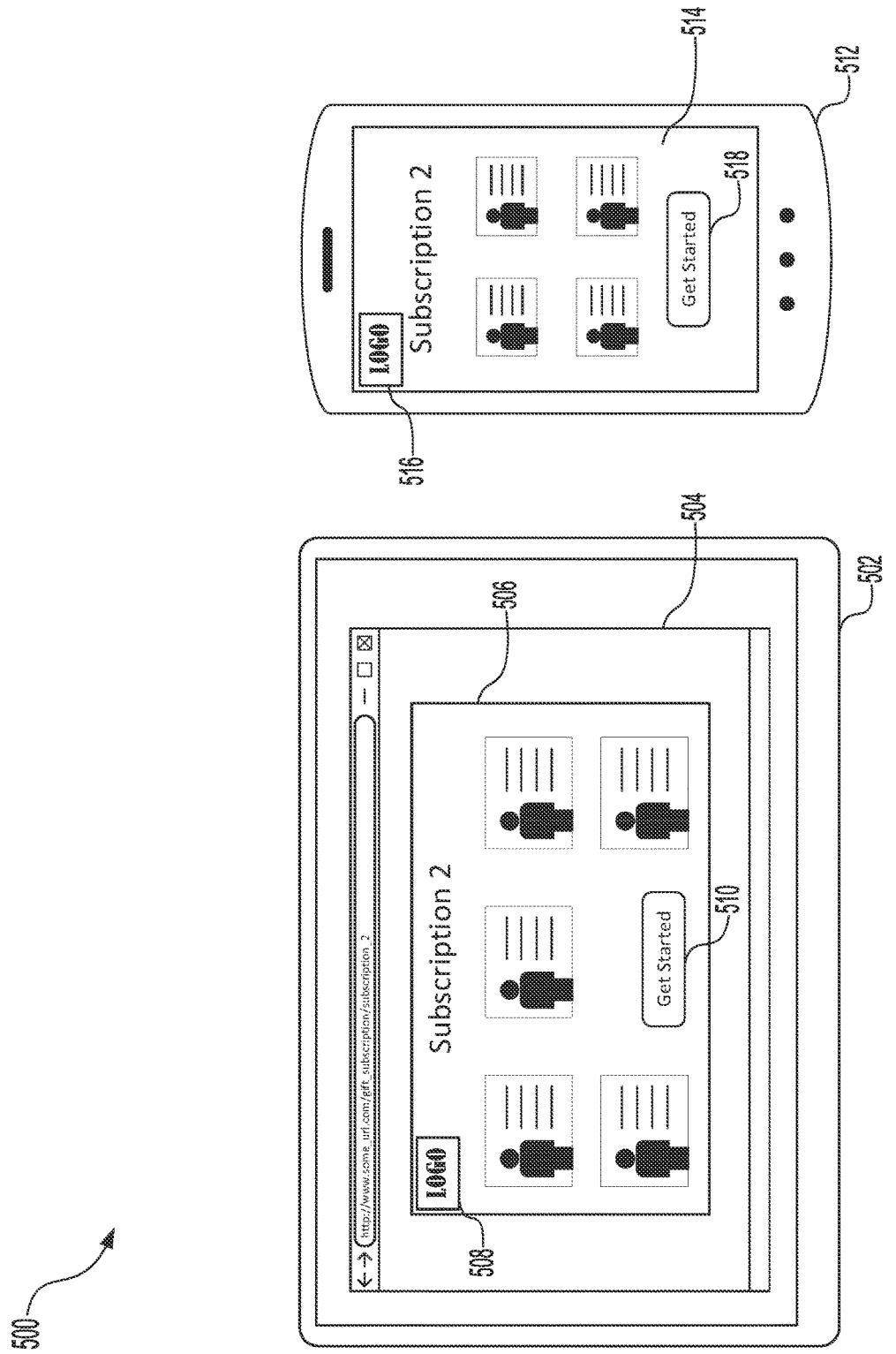
FIG. 5 shows an illustrative example of an environment in which options for a predictive gift subscription are presented in accordance with at least one embodiment.

FIG. 5 shows an illustrative example of an environment 500 in which options for a predictive gift subscription are presented in accordance with at least one embodiment. In an embodiment, a first computing device 502 (e.g., a desktop computer, a laptop computer, a tablet computer, or some other such device) is used to display an application 504. In an embodiment, a gift recipient (e.g., the recipient 108 described herein at least in connection with FIG. 1) interacts with systems of the gift subscription service (e.g., the gift subscription service 110, also described herein at least in connection with FIG. 1) via the computing device 502 and using the application 504. In an embodiment, a gift subscription purchaser (e.g., the purchaser 102 described herein at least in connection with FIG. 1) interacts with systems of the gift subscription service via the computing device 502 and using the application 504. In an embodiment, the application 504 displays user interface elements including, but not limited to, icons, text, buttons, dropdown lists, radio buttons, check boxes, and visual canvases to convey information obtained from systems of the gift subscription service, obtained from a third-party (e.g., the gift fulfillment service 124 described herein at least in connection with FIG. 1), and/or obtained from other sources. In an embodiment, the application 504 uses those user interface elements to obtain information from the gift recipient and/or the gift purchaser and to provide the obtained information to systems of the gift subscription service, to a third-party, and/or to other information subscribers.

In an embodiment, a second computing device 512 (e.g., a smart phone, a tablet computer, a wearable device, a virtual reality or augmented reality device, or some other such device) is used to display an application 514. In an embodiment, a gift recipient interacts with systems of the gift subscription service via the computing device 512 and using the application 514. In an embodiment, a gift subscription purchaser interacts with systems of the gift subscription service via the computing device 512 and using the application 514. As with application 504, in an embodiment, the application 514 displays user interface elements including, but not limited to, icons, text, buttons, dropdown lists, radio buttons, check boxes, and visual canvases to convey information obtained from systems of the gift subscription service, obtained from a third-party, and/or obtained from other sources. In an embodiment, the application 514 uses those user interface elements to obtain information from the gift recipient and/or the gift purchaser and to provide the obtained information to systems of the gift subscription service, to a third-party, and/or to other information subscribers. The application 504 and/or the application 514 may receive the obtained information via a network interface that is associated with the computing devices as described herein. In an embodiment, the application 504 and/or the application 514 provides the information obtained from the gift recipient via the network interface that is associated with the computing device.

In an embodiment, user interface elements of the application 504 are used to display a gift subscription description window 506 that contains information including, but not limited to, descriptions of a selected gift subscription. In an embodiment, the gift subscription description window 506 is displayed as a result of selecting a gift subscription option (e.g., the subscription option 410, described herein at least in connection with FIG. 4). As an example, the gift subscription description window 506 may include more detailed descriptions of one or more gifts associated with the selected gift subscription option, more information about the frequency associated with the gift subscription (e.g., monthly, quarterly, etc.), a breakdown of the costs of the gift subscription, and other such information regarding the gift subscription. In an embodiment, the gift subscription description window 506 includes information about a subscription curator such as the gift subscription curator 112 described herein at least in connection with FIG. 1. In an embodiment, the gift subscription description window 506 includes dynamic user interface elements such as the logo 508, which is the same as the logo 414 described herein at least in connection with FIG. 4. In an embodiment, the gift subscription description window 506 includes a button such as the "Get Started" button 510 that is usable by the gift subscription recipient and/or the gift subscription purchaser to initiate the gift subscription.

In an embodiment, user interface elements of the application 514 are used to display the gift subscription description elements directly within the device (e.g., without a gift subscription description window such as the gift subscription description window 506). In an embodiment, the gift subscription description elements are displayed as a result of selecting a gift subscription option (e.g., the subscription option 410, described herein at least in connection with FIG. 4). As an example, the gift subscription description elements may include elements that provide a more detailed description of one or more gifts associated with the selected gift subscription option, more information about the frequency associated with the gift subscription (e.g., monthly, quarterly, etc.), a breakdown of the costs of the gift subscription, and other such information regarding the gift subscription. In an embodiment, the gift subscription description elements may display information about a subscription curator such as the gift subscription curator 112 described herein at least in connection with FIG. 1. In an embodiment, the gift subscription description elements include dynamic user interface elements such as the logo 516, which is the same as the logo 414 described herein at least in connection with FIG. 4. In an embodiment, the gift subscription description elements include a button such as the "Get Started" button 518 that is usable by the gift subscription recipient and/or the gift subscription purchaser to initiate the gift subscription.

Figure 6:
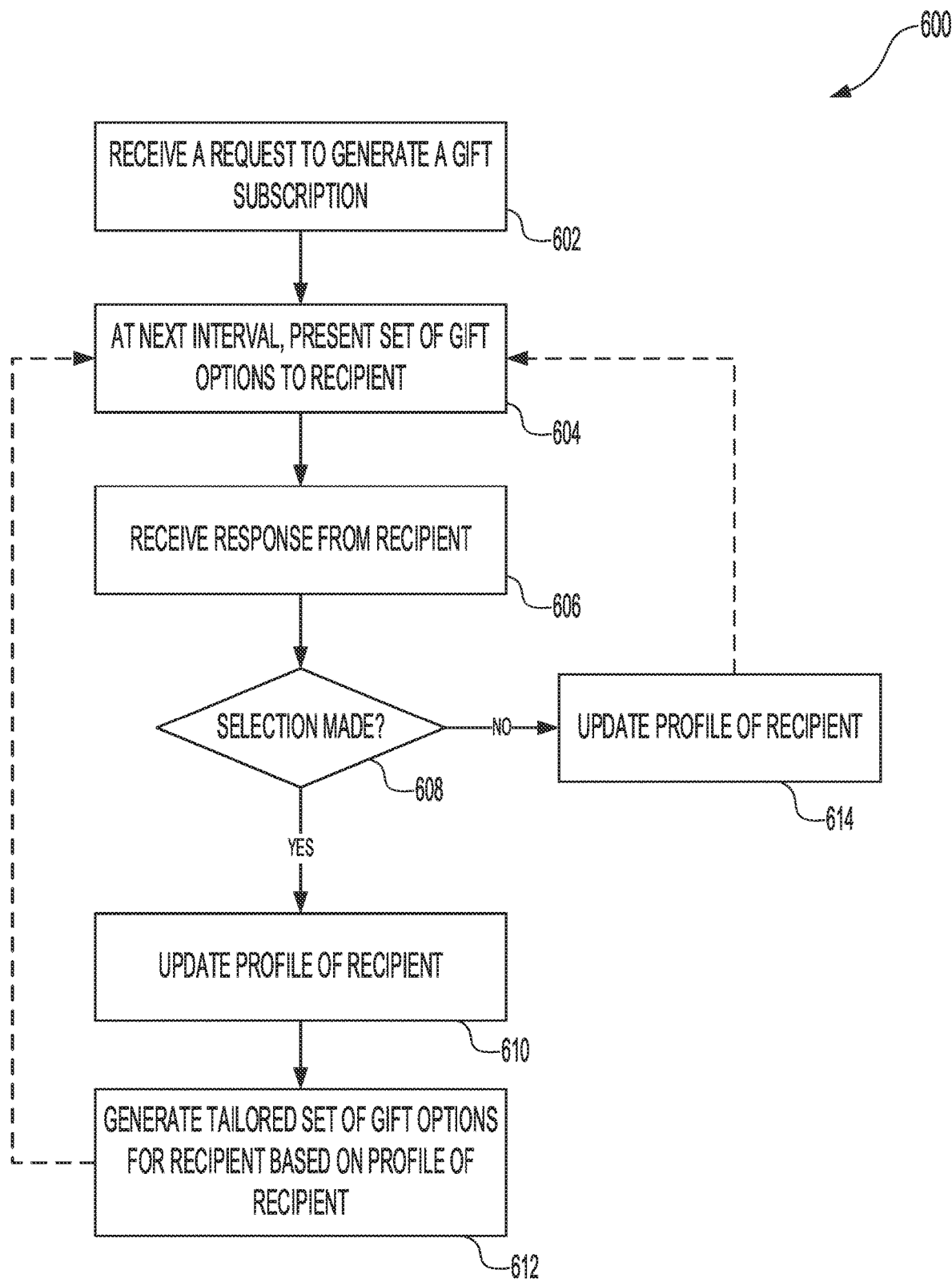
FIG. 6 shows an illustrative example of a process for updating a profile associated with a predictive gift subscription in accordance with at least one embodiment.

FIG. 6 shows an illustrative example of a process 600 for updating a profile associated with a predictive gift subscription in accordance with at least one embodiment. A service such as the gift subscription service 110 described herein at least in connection with FIG. 1 may perform the example process 600 illustrated in FIG. 6.

At step 602, the gift subscription service receives a request to generate a gift subscription. In an embodiment, a purchaser submits a gift subscription request to a gift subscription service using, for example, an application or web service provided by the gift subscription service. In an embodiment, the gift subscription request includes a minimal amount of information about the gift recipient. In another embodiment, the gift subscription request includes a great deal of information about the gift recipient. In another embodiment, the gift subscription request includes no information about the gift recipient. In such an embodiment, the gift subscription service may request additional information from the purchaser and/or the recipient to generate a fuller profile of the recipient using systems and methods such as those described herein.

At step 604, at the next interval the gift subscription service presents a set of gift choices to the gift recipient. In an embodiment, the gift subscription service first makes a determination about when to send a set of gift choices to the recipient. The determination may be stated in the gift subscription request (e.g., "send a monthly gift for a year") or may be determined by the gift subscription service. As an example, the gift subscription may be for a newborn infant and may be for the first year of the infant's life. Such a gift subscription might include a gift at birth, appropriate to a newborn, a gift at the 3-month point of new clothes, a gift at the 6-month point of an age-appropriate developmental toy, a gift at the 9-month point of more new clothes sized for a 9-month old, and finally a gift at the 1-year mark. With such a gift subscription, the gift subscription service may use the birth date of the recipient and the aforementioned gift intervals to make the determination about when to send the set of gift choices to the gift recipient 108.

In an embodiment, the gift subscription service makes a determination about when to send a set of gift choices to the recipient using one or more machine learning algorithms and/or artificial intelligence techniques such as those described herein to analyze the gift subscription and/or the gift recipient profile. For example, the gift subscription service may use machine learning algorithms and/or artificial intelligence techniques to implement an algorithm (e.g., a clustering algorithm) to identify similar profiles and subscriptions and may use that analysis to determine when to send the set of gift choices. In some embodiments, a machine learning system can perform such clustering and obtain partial matches among other profiles and subscriptions. In some instances, a dataset of profile and/or subscription characteristics corresponding to other gift subscription requests may be analyzed using a clustering algorithm to identify different types of profiles and/or subscriptions associated with the gift subscription service, which may be used to determine when to send the set of gift choices to the recipient.

When the gift subscription service has determined when to send the set of gift choices to the recipient, the gift subscription service may then determine which gifts to include in the set of gift choices that will be presented to the recipient at the determined time using methods and systems such as those described herein. In an embodiment, the determination of which gifts to include in the set of gift choices is based on a variety of factors such as those described herein. In an embodiment, the gift subscription service makes a determination about which gifts to include in the set of gift choices that will be presented to the recipient using one or more machine learning algorithms and/or artificial intelligence techniques to analyze the gift subscription, the gift recipient profile, the determined time that the set of gift choices will be presented to the recipient, and/or other such factors. For example, the gift subscription service may use a machine learning system to implement an algorithm (e.g., a clustering algorithm) to identify similar profiles, subscriptions, determined times, and/or other factors based on one or more vectors and may use that analysis to determine which gifts to include in the set of gift choices that will be presented to the recipient. As another example, the gift subscription service may implement a machine learning algorithm or artificial intelligence that is dynamically trained using supervised training techniques and a dataset of sample gift subscriptions, gift recipient profiles, presented gift choices, and gift selections, to determine which gifts to include in the set of gift choices.

At step 606, the gift subscription service receives a response from the gift recipient. In an embodiment, the response from the recipient is to select one of the gifts from the set of gift choices (e.g., for a set of gift choices with a red t-shirt, a yellow t-shirt, and a blue t-shirt, the recipient selects the red t-shirt). In an embodiment, the response from the gift recipient is to select an alternate gift that is not of the gifts from the set of gift choices (e.g., for a set of gift choices with a red t-shirt, a yellow t-shirt, and a blue t-shirt, the recipient selects a green t-shirt). In an embodiment the response from the gift recipient is to not select any gift for this interval (e.g., if the set of gift choices includes a red t-shirt, a yellow t-shirt, and a blue t-shirt, the recipient chooses to not accept any of the gift selections). In an embodiment the response from the gift recipient is to not select any gift for this interval (e.g., if the set of gift choices includes a red t-shirt, a yellow t-shirt, and a blue t-shirt, the recipient chooses to not accept any of the gift selections), and instead selects an alternative form of the gift for this interval (e.g., a gift card, credit, future value, etc.).

At step 608, the gift subscription service determines whether a gift selection was made by the gift recipient in the response received in step 606. Based on the aforementioned examples, the gift subscription service may determine that a gift selection was made when, for a set of gift choices with a red t-shirt, a yellow t-shirt, and a blue t-shirt, the recipient selects the red t-shirt or the recipient selects a green t-shirt. Conversely, the gift subscription service may determine that a gift selection was not made when, for a set of gift choices with a red t-shirt, a yellow t-shirt, and a blue t-shirt, the recipient selects no gift. In an embodiment, the gift subscription service determines that a gift selection was made when the recipient selects an alternative form of the gift for this interval (e.g., a gift card, credit, future value, etc.). In another embodiment, the gift subscription service determines that a gift selection was not made when the recipient selects the alternative form of the gift for this interval (e.g., a gift card, credit, future value, etc.).

If at step 608, the gift subscription service determines that a gift selection was made by the gift recipient in the response received in step 606, at step 610 the gift subscription service updates the profile of the gift recipient based on the selection made. The updates to the profile of the recipient may be made in real-time when the gift selection is made by the recipient. At step 612, the gift subscription service generates a tailored set of gift choices for the gift recipient based on the updated profile that may be presented to the recipient at the next interval. In an embodiment, the gift subscription service generates a tailored set of gift choices for the gift recipient based on the updated profile using one or more machine learning algorithms and/or artificial intelligence techniques such as those described herein to analyze the gift subscription and/or the gift recipient profile. For example, the gift subscription service may use machine learning algorithms and/or artificial intelligence techniques to implement an algorithm (e.g., a clustering algorithm) to identify similar profiles and subscriptions and may use that analysis to generate the tailored set of gift choices for the gift recipient based on the updated profile. In some embodiments, a machine learning system can perform such clustering and obtain partial matches among other profiles and subscriptions. In some instances, a dataset of profile and/or subscription characteristics corresponding to other gift subscription requests may be analyzed using a clustering algorithm to identify different types of profiles and/or subscriptions associated with the gift subscription service, which may be used to generate the tailored set of gift choices for the gift recipient based on the updated profile that may be presented to the recipient at the next interval.

As noted above, the gift subscription service may dynamically, and in real-time, update the machine learning algorithm or artificial intelligence used to determine what gifts are to be presented as gift choices to different gift recipients as gift selections are made by gift recipients. For instance, in response to the gift recipient's selection, the gift subscription service, at step 610, may use this selection to dynamically update the dataset of gift subscriptions, gift recipient profiles, presented gift choices, and gift selections used to train the machine learning algorithm or artificial intelligence. The gift recipient's gift selection may serve as a form of feedback that may be used to determine whether the machine learning algorithm or artificial intelligence is presenting gift choices that may be appealing to gift recipients having similar profiles and subscriptions as the gift recipient. Further, because the machine learning algorithm or artificial intelligence is implemented to simultaneously, and in real-time, provide gift choices for different gift recipients and for different gift subscriptions, the machine learning algorithm or artificial intelligence may be dynamically trained in real-time using the gift selections made by these different gift recipients as these gift selections are received. Thus, the tailored set of gift choices generated based on the gift recipient's updated profile may be generated using the re-trained machine learning algorithm or artificial intelligence.

In some embodiments, after step 612 the process 600 then returns to step 604 to present the tailored set of gift choices for the gift recipient based on the updated profile at the next interval. In some embodiments, after step 612 the process 600 does not return to step 604 to present the tailored set of gift choices for the gift recipient based on the updated profile at the next interval when, for example, the last gift in the gift subscription has been sent to the gift recipient and/or the gift subscription has concluded for a different reason (e.g., the recipient has cashed out the value of the gift subscription).

If at step 608, the gift subscription service determines that a gift section was not made by the gift recipient in the response received in step 606 (e.g., the recipient has chosen not to receive a gift for this interval), at step 614 the gift subscription service updates the profile of the gift recipient based on the gift recipient not making a selection. In some embodiments after step 614, the process 600 then returns to step 604 to present a different set of gift choices to the recipient as a result of the gift recipient not making a selection, for example, by offering gifts based on a pooled value and/or by offering an alternative set of gifts based on changes in the profile, as described herein. In some embodiments, after step 614 the process 600 does not return to step 604 to present the tailored set of gift choices for the gift recipient based on the updated profile at the next interval when, for example, the last gift in the gift subscription has been sent to the gift recipient and/or the gift subscription has concluded for a different reason (e.g., the recipient has cashed out the value of the gift subscription).

Figure 7:
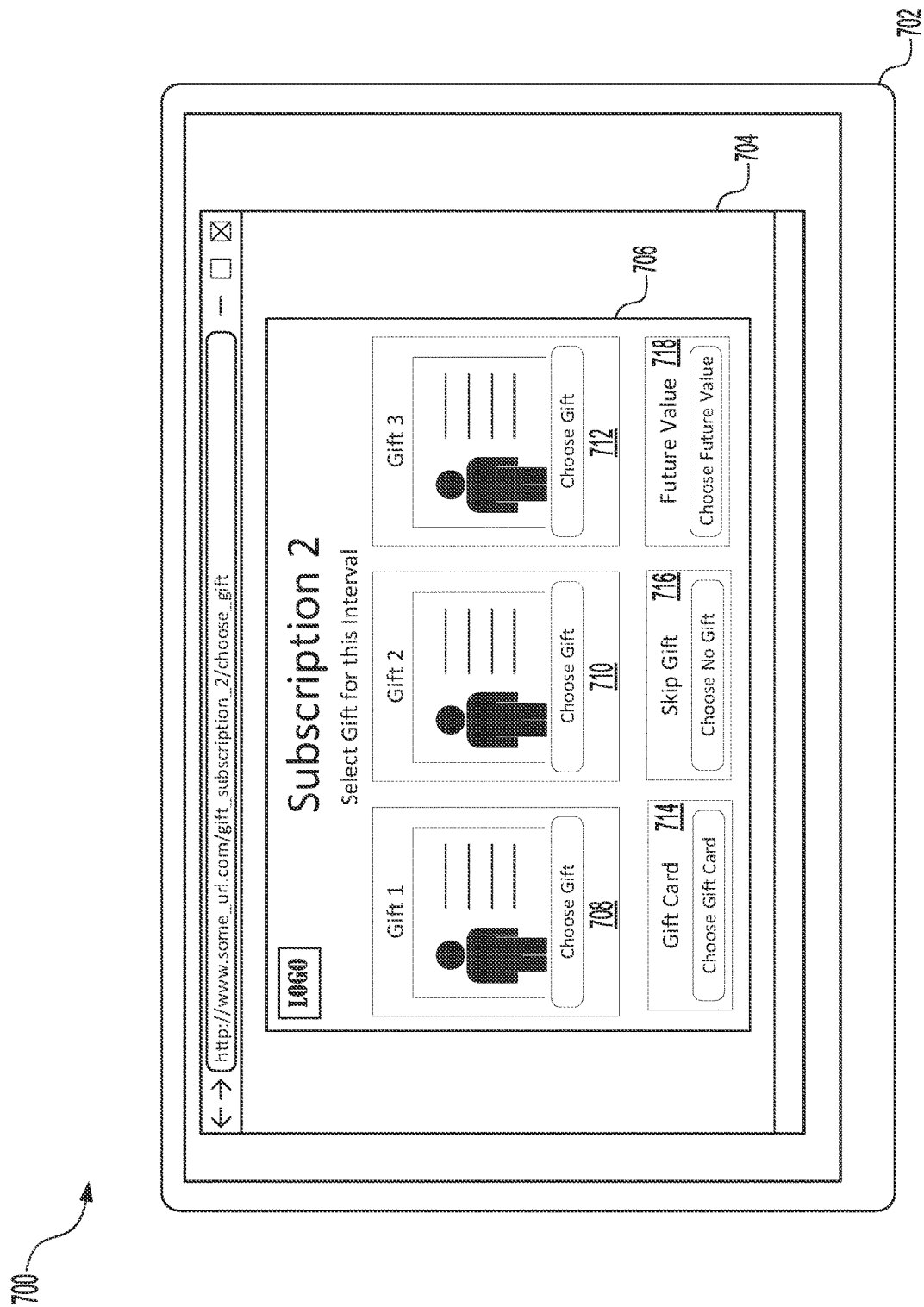
FIG. 7 shows an illustrative example of an environment in which gift choices for a predictive gift subscription are presented in accordance with at least one embodiment.

FIG. 7 shows an illustrative example of an environment 700 in which gift choices for a predictive gift subscription are presented in accordance with at least one embodiment. In an embodiment, a computing device 702 is used to display an application 704. In an embodiment, a gift recipient interacts with systems of the gift subscription service via the computing device 702 and using the application 704 using methods such as those described herein. In an embodiment, the application 704 displays user interface elements such as those described herein (e.g., icons, text, buttons, dropdown lists, radio buttons, check boxes, and visual canvases) to convey information obtained from systems of the gift subscription service, obtained from a third-party, and/or obtained from other sources, as described herein. In an embodiment, the application 704 uses those user interface elements to obtain information from the gift recipient and/or the gift purchaser to provide the obtained information to systems of the gift subscription service, to a third-party, and/or to other information subscribers.

In an embodiment, the application 704 receives the obtained information via a network interface that is associated with the computing device 702 as described herein. In an embodiment, the application 704 provides the information obtained from the gift recipient via the network interface that is associated with the computing device 702. The computing device 702 may be a desktop computer, a laptop computer, a tablet computer, a smart phone, a wearable device (e.g., a smart watch or smart glasses), a virtual reality device, an augmented reality device, or some other such device such as those described herein.

In an embodiment, user interface elements of the application 704 are used to display a gift choice window 706 that contains information including, but not limited to, one or more gift choice options. As an example, the gift choice option 708 may include details about a gift that may be offered from the current gift interval. As may be contemplated, the gift choice window 706 may include gift choices such as the gift choices 118 described herein at least with respect to FIG. 1. The gift choice option 708 may also include one or more user interface elements such as a button to choose the gift choice option 708. As may be contemplated, a button to choose the gift choice option 708 may allow the gift recipient to provide a gift selection such as the gift selection 120 described herein at least with respect to FIG. 1. As described herein, the gift choice options of the gift choice window 706 may be based on interests (e.g., skateboarding, music, novelty t-shirts, etc.), or on an age and/or an age category of the gift recipient (e.g., newborn, infant, child, teen, adult, etc.), or on special interests (e.g., for pet owners, for fans of a particular sports team, etc.), or on some other factors. As described herein, the gift subscription options may be curated by a gift subscription curator such as the gift subscription curator 112 described herein at least in connection with FIG. 1. In an embodiment, the gift choice window 706 is displayed as a result of the gift recipient selecting a gift subscription option such as the gift subscription option 410 as described herein at least with respect to FIG. 4. In an embodiment, the gift choice window 706 is displayed when the next interval for presenting a set of gift choices arrives (e.g., at step 604 of the process 600 described herein at least with respect to FIG. 6).

The gift choice window 706 may also include additional gift subscription options (e.g., gift choice option 710 and gift choice option 712) that may include descriptions of additional gift choices selectable by the gift subscription recipient at the current interval. The gift choice options (e.g., the gift choice option 710 and the gift choice option 712) may also include one or more user interface elements such as, for example, a button to choose the associated gift choice option (i.e., to choose the associated gift). In an embodiment, the gift subscription window 706 includes various decorative user interface options including, but not limited to logos or other decorative user interface elements such as those described herein.

In an embodiment, the gift choice window 706 includes one or more user interface elements that allow the gift recipient to select alternatives to the gift choices (e.g., to select no gift, to select a future value, to select a gift card, to redeem a gift in the form of cryptocurrency or other currency, to re-gift a particular gift to another recipient, or to select some other option). In the example environment 700 illustrated in FIG. 7, the gift choice window 706 includes user interface elements to allow the gift recipient to receive a gift card 714, user interface elements to allow the gift recipient to choose no gift for this interval 716, and user interface elements to allow the gift recipient to receive a future value 718, all of which are described herein.

Figure 8:
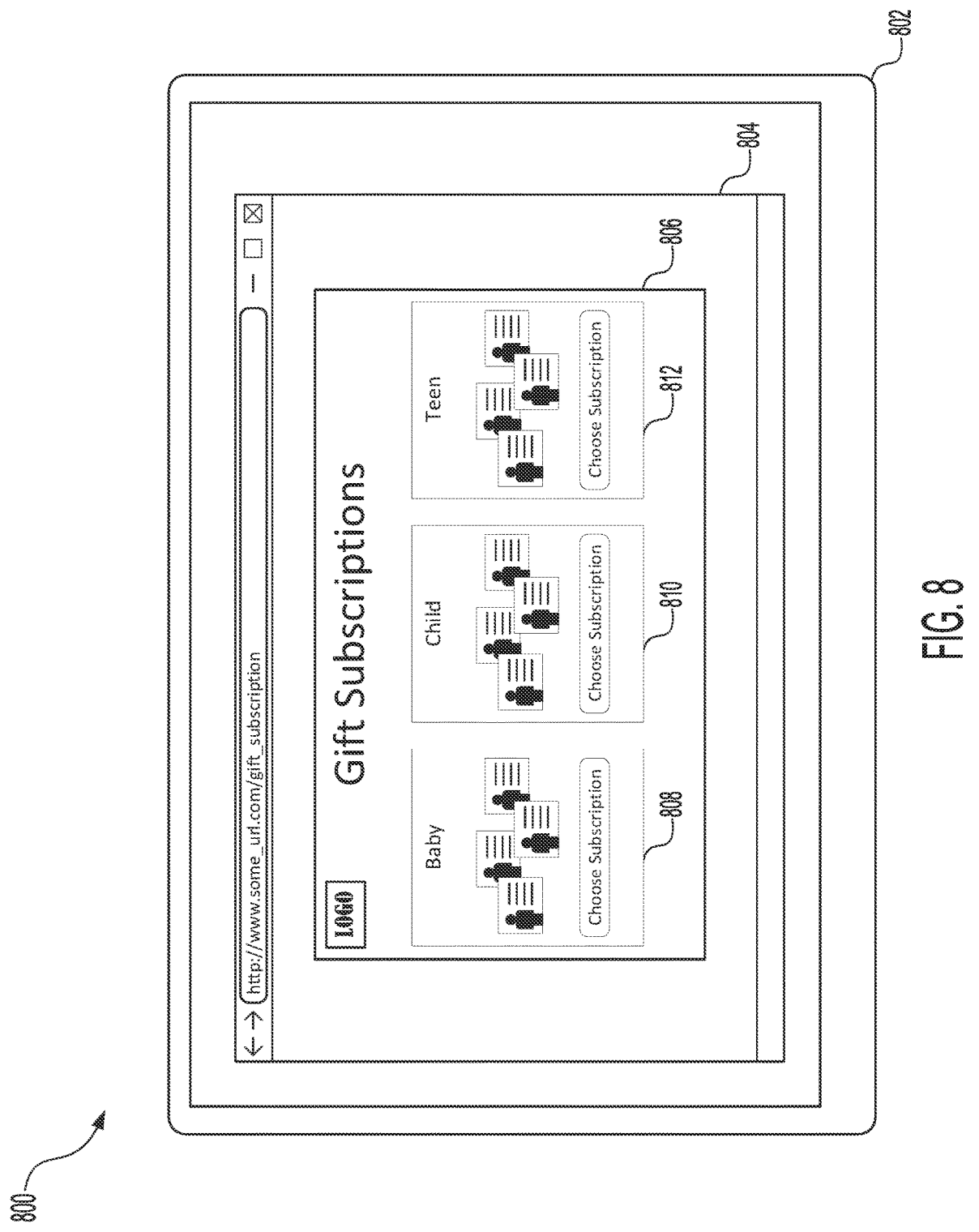

FIG. 8 shows an illustrative example of an environment 800 in which predictive gift subscription options based on recipient demographics are chosen in accordance with at least one embodiment. In an embodiment, a computing device 802 is used to display an application 804. In an embodiment, a gift recipient interacts with systems of the gift subscription service via the computing device 802 and using the application 804 as described herein (e.g., via the computing device 402 and the application 404 described herein at least in connection with FIG. 4. In an embodiment, a gift subscription purchaser interacts with systems of the gift subscription service via the computing device 802 and using the application 804. In an embodiment, the application 804 displays user interface elements such as those described herein (e.g., icons, text, buttons, dropdown lists, radio buttons, check boxes, and/or visual canvases) to convey information obtained from the gift subscription service, third-party services, and/or other sources. In an embodiment, the application 804 uses those user interface elements to obtain information from the gift recipient and/or the gift purchaser to provide the obtained information to systems of the gift subscription service, to third-parties, or to other information subscribers.

In an embodiment, the application 804 receives the obtained information via a network interface that is associated with the computing device 802, as described herein. In an embodiment, the application 804 provides the information obtained from the gift subscription recipient and/or the gift subscription purchaser via the network interface that is associated with the computing device 802. As described herein, the computing device 802 may be a desktop computer, a laptop computer, a tablet computer, a smart phone, a wearable device (e.g., a smart watch or smart glasses), a virtual reality device, an augmented reality device, or some other such device.

In an embodiment, user interface elements of the application 804 are used to display a gift subscription window 806 that displays one or more gift subscription options. As an example, the gift subscription option 808 may include a description of a gift subscription that includes information such as the type of subscription (e.g., a subscription targeted to a baby gift recipient), details about some or all of the possible gifts of the baby subscription, a frequency associated with the gift subscription (e.g., monthly, quarterly, etc.), a cost of the gift subscription, and other such information. The gift subscription option 808 may also include one or more user interface elements such as, for example, a button to choose the gift subscription option 808 for a baby. In an embodiment, the gift subscription options are curated by a gift subscription curator such as the gift subscription curator 112 described herein at least in connection with FIG. 1.

In an embodiment, the gift subscription window 806 is displayed to the gift subscription purchaser so that the gift subscription purchaser may select a gift subscription option associated with a gift subscription. In an embodiment, the gift subscription window 806 is displayed to the gift subscription recipient so that the gift subscription recipient may select a gift subscription option associated with a gift subscription.

The gift subscription window 806 may also include additional gift subscription options (e.g., gift subscription option 810 for a child and/or gift subscription option 812 for a teen) that may include descriptions of additional gift subscriptions selectable by the gift subscription purchaser and/or the gift subscription recipient. Such additional gift subscription options may also include descriptions of the gift subscription options that include information such as the type of gift subscription, details about some or all of the possible gifts of a gift subscription, a frequency associated with the gift subscription (e.g., monthly, quarterly, etc.), a cost of the gift subscription, and other such information. The gift subscription options (e.g., gift subscription option 810 for a child and/or gift subscription option 812 for a teen) may also include one or more user interface elements such as, for example, a button to choose the associated gift subscription option.

In an embodiment, the gift subscription window 806 includes various decorative user interface elements such as those described herein. In an embodiment, those decorative user interface elements can be dynamically altered to conform to a merchant's design esthetic to, for example, associate a "brand" with the gift subscription window 806 also as described herein. Such decorative user interface elements may be obtained from a library of such elements maintained by the gift subscription service.

Although illustrated herein for age-based gift subscription options (e.g., the gift subscription option 808 for a baby, the gift subscription option 810 for a child, and the gift subscription option 812 for a teen), in an embodiment the gift subscription options are based on other demographics and/or interests. For example, gift subscription options may be presented for recent college graduates, new parents, people that live in a particular location, pet owners (including, for example, different options for cat owners and for dog owners), sports fans, readers, movie buffs, fans of a particular movie or movie genre, fans of a particular television show or television genre, or any of a multitude of other such demographic or interest categories. As may be contemplated, the gift subscription window 806 may include more than the three gift choices illustrated herein. For example, the gift subscription window 806 may include categories for baby, child, teen, late teen, young adult, older adult, or other age categories.

Figure 9:
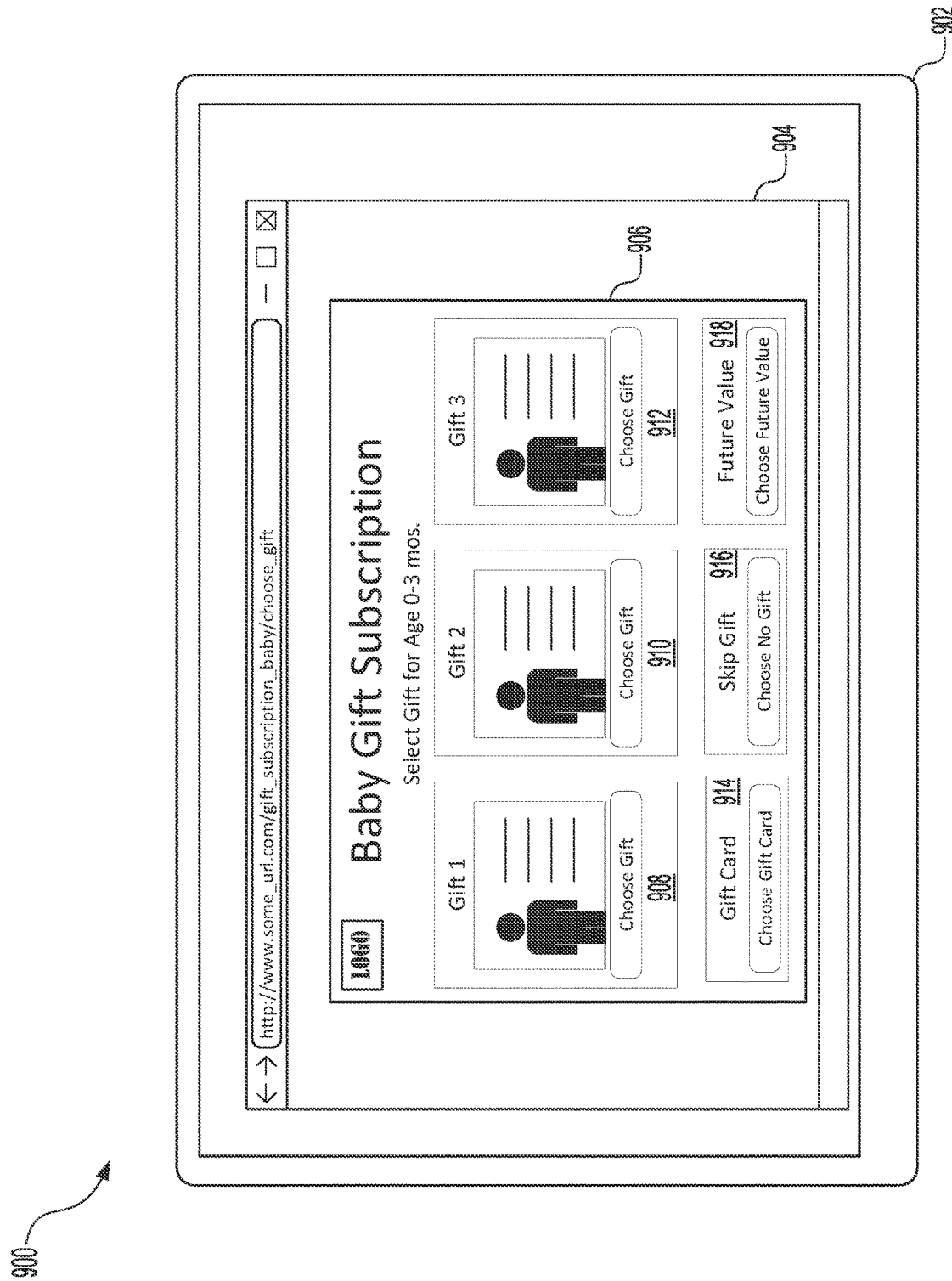
FIG. 9 shows a first illustrative example of an environment in which gift choices for a predictive gift subscription based on recipient demographics are presented in accordance with at least one embodiment.

FIG. 9 shows a first illustrative example of an environment 900 in which gift choices for a predictive gift subscription based on recipient demographics are presented in accordance with at least one embodiment. In an embodiment, a computing device 902 is used to display an application 904. In an embodiment, a gift recipient interacts with systems of the gift subscription service via the computing device 902, via a network interface associated with the computing device 902, and using the application 904 and associated user interface elements to convey information obtained from systems of the gift subscription service, to obtain information from the gift recipient, and to provide the obtained information to systems of the gift subscription service. As described herein, the computing device 902 may be a desktop computer, a laptop computer, a tablet computer, a smart phone, a wearable device (e.g., a smart watch or smart glasses), a virtual reality device, an augmented reality device, or some other such device.

In an embodiment, user interface elements of the application 904 are used to display a gift choice window 906 that displays one or more gift choice options. As an example, the gift choice option 908 may include details about a first gift for the current gift interval which, in this case, is for a baby that is from 0-3 months old. In an embodiment, the gift choice option 908 includes a button to choose the gift choice option 908 which allows the gift recipient to choose that gift for the current gift interval. As described herein, the gift subscription options may be curated by a gift subscription curator such as the gift subscription curator 112 described herein at least in connection with FIG. 1. In an embodiment, the gift choice window 906 is displayed as a result of the gift recipient selecting a gift subscription option such as the gift subscription option 808 (e.g., a baby gift subscription) as described herein at least with respect to FIG. 8. In an embodiment, the gift choice window 906 is displayed when the next interval for presenting a set of gift choices arrives (e.g., at step 604 of the process 600 described herein at least with respect to FIG. 6).

In an embodiment, choices made in the gift choice window 906 and for the current gift interval are stored in the profile of the gift recipient and those choices are used for the gift choices for subsequent intervals, for other gift subscriptions, and/or for other retailers. For example, a selection at three months of a gift that is appropriate for a six-month old recipient and that is received from a certain retailer may be used to select which gifts are offered on that subscription, for that recipient, and at that retailer, as described herein. In an embodiment, an age-based selection that is advanced (i.e., for a gift that is three months advanced) is used to select which gifts are offered for that recipient for a different retailer and/or for that recipient for a different subscription. In an embodiment, if a gift recipient has a gift subscription for baby clothing and a gift that is three months advanced is selected, a gift subscription for toys that is for that same gift recipient can also offer gift suggestions for toys that are also three months advanced, based on the updated profile. In an embodiment, that selection (i.e., a gift that is three months advanced) is also used for other recipients with similar profiles for that retailer and/or for other retailers.

The gift choice window 906 may also include additional gift subscription options for the current gift interval (e.g., gift choice option 910 and gift choice option 912) that may include descriptions of additional gift choices selectable by the gift subscription recipient at the current gift interval. In an embodiment, the gift choice options (e.g., the gift choice option 910 and the gift choice option 912) also include buttons to choose the associated gift choice option (i.e., to choose the associated gift). In an embodiment, the gift subscription window 906 includes various decorative user interface options including, but not limited to logos or other decorative user interface elements such as those described herein.

In an embodiment, the gift choice window 906 includes one or more user interface elements that allow the gift recipient to select alternatives to the gift choices as described herein. For example, the gift recipient may select a gift card, select no gift, or may select a future value (e.g., a pooled value, as described above, that may be used to offer gift choices of increased value on this and/or subsequent intervals). In the example environment 900 illustrated in FIG. 9, the gift choice window 906 includes user interface elements to allow the gift recipient to receive a gift card 914, user interface elements to allow the gift recipient to choose no gift for this interval 916, and user interface elements to allow the gift recipient to receive a future value 918, all of which are described herein.

Figure 10:
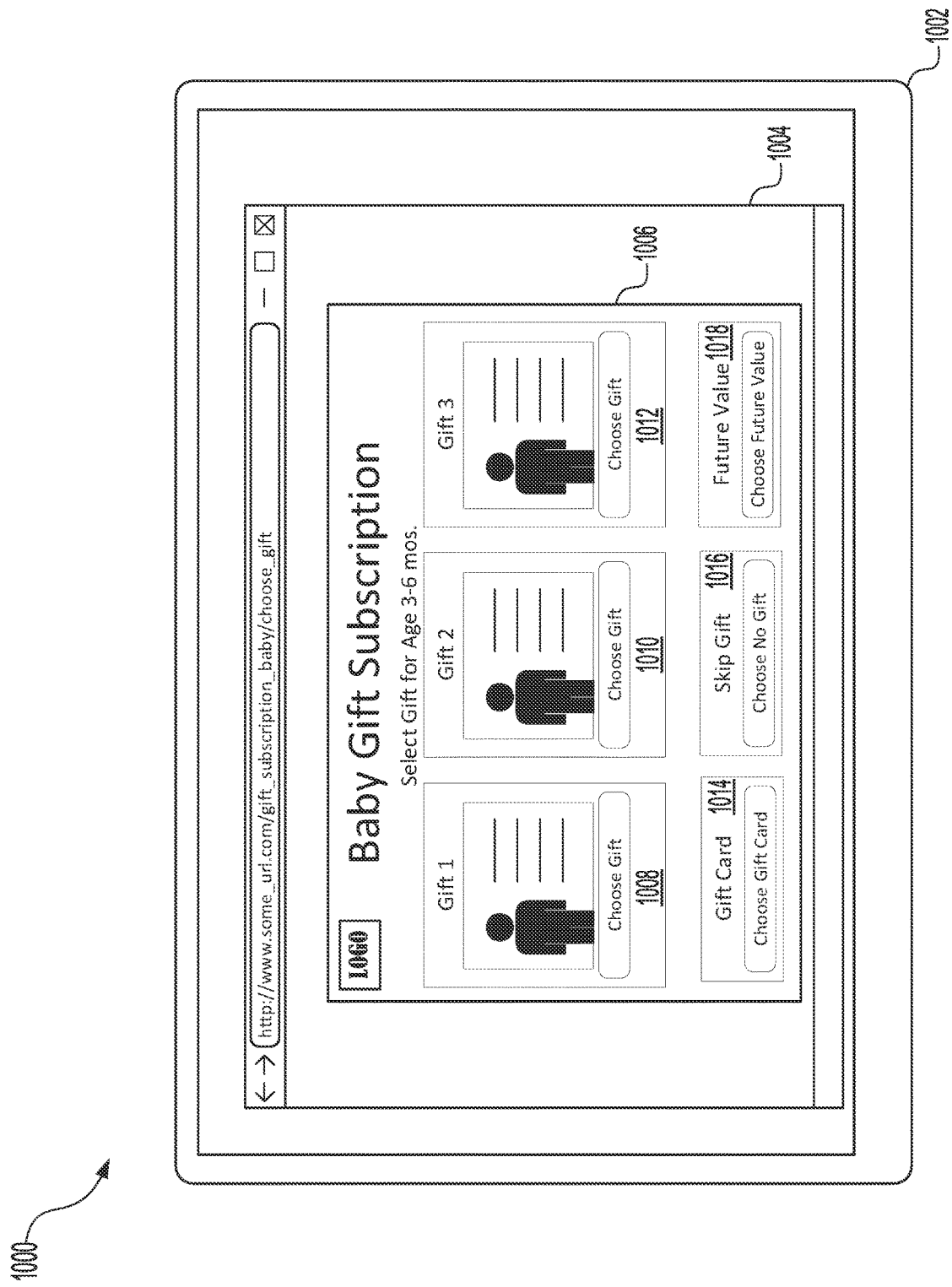
FIG. 10 shows a second illustrative example of an environment in which gift choices for a predictive gift subscription based on recipient demographics are presented in accordance with at least one embodiment.

FIG. 10 shows a second illustrative example of an environment 1000 in which gift choices for a predictive gift subscription based on recipient demographics are presented in accordance with at least one embodiment. Just as described with respect to the example environment 900 illustrated in FIG. 9, in an embodiment a computing device 1002 is used to display an application 1004 which is used by a gift recipient to interact with systems of the gift subscription service to display information obtained from the gift subscription, to obtain information from the gift recipient (e.g., to make gift choices), and to provide the obtained information to systems of the gift subscription service. As described herein, the computing device 1002 may be a desktop computer, a laptop computer, a tablet computer, a smart phone, a wearable device (e.g., a smart watch or smart glasses), a virtual reality device, an augmented reality device, or some other such device.

In an embodiment, user interface elements of the application 1004 are used to display a gift choice window 1006 that displays one or more gift choice options. As illustrated in FIG. 10, the gift choice option 1008 displays details about a first gift for the current gift interval (e.g., for a baby that is from 3-6 months old) and also includes a button to choose the gift choice option 1008 for the current gift interval. As described herein, the gift subscription options may be curated by a gift subscription curator such as the gift subscription curator 112 described herein at least in connection with FIG. 1. In an embodiment, the gift choice window 1006 is displayed as a result of the gift recipient selecting a gift subscription option such as the gift subscription option (e.g., a baby gift subscription option 808) at a next determined interval. For example, the gift choice window 1006 may be displayed when the next interval for presenting a set of gift choices arrives (e.g., at step 604 of the process 600 described herein at least with respect to FIG. 6).

As may be contemplated, the gift choice window 1006 may also include additional gift subscription options for the current gift interval (e.g., the gift choice option 1010 and the gift choice option 1012) that include descriptions of additional gift choices selectable by the gift subscription recipient at the current gift interval (e.g., at 3-6 months). In an embodiment, the gift choice options (e.g., the gift choice option 1010 and the gift choice option 1012) also include buttons to choose the associated gift choice option (i.e., to choose the associated gift). In an embodiment, the gift subscription window 1006 includes various decorative user interface options including, but not limited to logos or other decorative user interface elements such as those described herein. In an embodiment, the gift choice window 1006 includes one or more user interface elements that allow the gift recipient to select alternatives to the offered gift. For example, the gift recipient may select a gift card 1014, choose no gift for this interval 1016, or receive a future value 1018, all of which are described herein.

Figure 11:
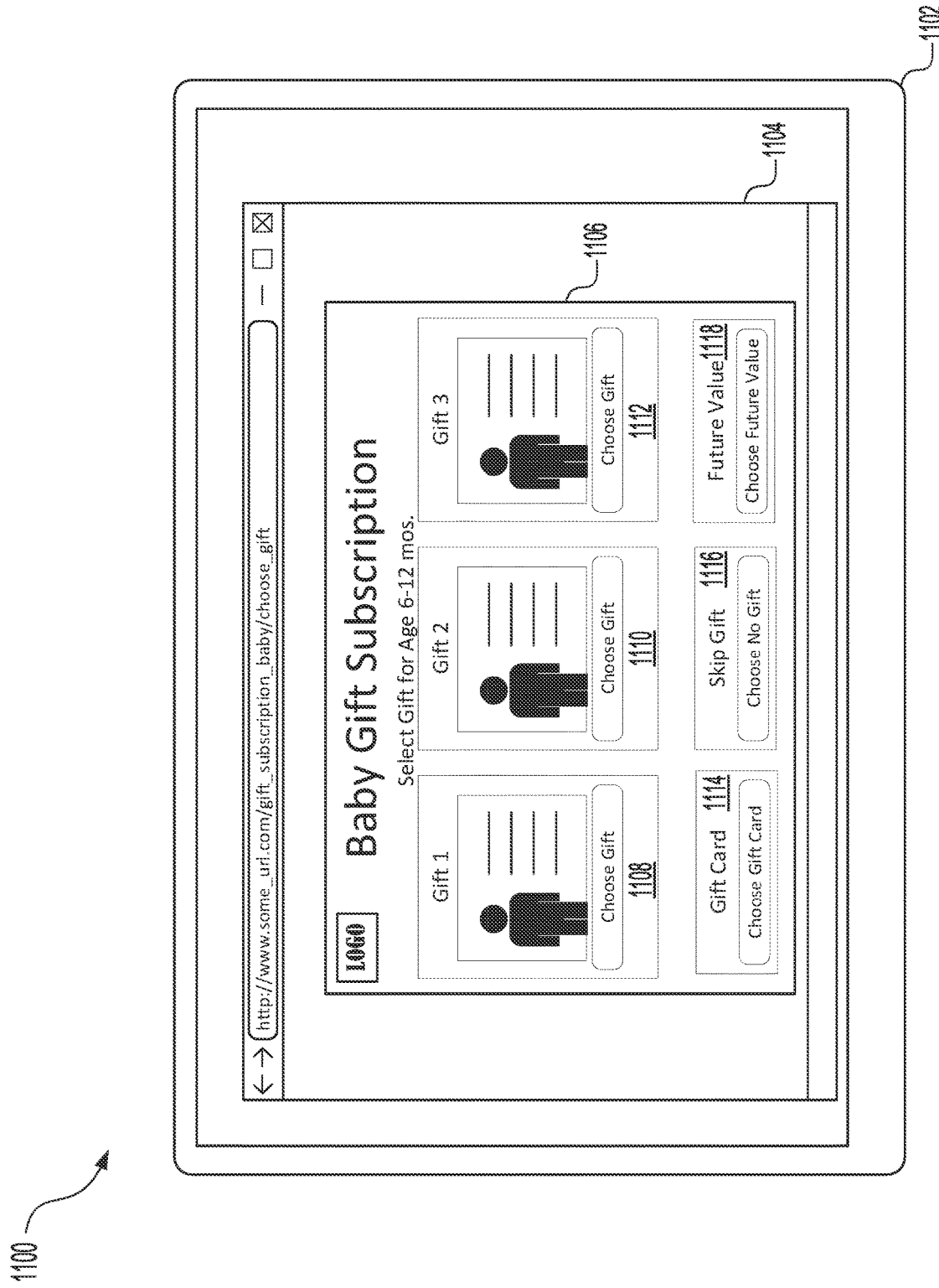
FIG. 11 shows a third illustrative example of an environment in which gift choices for a predictive gift subscription based on recipient demographics are presented in accordance with at least one embodiment.

FIG. 11 shows a third illustrative example of an environment 1100 in which gift choices for a predictive gift subscription based on recipient demographics are presented in accordance with at least one embodiment. Just as described with respect to the example environment 900 illustrated in FIG. 9 and the example environment 1000 illustrated in FIG. 10, in an embodiment a computing device 1102 is used to display an application 1104 which is used by a gift recipient to interact with systems of the gift subscription service to display information obtained from the gift subscription, to obtain information from the gift recipient (e.g., to make gift choices), and to provide the obtained information to systems of the gift subscription service. As described herein, the computing device 1102 may be a desktop computer, a laptop computer, a tablet computer, a smart phone, a wearable device (e.g., a smart watch or smart glasses), a virtual reality device, an augmented reality device, or some other such device.

In an embodiment, user interface elements of the application 1104 are used to display a gift choice window 1106 that displays one or more gift choice options for the current gift interval (e.g., for a baby that is between 6 and 12 months old) and also includes a button to choose the gift choice option 1108 for the current gift interval. In an embodiment, the gift subscription options are curated by a gift subscription curator such as the gift subscription curator 112 described herein at least in connection with FIG. 1. In an embodiment, the gift choice window 1106 is displayed as a result of the gift recipient selecting a gift subscription option such as the gift subscription option (e.g., a baby gift subscription option 808) at a next determined interval (e.g., after 6 months have passed). For example, the gift choice window 1106 may be displayed when the next interval for presenting a set of gift choices arrives (e.g., at step 604 of the process 600 described herein at least with respect to FIG. 6).

In an embodiment, the gift choice window 1106 includes additional gift subscription options for the current gift interval such as the gift choice option 1110 and the gift choice option 1112. Just as with the gift choice option 1108, the gift choice option 1110 and the gift choice option 1112 may include descriptions of additional gift choices selectable by the gift subscription recipient at the current gift interval (e.g., at 6-12 months). In an embodiment, the gift choice options include buttons to choose the associated gift choice option. As described herein, the gift subscription window 1106 may also include various decorative user interface options to provide branding for the gift choice window 1106. In the example environment 1100 illustrated in FIG. 11, the gift choice window 1106 includes one or more user interface elements that allow the gift recipient to select alternatives to the offered gift such as selecting a gift card 1114, choosing no gift for this interval 1116, or electing to receive a future value 1118 for the current gift interval.

With respect to the three illustrative examples illustrated in FIG. 9, FIG. 10, and FIG. 11, when the gift recipient selects one of the gift choices (e.g., the gift choice option 908, the gift choice option 910, or the gift choice option 912 in FIG. 9) or when the gift recipient selects one of the other options (e.g., the gift card 914, no gift for this interval 916, or a future value 918 in FIG. 9), the gift recipient profile of the gift recipient may be updated in real-time based on that selection. Additionally, as described herein, when the gift recipient profile of the gift recipient is updated, a computer model associated with the gift subscription of the gift recipient may also be updated. Further selections such as those made in FIG. 10 and FIG. 11 may also cause the gift recipient profile of the gift recipient to be updated in real-time as those selections are made. Additionally, as described herein, when the gift recipient profile of the gift recipient is updated, a computer model associated with the gift subscription of the gift recipient may also be updated.

As described herein at least with respect to FIG. 2, the computational model (e.g., the computational model 212 described herein at least with respect to FIG. 2) is implemented with computer algorithms that may be executed on computer systems to model the gift recipient profile and the interaction of that gift recipient profile with the gift subscription service. For example, the computational model is updated by making predictions for a set of gift choices, evaluating those predictions, and using that evaluation to further tune the computational model. The computational model may be updated in real-time as gift selections (or lack thereof) are made from presented sets of predicted gifts. As noted above, gift selections made by a gift recipient associated with the gift recipient profile and by other gift recipients may be evaluated in real-time as these gift selections are made in order to determine whether these gift selections serve as validations and/or repudiations of the predictions made by the computational model associated with the gift recipient profile for the gift recipient. Thus, the computational model may be continuously and dynamically updated in real-time as gift selections are made by the gift recipient and other gift recipients in response to presented gift choices.

In an illustrative example, a prediction for the set of gifts presented in the gift choice window 906 is based on the gift recipient profile for a baby (e.g., based on the gift subscription option 808 being selected). The gift selection that is made may provide a validation or a repudiation of that prediction. For example, when a gift is selected from the set of predicted gifts (e.g., the gift recipient selects gift choice option 908, the gift choice option 910, or the gift choice option 912), that may be considered a validation of the prediction. Conversely, when no gift is selected from the set of predicted gifts (e.g., the gift recipient selects the gift card 914, no gift for this interval 916, or a future value 918), that may be considered a repudiation of the prediction.

As described herein, gift selections and alternate selections are used to update the gift recipient profile and the validations and/or repudiations of the prediction may be used to update the computational model in real-time as these gift selections and alternate selections are made. This continuous and real-time updating of the computational model may be used by the gift subscription service to continuously improve the ability of the computational model to make successful predictions. When the computational model is updated (e.g., the updated computational model 224), the updated computational model may be used for subsequent gift subscription determinations and predictions made by the gift subscription service.

In an embodiment, additional information from the gift selection is used to update the gift recipient profile and the computational model. For example, information about the validity of the prediction may be obtained if the if the gift recipient selects gift choice option 908 as described herein. Additional information may also be obtained about the gift recipient based on options selected for the gift choice option 908. Consider an example when the gift choice option 908 is clothing that is sized for a baby from 0-3 months. In such an example, if the gift recipient changes the size to a size for a baby aged 6 months, in the next interval (e.g., for a baby aged 3-6 months, described below), clothing options presented (e.g., gift choice option 1008, gift choice 1010, and/or gift choice options 1012) may default to sizes for a baby aged 6-12 months rather than for a baby aged 3-6 months.

Figure 12:
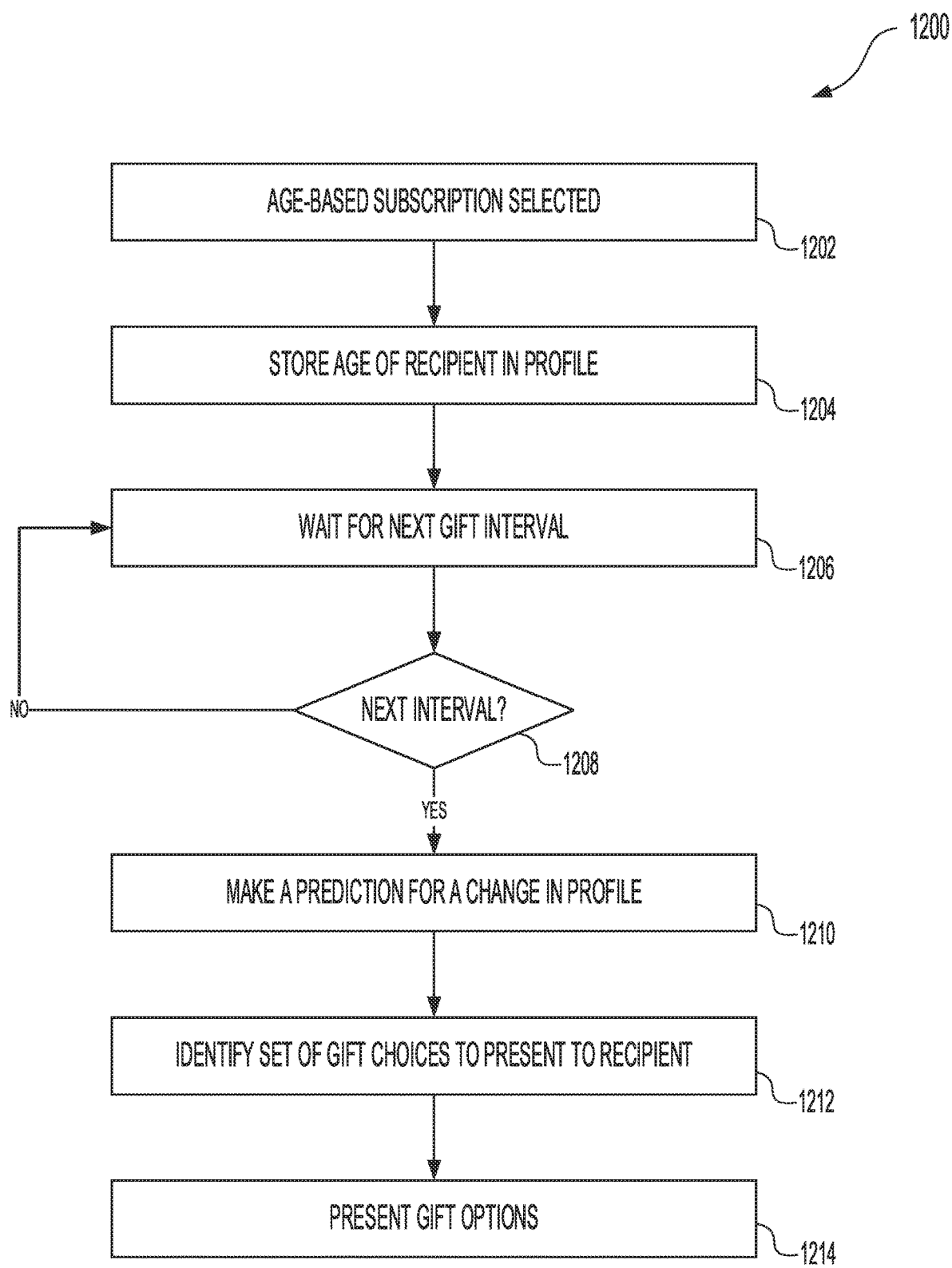
FIG. 12 shows an illustrative example of a process for generating recommendations for a predictive gift subscription based on recipient demographics in accordance with at least one embodiment.

FIG. 12 shows an illustrative example of a process 1200 for generating recommendations for a predictive gift subscription based on recipient demographics in accordance with at least one embodiment. A service such as the gift subscription service 110 described herein at least in connection with FIG. 1 may perform the example process 1200 illustrated in FIG. 12.

At step 1202, the gift subscription service determines that an age-based subscription has been chosen. As described herein, an age-based subscription is a predictive gift subscription where the gift intervals are based on the age of the recipient. For example, the gift subscription illustrated in example environments 900-1100 and described herein at least in connection with FIGS. 9-11 is an age-based subscription for a baby (e.g., a child from zero to twelve months old) where the intervals occur at zero to three months (FIG. 9), three to six months (FIG. 10), and six to twelve months (FIG. 11). It should be noted that while the process 1200 is illustrated and described as being specific to an age-based subscription, the process 1200 may be applied to any form of gift subscription that may be selected by gift purchasers and/or gift recipients.

At step 1204, the gift subscription service stores the age (e.g., the initial age) of the gift recipient at a particular date, in a recipient profile. For example, for the baby gift subscription illustrated in example environments 900-1100 and described herein at least in connection with FIGS. 9-11, the gift subscription service may store the age of the gift recipient as 0 months old on the birth date of the baby.

At step 1206, the gift subscription service waits for the next interval. For the gift subscription illustrated in example environments 900-1100 and described herein at least in connection with FIGS. 9-11 the next interval may be between zero and three months from the birth date of the baby, from three to six months from the birth date of the baby, or from six to twelve months from the birth date of the baby, depending on how much time has passed and how many intervals have occurred previously.

At step 1208, the gift subscription service determines if it is time for the next interval. If at step 1208 the gift subscription service determines that it is not time for the next interval, the gift subscription service returns to step 1206 to wait for the next interval. If at step 1208 the gift subscription service determines it is time for the next interval, the gift subscription service proceeds to step 1210 to make a prediction for a change in the profile of the recipient. In an embodiment, the gift subscription service makes a prediction for a change in the profile of the recipient based on the age of the gift recipient at the current interval (e.g., how many months have passed) as well as based on any additional information stored in the gift recipient profile for the predictive gift subscription. In an embodiment, the gift subscription service makes a prediction for a change in the profile of the recipient using a computational model and the techniques described herein at least with respect to FIG. 2.

As described above, a computational model is a set of one or more computer algorithms that may be executed on computer systems to model a particular system. The computational model that the gift subscription service uses to make a prediction for a change in the profile of the recipient is a model of the gift recipient profile and of the interaction of that gift recipient profile with the gift subscription service. As described herein, a computational model is used to provide iterative experimentation by adjusting parameters of the model and making predictions about the model based on iterative experiments. In an embodiment, the computational model that the gift subscription service uses to make a prediction for a change in the profile of the recipient is updated by evaluating predictions (e.g., predictions of a set of gifts that can be used in a set of gift choices that yield good results) and using that evaluation to further tune the computational model. For example, selection of a particular set of gifts based on a particular type of profile may be modeled and the computational model may model a likely positive outcome. The gift selection that is made may provide a validation or a repudiation of that prediction. Gift selections may be used to update the gift recipient profile and, consequently, the validations and/or repudiations of the prediction may be used to update the computational model and to thus improve the ability of the computational model to make successful predictions.

At step 1212, the gift subscription service identifies a set of gift choices to present to the gift recipient. In an embodiment, the set of gift choices to present to the gift recipient are based on the prediction for a change in the profile of the recipient. In an embodiment, the gifts in the set of gift choices to present to the gift recipient are identified based on a variety of factors. In an embodiment, the gifts in the set of gift choices to present to the gift recipient are identified using one or more machine learning algorithms and/or artificial intelligence techniques to analyze the gift subscription, the gift recipient profile, the determined time that the set of gift choices will be presented to the recipient, and/or other such factors. For example, the gift subscription service may use a machine learning system to implement an algorithm (e.g., a clustering algorithm) to identify similar profiles, subscriptions, determined times, and/or other factors and may use that analysis to determine which gifts to include in the set of gift choices that will be presented to the recipient.

At step 1214, the gift subscription service presents the gifts in the set of gift choices to the recipient using systems and methods such as those described herein so that the gift recipient may select a gift from the set of gift options at the current interval.

Figure 13:
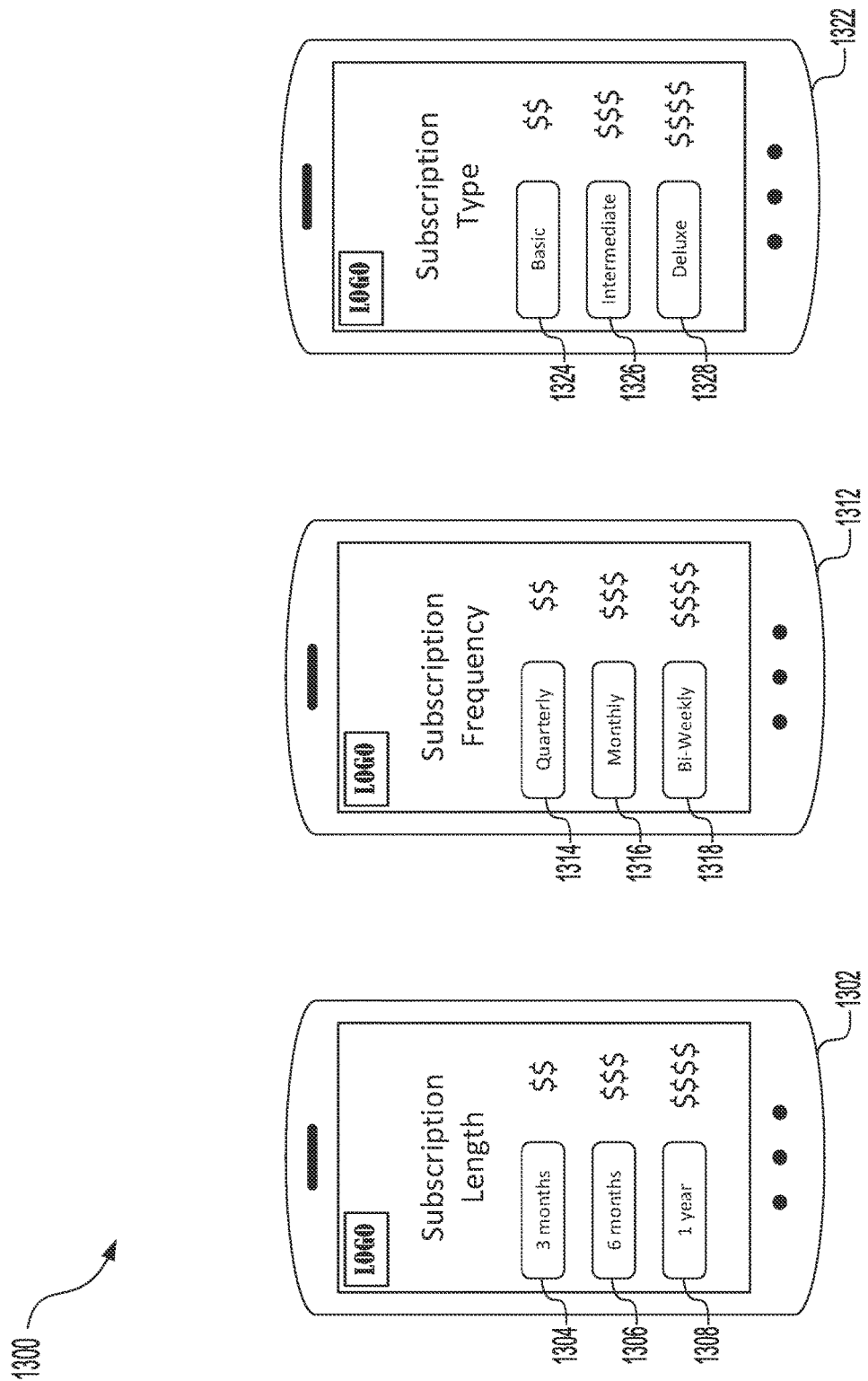
FIG. 13 shows an illustrative example of an environment in which gift subscription parameters for a predictive gift subscription are determined in accordance with at least one embodiment.

FIG. 13 shows an illustrative example of an environment 1300 in which gift subscription parameters for a predictive gift subscription are determined in accordance with at least one embodiment. The example environment 1300 illustrated in FIG. 13 shows three views of an application used to determine parameters for a gift subscription. In each of the three views (e.g., first view 1302, second view 1312, and third view 1322) is shown executing on a computing device (e.g., a smart phone, a tablet computer, a wearable device, a virtual reality or augmented reality device, or some other such device) that is used to execute the application used to determine the parameters. In an embodiment, a gift subscription purchaser interacts with systems of the gift subscription service via the computing device and using the application to select the parameters for a gift subscription. The application displays user interface elements such as those described herein to convey information obtained from systems of the gift subscription service. In an embodiment, the application uses those user interface elements to obtain information from the gift purchaser and to provide the obtained information to systems of the gift subscription service. The application may receive the obtained information via a network interface that is associated with the computing device as described herein. In an embodiment, the application provides the information obtained from the gift purchaser via the network interface that is associated with the computing device to systems of the gift subscription service. In an embodiment, the application used to determine the parameters for a subscription includes dynamic user interface elements such as a logo and/or other decorative user interface elements such as those described herein to provide branding for the gift subscription.

The first view 1302 of the application used to determine parameters for a gift subscription allows the gift subscription purchaser to select a gift subscription based on the subscription length. In the example illustrated in the first view 1302 of the application used to determine the parameters for a gift subscription, the gift subscription purchaser may select a 3-month subscription 1304, a 6-month subscription 1306, or a 1-year subscription 1308. In an embodiment, the application used to determine parameters for a gift subscription includes additional information regarding a particular gift subscription. For example, the application used to determine the parameters for a gift subscription may show the prices for the 3-month subscription 1304, the 6-month subscription 1306, and the 1-year subscription 1308.

The second view 1312 of the application used to determine parameters for a gift subscription allows the gift subscription purchaser to select a gift subscription based on the subscription frequency. In the example illustrated in the second view 1312 of the application used to determine the parameters for a gift subscription, the gift subscription purchaser may select a quarterly subscription 1314, a monthly subscription 1316, or a bi-weekly subscription 1318. In an embodiment, the application used to determine parameters for a gift subscription includes additional information regarding a particular gift subscription. For example, the application used to determine the parameters for a gift subscription may show the prices for the quarterly subscription 1314, the monthly subscription 1316, or the bi-weekly subscription 1318.

The third view 1322 of the application used to determine parameters for a gift subscription allows the gift subscription purchaser to select a gift subscription based on the subscription type. In the example illustrated in the third view 1322 of the application used to determine the parameters for a gift subscription, the gift subscription purchaser may select a basic subscription 1324, an intermediate subscription 1326, or a deluxe subscription 1328. In an embodiment, the application used to determine parameters for a gift subscription includes additional information regarding a particular gift subscription. For example, the application used to determine the parameters for a gift subscription may show the prices for the basic subscription 1324, the intermediate subscription 1326, or the deluxe subscription 1328.

As may be contemplated, additional views of the application used to determine parameters for a gift subscription may allow the gift subscription purchaser to select a gift subscription based on other selection criteria and/or a gift subscription based on a combination of selection criteria. For example, an unillustrated view of the application used to determine parameters for a gift subscription may allow the gift subscription purchaser to select a gift subscription based on a combination of subscription length (e.g., as in the first view 1302) and subscription type (e.g., as in the third view 1322) so that the gift subscription purchaser may select a 1-year subscription 1308 that is an intermediate subscription 1326. In an embodiment, the application used to determine parameters for a gift subscription displays the total cost of this gift subscription. Such an unillustrated view of the application used to determine parameters for a gift subscription may be displayed on a single screen (i.e., as a single view) or may be displayed on multiple screens (i.e., as first view 1302 followed by third view 1322).

In another example, an unillustrated view of the application used to determine parameters for a gift subscription may allow the gift subscription purchaser to select a gift subscription based on a combination of a subscription length (e.g., as in the first view 1302), a subscription frequency (e.g., as in the second view 1312), and a subscription type (e.g., as in the third view 1322) so that the gift subscription purchaser may select a 6-month subscription 1306, that provides bi-weekly gift choices (e.g., the bi-weekly subscription 1318), and that is a deluxe subscription 1328. In an embodiment, the application used to determine parameters for a gift subscription displays the total cost of this gift subscription. Such an unillustrated view of the application used to determine parameters for a gift subscription may be displayed on a single screen (i.e., as a single view) or may be displayed on multiple screens (i.e., as first view 1302 followed by second view 1312 and then followed by third view 1322).

In an embodiment, a view of the application used to determine parameters for a gift subscription can display a plurality of price options for gift subscriptions that the gift subscription purchaser can select from. The application used to determine parameters for a gift subscription may then provide a variety of subscription options of different subscription lengths, subscription frequencies, and/or subscription types that conform to the selected price option. For example, a selected price option may allow the gift subscription purchaser to select from any combination of 3-month or 6-month subscriptions, that are monthly or bi-weekly, provided that the gift subscription is intermediate. In such an example, the application used to determine parameters for a gift subscription may then presented truncated views of the first view 1302 and the second view 1312 where the 1-year subscription 1308 option and the quarterly option 1314 are not displayed or not selectable.

Figure 14:
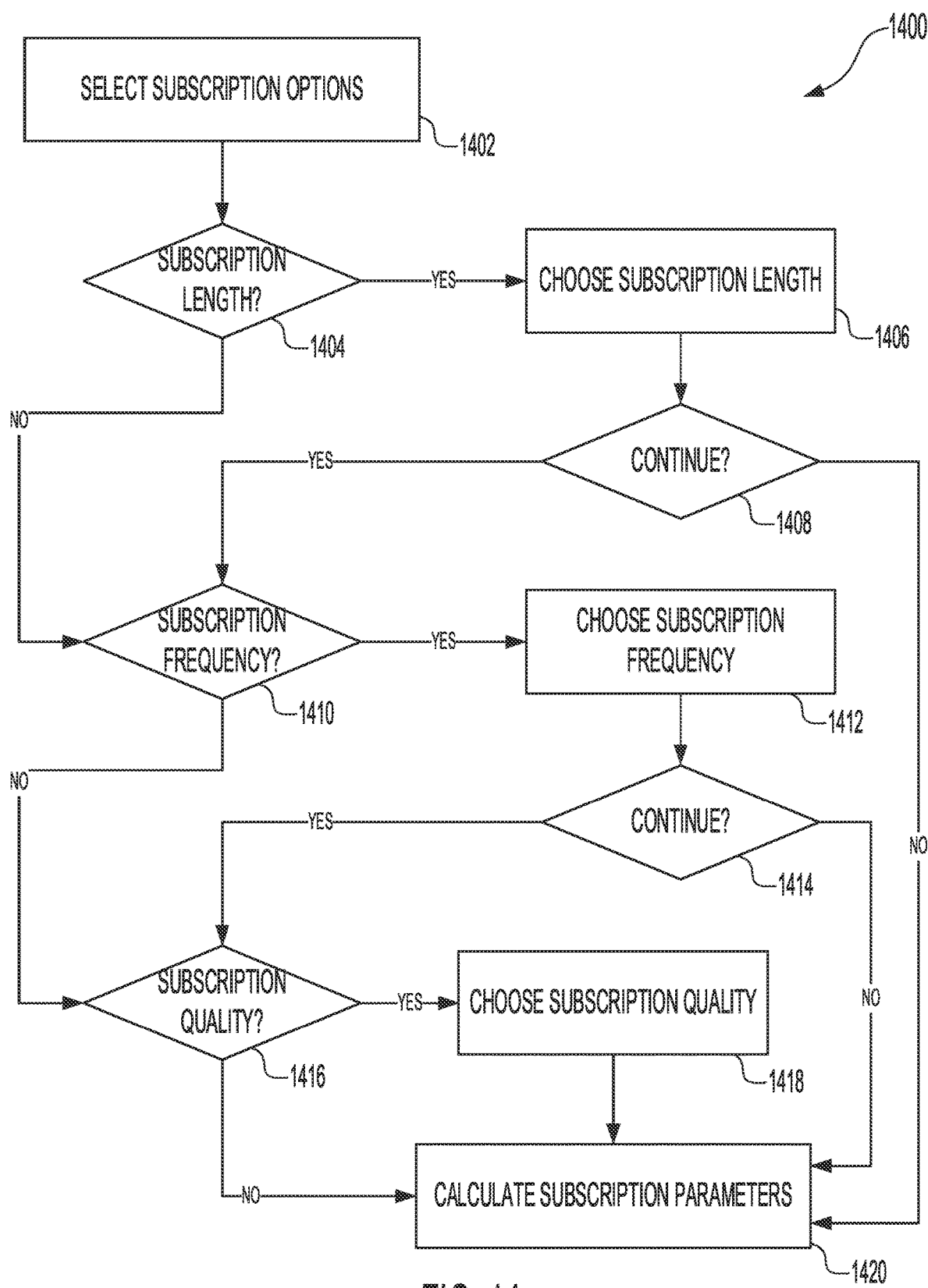
FIG. 14 shows an illustrative example of a process for determining gift subscription parameters for a predictive gift subscription in accordance with at least one embodiment.

FIG. 14 shows an illustrative example of a process 1400 for determining gift subscription parameters for a predictive gift subscription in accordance with at least one embodiment. A service such as the gift subscription service 110 described herein at least in connection with FIG. 1 may perform the example process 1400 illustrated in FIG. 14.

At step 1402, the gift subscription service provides an application and/or a web service that allows a gift purchaser and/or a gift recipient to select one or more subscription options as described herein. At step 1404, the gift subscription service determines if the gift purchaser and/or the gift recipient has selected a subscription length using the application and/or web service.

If at step 1404 the gift subscription service determines that the gift purchaser and/or the gift recipient has not selected subscription length using the application and/or web service, the gift subscription service goes to step 1410 to determine whether the gift purchaser and/or the gift recipient has selected a subscription frequency using the application and/or web service. Step 1410 is described below.

If at step 1404 the gift subscription service determines that the gift purchaser and/or the gift recipient has selected a subscription length using the application and/or web service, the gift subscription service goes to step 1406 to allow the gift purchaser and/or the gift recipient to specify the subscription length using the application and/or web service. The gift subscription service then proceeds to step 1408, where the gift subscription service determines whether the gift purchaser and/or the gift recipient wants to continue using the application and/or web service to determine gift subscription parameters for a predictive gift subscription.

If at step 1408 the gift subscription service determines that the gift purchaser and/or the gift recipient does not want to continue using the application and/or web service to determine gift subscription parameters for a predictive gift subscription, the gift subscription service goes to step 1420 to calculate the subscription parameters using at least the subscription length specified in step 1406. Step 1420 is described below.

If at step 1408 the gift subscription service determines that the gift purchaser and/or the gift recipient does want to continue using the application and/or web service to determine gift subscription parameters for a predictive gift subscription, the gift subscription service goes to step 1410 to determine whether the gift purchaser and/or the gift recipient wants to specify a subscription frequency for the predictive gift subscription using the application and/or web service. Regardless if the process 1400 gets to step 1410 from step 1404 or from step 1408 (i.e., that the gift purchaser and/or the gift recipient has not specified a subscription length or has specified a subscription length), at step 1410, the gift purchaser and/or the gift recipient can elect to specify the subscription frequency instead of the subscription length (via step 1404) or in addition to the subscription length (via step 1408).

If at step 1410 the gift subscription service determines that the gift purchaser and/or the gift recipient does not want to specify a subscription frequency using the application and/or web service, the gift subscription service goes to step 1416 to determine whether the gift purchaser and/or the gift recipient wants to specify a subscription frequency for the predictive gift subscription using the application and/or web service. Step 1416 is described below.

If at step 1410 the gift subscription service determines that the gift purchaser and/or the gift recipient does want to specify a subscription frequency using the application and/or web service, the gift subscription service goes to step 1412 to allow the gift purchaser and/or the gift recipient to specify the subscription frequency for the predictive gift subscription using the application and/or web service. Next, at step 1414, the gift subscription service determines whether the gift purchaser and/or the gift recipient wants to continue using the application and/or web service to determine gift subscription parameters for a predictive gift subscription.

If at step 1414 the gift subscription service determines that the gift purchaser and/or the gift recipient does not want to continue using the application and/or web service to determine gift subscription parameters for a predictive gift subscription, the gift subscription service goes to step 1420 to calculate the subscription parameters using at least the subscription length specified in step 1406 and/or the subscription frequency specified in step 1412. Step 1420 is described below.

If at step 1414 the gift subscription service determines that the gift purchaser and/or the gift recipient does want to continue using the application and/or web service to determine gift subscription parameters for a predictive gift subscription, the gift subscription service goes to step 1416 to determine whether the gift purchaser and/or the gift recipient wants to specify a subscription quality for the predictive gift subscription using the application and/or web service. Regardless if the process 1400 gets to step 1416 from step 1410 or from step 1414 (i.e., that the gift purchaser and/or the gift recipient has not specified a subscription frequency or has specified a subscription frequency), at step 1416, the gift purchaser and/or the gift recipient can elect to specify the subscription frequency or in addition to or instead of the subscription length and/or subscription frequency that may have been previously specified.

If at step 1416 the gift subscription service determines that the gift purchaser and/or the gift recipient does not want to specify a subscription quality for the predictive gift subscription using the application and/or web service, the gift subscription service goes to step 1420 to calculate the subscription parameters using the subscription length and/or subscription frequency that may have been previously specified in step 1406 and/or step 1412. Step 1420 is described below.

If at step 1416 the gift subscription service determines that the gift purchaser and/or the gift recipient does want to specify a subscription quality for the predictive gift subscription using the application and/or web service, the gift subscription service goes to step 1418 to allow the gift purchaser and/or the gift recipient to specify the subscription frequency for the predictive gift subscription using the application and/or web service.

Finally, at step 1420, the gift subscription service calculates the subscription parameters using the subscription length and/or subscription frequency that may have been previously specified in step 1406 and/or step 1412 as well as the subscription quality that may have been specified in step 1418. Regardless if the process 1400 gets to step 1420 from step 1408, from step 1414, from step 1416, or from step 1418, at step 1420, the gift subscription services uses the specified values to calculate gift subscription parameters for a predictive gift subscription. In an embodiment, none of gift subscription length, gift subscription frequency, and gift subscription quality have been specified (e.g., "NO" selected in step 1404, step 1410, and step 1416). In such an embodiment, the gift subscription service may determine parameters for a for a predictive gift subscription based on one or more default values for the subscription length, the subscription frequency, and/or the subscription quality. As may be contemplated, the gift subscription service may use other such factors to determine the parameters for a for a predictive gift subscription. Although not illustrated, in an embodiment, the example process 1400 illustrated in FIG. 14 will restart at step 1402 to again begin determining gift subscription parameters for a predictive gift subscription.

In an embodiment not illustrated in FIG. 14, the gift subscription purchaser can select a gift subscription value (e.g., two-hundred dollars) and the gift subscription service determines parameters for subscription length, subscription frequency, and subscription quality. For example, a gift subscription value of two-hundred dollars may result in a five-month subscription of monthly gifts with a quality based on a forty-dollar value per gift. In another example, a gift subscription value of two-hundred dollars may result in a twenty-month subscription of bi-monthly gifts with a quality based on a twenty-dollar value per gift. In another example, a gift subscription value of two-hundred dollars may result in a year-long subscription with a fifty-dollar gift on the recipient's birthday, another fifty-dollar gift around the winter holidays, and five twenty-dollar gifts at other times of the year.

Figure 15:
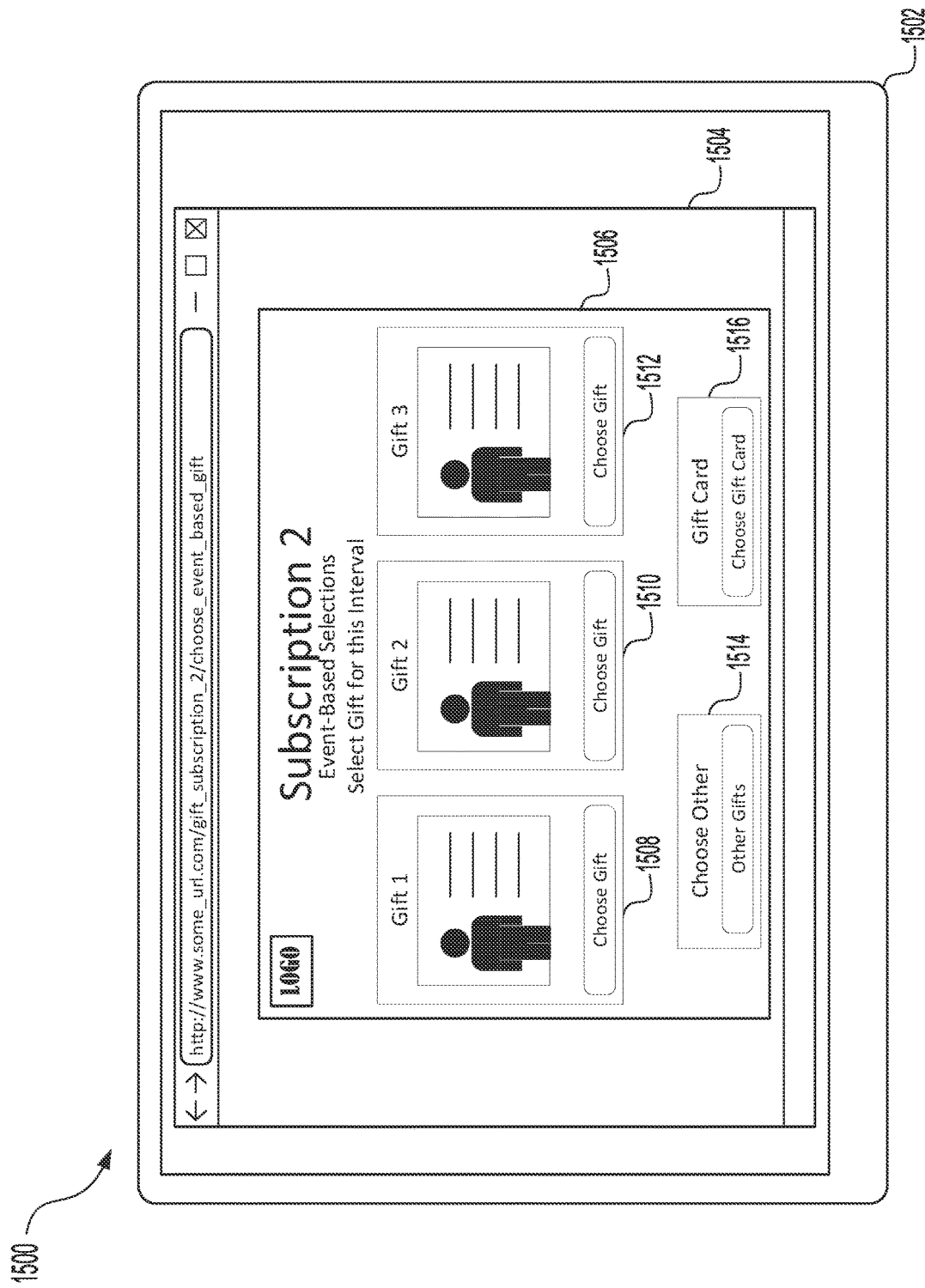
FIG. 15 shows an illustrative example of an environment in which event-based gift choices for a predictive gift subscription are presented in accordance with at least one embodiment.

FIG. 15 shows an illustrative example of an environment 1500 in which event-based gift choices for a predictive gift subscription are presented in accordance with at least one embodiment. As used herein, an event-based gift subscription is a gift subscription where the intervals for the gift subscription are determined by events that occur over the course of a time period. As an example, an event-based gift subscription may be offered for a college freshman that includes events (e.g., intervals) for moving in, mid-term exams, final exams, spring break, and moving out. Other events may also be added to such an event-based gift subscription such as, for example, the gift subscription recipient's birthday, Thanksgiving Day, Christmas Day, or Valentine's Day.

In an embodiment, a computing device 1502 is used to display an application 1504. In an embodiment, a gift recipient interacts with systems of the gift subscription service via the computing device 1502, via a network interface associated with the computing device 1502, and using the application 1504 and user interface elements to convey information obtained from systems of the gift subscription service, to obtain information from the gift recipient, and to provide the obtained information to systems of the gift subscription service. As described herein, the computing device 1502 may be a desktop computer, a laptop computer, a tablet computer, a smart phone, a wearable device (e.g., a smart watch or smart glasses), a virtual reality device, an augmented reality device, or some other such device.

In an embodiment, user interface elements of the application 1504 are used to display a gift choice window 1506 that displays gift choices. As an example, the gift choice 1508 may include details about a first gift for the current event-based gift interval such as, for example, moving to the freshman dorm. In an embodiment, the gift choice option 1508 includes a button to choose that gift choice option and which allows the gift recipient to choose that gift for the current gift interval. As described herein, the gift subscription options may be curated by a gift subscription curator such as the gift subscription curator 112 described herein at least in connection with FIG. 1. In an embodiment, the gift choice window 1506 is displayed as a result of the gift recipient selecting an event-based gift subscription option (e.g., for the first interval). In an embodiment, the gift choice window 1506 is displayed when the next interval for presenting a set of gift choices arrives (e.g., at mid-term exams).

The gift choice window 1506 may also include additional gift subscription options for the current gift interval (e.g., gift choice option 1510 and gift choice option 1512) that may include descriptions of additional gift choices selectable by the gift subscription recipient at the current gift interval. In an embodiment, the gift choice options (e.g., the gift choice option 1510 and the gift choice option 1512) also include buttons to choose the associated gift choice option. In an embodiment, the gift choice window 1506 includes one or more user interface elements that allow the gift recipient to select alternatives to the gift choices as described herein. For example, the gift recipient may select a gift card, select no gift, select an option to convert the value of the gift into cryptocurrency or other form of currency, select an option to re-gift a particular gift to another recipient, or may select a future value. In the example environment 1500 illustrated in FIG. 15, the gift choice window 1506 includes user interface elements to allow the gift recipient to select from other gifts 1514 or to receive a gift card 1516. User interface elements to allow the gift recipient to choose no gift or to receive a future value, as described herein.

Figure 16:
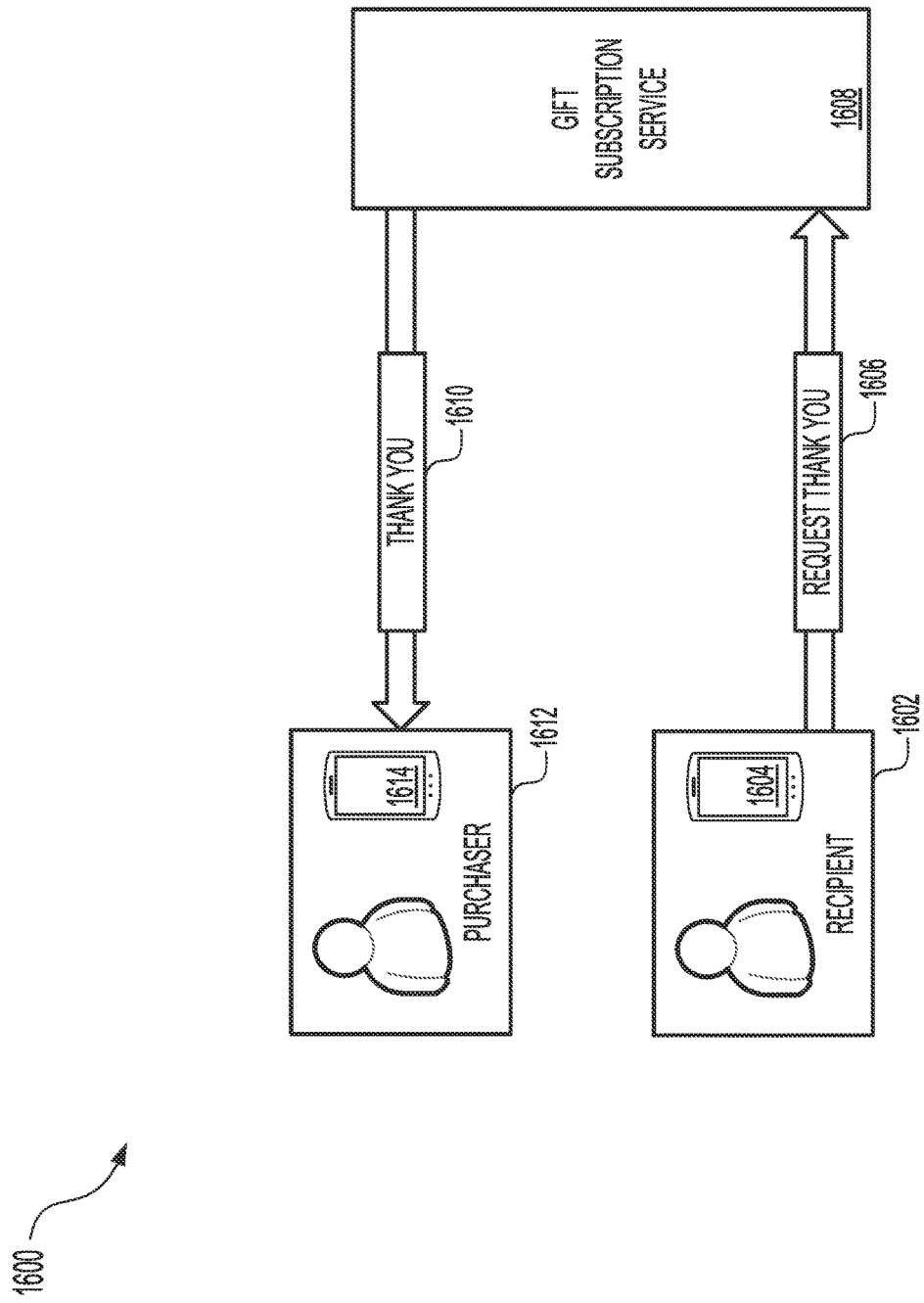
FIG. 16 shows an illustrative example of an environment in which responses to a received gift of a predictive gift subscriptions are provided in accordance with at least one embodiment.

FIG. 16 shows an illustrative example of an environment 1600 in which responses to a received gift of a predictive gift subscriptions are provided in accordance with at least one embodiment. As described herein at least in connection with FIG. 1, when a gift subscription service (e.g., the gift subscription service 1608) receives a gift selection from the recipient 1602, the gift subscription service may begin a process to provide the gift to the recipient. In an embodiment, the gift is a gift selected from the gift choices, or an alternate gift, or a gift card, or a future value, or no gift selection for the interval. In an embodiment, the gift subscription service then initiates processes to send the selected gift to the recipient (not illustrated here). In an embodiment, the processes to send the gift to the recipient include processes to send a message to a gift fulfillment service (e.g., the gift fulfillment service 124, described herein at least in connection with FIG. 1) which may then initiate the processes to deliver the gift to the recipient 1602.

When the recipient 1602 receives the gift, the recipient 1602 may then initiate a process to thank the purchaser 1612. In an embodiment, when the gift recipient 1602 receives the gift (e.g., a gift selected from the gift choices, or an alternate gift, or a gift card) the recipient 1602 generates a request 1606 to thank the purchaser 1612. In an embodiment, the request 1606 to thank the purchaser 1612 is communicated to the gift subscription service 1608. In an embodiment, the recipient 1602 communicates the request 1606 to thank the purchaser 1612 to the gift subscription service 1608 using a computing device 1604 and over a network such as those described herein (e.g., using a computing device such as the computing device 1802 over a network such as the network 1822 as described herein at least in connection with FIG. 18). In an embodiment, the recipient 1602 communicates the request 1606 to thank the purchaser 1612 using an application and/or website provided by the gift subscription service 1608 such as those described herein. In an embodiment, the request 1606 to thank the purchaser 1612 is based on a template for the thank you note, or an example of a thank you note, or on some other such bases for the thank you note.

In an embodiment, when the gift subscription service 1608 receives the request 1606 to thank the purchaser 1612 from the recipient 1602, the gift subscription service 1608 initiates a process to provide 1610 a thank you to the purchaser 1612. In an embodiment, the process to provide 1610 the thank you to the purchaser 1612 includes delivering an electronic thank you note to a computing device 1614 and over a network such as those described herein (e.g., using a computing device such as the computing device 1802 over a network such as the network 1822 as described herein at least in connection with FIG. 18). In an embodiment, the electronic thank you note is delivered to the computing device 1614 using an application and/or website provided by the gift subscription service 1608 such as those described herein. In an embodiment, the process to provide 1610 the thank you to the purchaser 1612 includes delivering a physical thank you note (e.g., via surface mail or some other such physical delivery service). In an embodiment, the process to provide 1610 the thank you to the purchaser 1612 includes sending an electronic mail, a social network message, a social network post, a text message, or a phone call to the to the purchaser 1612.

In an embodiment, the gift subscription service 1602 sends a reminder to the recipient 1602 to send a thank you note to the purchaser 1612 as part of the process to provide the gift to the recipient 1602 and/or after the process to provide the gift to the recipient 1602 completes (e.g., when the gift is received by the recipient 1602). In an embodiment, the reminder to the recipient 1602 to send the thank you note to the purchaser 1612 includes a template for the thank you note, or an example of a thank you note, or a reminder to send a thank you note. In an embodiment, the recipient 1602 can add a gift to the gift purchaser 1612 that may be provided with the thank you note including, but not limited to gifts and/or gift subscriptions such as those described herein. In an embodiment, the template for the thank you note can include suggestions about what to include in the thank you note. For example, a subscription for baby clothes may include a suggestion to include a picture of the baby wearing the received clothing. Similarly, the reminder to the recipient 1602 to send the thank you note to the purchaser 1612 may include a suggested time to send the note so that, for example, if a recipient is receiving baby clothes that are three-months advanced (e.g., a six-month size at three months), the reminder to the recipient 1602 to send the thank you note to the purchaser 1612 may include a reminder to send the thank you note at six months.

Figure 17:
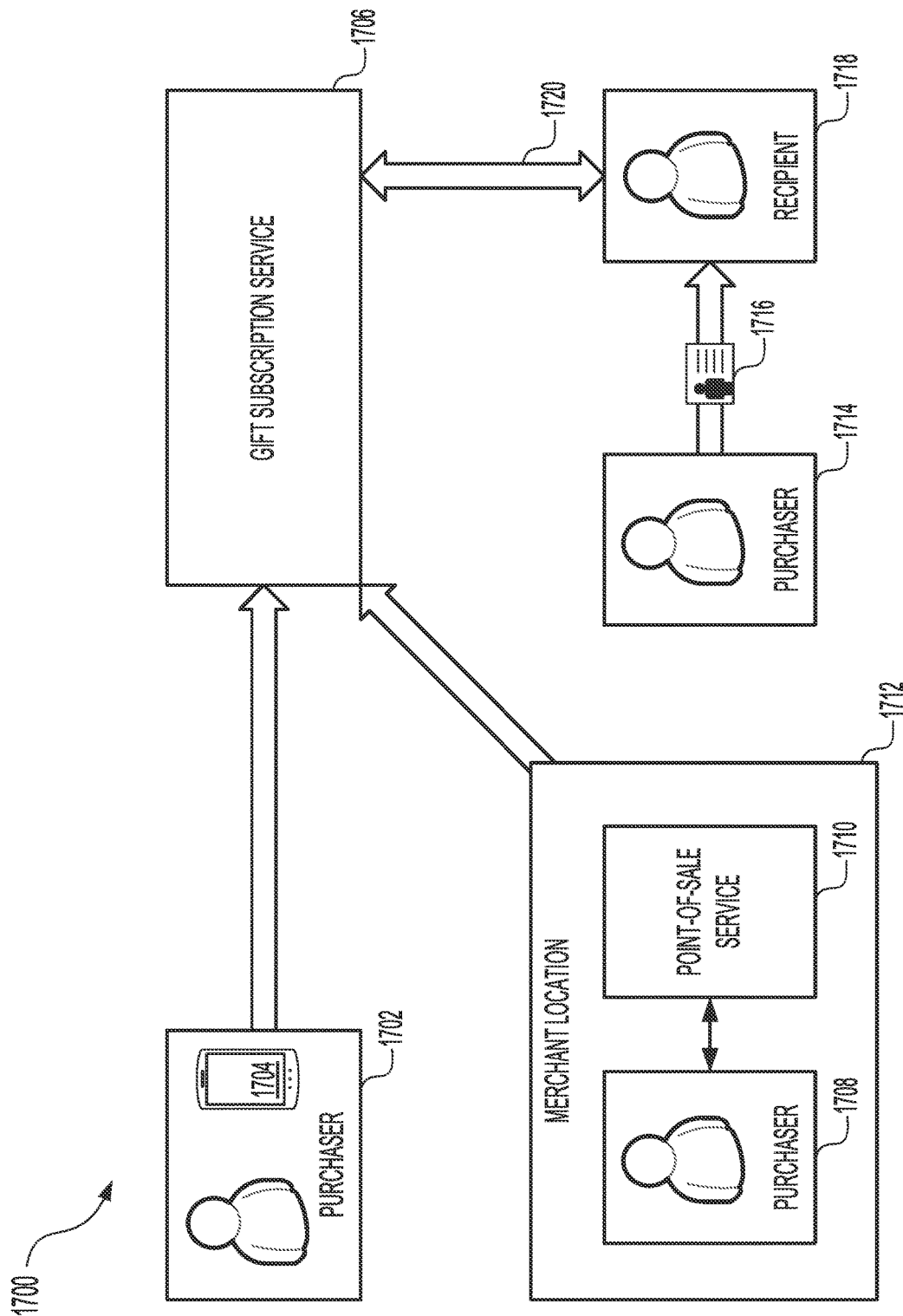
FIG. 17 shows an illustrative example of an environment in which options for initiating a predictive gift subscription are presented in accordance with at least one embodiment.

FIG. 17 shows an illustrative example of an environment 1700 in which options for initiating a predictive gift subscription are presented in accordance with at least one embodiment. In an embodiment, a purchaser 1702 initiates the process to send a gift subscription to a recipient (e.g., submits a gift subscription request to a gift subscription service 1706) using an application executing on a computing device 1704 and over a network such as those described herein (e.g., using a computing device such as the computing device 1802 over a network such as the network 1822 as described herein at least in connection with FIG. 18) using systems and methods such as those described herein. In an embodiment, a purchaser 1702 initiates the process to send a gift subscription to a recipient using a website to access a web service provided by the gift subscription service 1706, over a network such as the network 1822, and using systems and methods such as those described herein.

In an embodiment, a purchaser 1708 initiates the process to send a gift subscription to a recipient (e.g., submits a gift subscription request to a gift subscription service 1706) using an application executing using a point-of-sale service 1710 at a merchant location 1712. In an embodiment, the point-of-sale service 1710 is a kiosk located at the merchant location 1712. In an embodiment, the point-of-sale service 1710 is implemented using an application executing on a computing device at the merchant location 1712 (e.g., the merchant computing device 1836 described herein at least in connection with FIG. 18). In an embodiment, the application communicates the gift subscription request to the gift subscription service 1706 over a network such as those described herein. In an embodiment, a purchaser 1708 initiates the process to send a gift subscription to a recipient using a website hosted on the point-of-sale service 1710 and/or hosted on the computing device at the merchant location 1712. In an embodiment, the web service is used to access a web service provided by the gift subscription service 1706, over a network such as the network 1822, and using systems and methods such as those described herein.

In an embodiment, the purchaser 1714 purchases a physical gift card 1716 and provides the physical gift card 1716 to the recipient 1718. The recipient 1718 may then use the physical gift card to initiate 1720 the gift subscription (e.g., submit a gift subscription request to a gift subscription service 1706) using the systems and methods such as those described herein.

FIG. 18 illustrates a computing system architecture 1800, including various components in electrical communication with each other, in accordance with some embodiments. The example computing system architecture 1800 illustrated in FIG. 18 includes a computing device 1802, which has various components in electrical communication with each other using a connection 1806, such as a bus, in accordance with some implementations. The example computing system architecture 1800 includes a processing unit 1804 that is in electrical communication with various system components, using the connection 1806, and including the system memory 1814. In some embodiments, the system memory 1814 includes read-only memory (ROM), random-access memory (RAM), and other such memory technologies including, but not limited to, those described herein. In some embodiments, the example computing system architecture 1800 includes a cache 1808 of high-speed memory connected directly with, in close proximity to, or integrated as part of the processor 1804. The system architecture 1800 can copy data from the memory 1814 and/or the storage device 1810 to the cache 1808 for quick access by the processor 1804. In this way, the cache 1808 can provide a performance boost that decreases or eliminates processor delays in the processor 1804 due to waiting for data. Using modules, methods and services such as those described herein, the processor 1804 can be configured to perform various actions. In some embodiments, the cache 1808 may include multiple types of cache including, for example, level one (L1) and level two (L2) cache. The memory 1814 may be referred to herein as system memory or computer system memory. The memory 1814 may include, at various times, elements of an operating system, one or more applications, data associated with the operating system or the one or more applications, or other such data associated with the computing device 1802.

Other system memory 1814 can be available for use as well. The memory 1814 can include multiple different types of memory with different performance characteristics. The processor 1804 can include any general purpose processor and one or more hardware or software services, such as service 1812 stored in storage device 1810, configured to control the processor 1804 as well as a special-purpose processor where software instructions are incorporated into the actual processor design. The processor 1804 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1804 can be a microprocessor, a microcontroller, a digital signal processor ("DSP"), or a combination of these and/or other types of processors. In some embodiments, the processor 1804 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1800, an input device 1816 can represent any number of input mechanisms, such as a microphone for speech, a touch-sensitive screen for gesture or graphical input, keyboard, mouse, motion input, pen, and other such input devices. An output device 1818 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1800. In some embodiments, the input device 1816 and/or the output device 1818 can be coupled to the computing device 1802 using a remote connection device such as, for example, a communication interface such as the network interface 1820 described herein. In such embodiments, the communication interface can govern and manage the input and output received from the attached input device 1816 and/or output device 1818. As may be contemplated, there is no restriction on operating on any particular hardware arrangement and accordingly the basic features here may easily be substituted for other hardware, software, or firmware arrangements as they are developed.

In some embodiments, the storage device 1810 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 1810 can include hardware and/or software services such as service 1812 that can control or configure the processor 1804 to perform one or more functions including, but not limited to, the methods, processes, functions, systems, and services described herein in various embodiments. In some embodiments, the hardware or software services can be implemented as modules. As illustrated in example computing system architecture 1800, the storage device 1810 can be connected to other parts of the computing device 1802 using the system connection 1806. In an embodiment, a hardware service or hardware module such as service 1812, that performs a function can include a software component stored in a non-transitory computer-readable medium that, in connection with the necessary hardware components, such as the processor 1804, connection 1806, cache 1808, storage device 1810, memory 1814, input device 1816, output device 1818, and so forth, can carry out the functions such as those described herein.

The disclosed gift subscription service and the associated systems and methods for predictive gift subscriptions can be performed using a computing system such as the example computing system illustrated in FIG. 18, using one or more components of the example computing system architecture 1800. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems generating predictive gift subscriptions described herein by, for example, executing code using a processor such as processor 1804 wherein the code is stored in memory such as memory 1814 as described herein. One or more of a user device, a provider server or system, a database system, or other such devices, services, or systems may include some or all of the components of the computing system such as the example computing system illustrated in FIG. 18, using one or more components of the example computing system architecture 1800 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1828. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1804 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1814 can be coupled to the processor 1804 by, for example, a connector such as connector 1806, or a bus. As used herein, a connector or bus such as connector 1806 is a communications system that transfers data between components within the computing device 1802 and may, in some embodiments, be used to transfer data between computing devices. The connector 1806 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1814 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1814 can also include magnetic or optical data storage media including read-only (e.g., CD ROM and DVD ROM) or otherwise (e.g., CD or DVD). The memory can be local, remote, or distributed.

As described herein, the connector 1806 (or bus) can also couple the processor 1804 to the storage device 1810, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1810. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1806 can also couple the processor 1804 to a network interface device such as the network interface 1820. The interface can include one or more of a modem or other such network interfaces including, but not limited to those described herein. It will be appreciated that the network interface 1820 may be considered to be part of the computing device 1802 or may be separate from the computing device 1802. The network interface 1820 can include one or more of an analog modem, Integrated Services Digital Network (ISDN) modem, cable modem, token ring interface, satellite transmission interface, or other interfaces for coupling a computer system to other computer systems. In some embodiments, the network interface 1820 can include one or more input and/or output (I/O) devices. The I/O devices can include, by way of example but not limitation, input devices such as input device 1816 and/or output devices such as output device 1818. For example, the network interface 1820 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1802 can be connected to one or more additional computing devices such as computing device 1824 via a network 1822 using a connection such as the network interface 1820. In such embodiments, the computing device 1824 may execute one or more services 1826 to perform one or more functions under the control of, or on behalf of, programs and/or services operating on computing device 1802. In some embodiments, a computing device such as computing device 1824 may include one or more of the types of components as described in connection with computing device 1802 including, but not limited to, a processor such as processor 1804, a connection such as connection 1806, a cache such as cache 1808, a storage device such as storage device 1810, memory such as memory 1814, an input device such as input device 1816, and an output device such as output device 1818. In such embodiments, the computing device 1824 can carry out the functions such as those described herein in connection with computing device 1802. In some embodiments, the computing device 1802 can be connected to a plurality of computing devices such as computing device 1824, each of which may also be connected to a plurality of computing devices such as computing device 1824. Such an embodiment may be referred to herein as a distributed computing environment.

The network 1822 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1822 can be wired connections, wireless connections, or combinations thereof. Communications via the network 1822 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1822, within the computing device 1802, within the computing device 1824, or within the computing resources provider 1828 can include information, which also may be referred to herein as content. The information may include text, graphics, audio, video, haptics, and/or any other information that can be provided to a user of the computing device such as the computing device 1802. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1802 and presented to a user of the computing device 1802 using forms that are perceptible via sight, sound, smell, taste, touch, or other such mechanisms. In some embodiments, communications over the network 1822 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1802 and/or the computing device 1824 can be connected to a computing resources provider 1828 via the network 1822 using a network interface such as those described herein (e.g. network interface 1820). In such embodiments, one or more systems (e.g., service 1830 and service 1832) hosted within the computing resources provider 1828 (also referred to herein as within "a computing resources provider environment") may execute one or more services to perform one or more functions under the control of, or on behalf of, programs and/or services operating on computing device 1802 and/or computing device 1824. Systems such as service 1830 and service 1832 may include one or more computing devices such as those described herein to execute computer code to perform the one or more functions under the control of, or on behalf of, programs and/or services operating on computing device 1802 and/or computing device 1824.

For example, the computing resources provider 1828 may provide a service, operating on service 1830 to store data for the computing device 1802 when, for example, the amount of data that the computing device 1802 exceeds the capacity of storage device 1810. In another example, the computing resources provider 1828 may provide a service to first instantiate a virtual machine (VM) on service 1832, use that VM to access the data stored on service 1832, perform one or more operations on that data, and provide a result of those one or more operations to the computing device 1802. Such operations (e.g., data storage and VM instantiation) may be referred to herein as operating "in the cloud," "within a cloud computing environment," or "within a hosted virtual machine environment," and the computing resources provider 1828 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1828 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 1830 and service 1832 may implement versions of various services (e.g., the service 1812 or the service 1826) on behalf of, or under the control of, computing device 1802 and/or computing device 1824. Such implemented versions of various services may involve one or more virtualization techniques so that, for example, it may appear to a user of computing device 1802 that the service 1812 is executing on the computing device 1802 when the service is executing on, for example, service 1830. As may also be contemplated, the various services operating within the computing resources provider 1828 environment may be distributed among various systems within the environment as well as partially distributed onto computing device 1824 and/or computing device 1802.

In an embodiment, the computing device 1802 can be connected to one or more additional computing devices and/or services such as merchant computing device 1836 and/or a point-of-sale service 1834 via the network 1822 and using a connection such as the network interface 1820. In an embodiment, the point-of-sale service 1834 is separate from the merchant computing device 1836. In an embodiment, the point-of-sale service 1834 is executing on the merchant computing device 1836. In an embodiment, the point-of-sale service 1834 is executing as one or more services (e.g., the service 1830 and/or the service 1832) operating within the environment of the computing resources provider. As used herein, a point-of-sale service 1834 is a service used by one or more merchants to manage sales transactions for customers, to process payment transactions for customers (e.g., credit card transactions), to manage inventory for merchants, to identify customers based on, for example, customer loyalty programs, and other such tasks.

In an embodiment, a customer and/or a merchant uses the merchant computing device 1836 to interact with the point-of-sale service 1834. In an embodiment, the merchant computing device 1836 is a dedicated point-of-service (POS) terminal. In an embodiment, the merchant computing device 1836 is a cash register system. In an embodiment, the merchant computing device 1836 is an application or web service operating on a computing device such as the computing device 1802 described herein. In such an embodiment, the application or web service may be provided by a financial services system (e.g., a bank, a transaction processing system, an inventory management system, or some other such financial services system). In an embodiment, the merchant computing device 1836 includes an auxiliary device or system to execute tasks associated with the point-of-sale service 1834 (e.g., a credit card processing device attached to a smart phone or tablet). In an embodiment, the merchant computing device 1836 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor. In an embodiment, the merchant computing device 1836 is a virtual device (e.g., a virtual kiosk) such as the virtual devices described herein. Although not illustrated here, in an embodiment, the merchant computing device 1836 may be one of a plurality of devices that may be interconnected using a network such as the network 1822.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 1802) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the process 300 for generating recommendations for a predictive gift subscription illustrated in FIG. 3). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1802.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set $\{A, B, C\}$, namely: $\{A\}$, $\{B\}$, $\{C\}$, $\{A, B\}$, $\{A, C\}$, $\{B, C\}$, or $\{A, B, C\}$) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method, comprising:
   receiving a request to generate a predictive gift subscription, wherein the predictive gift subscription allows for predictions corresponding to different gift choices presentable at different time intervals during the predictive gift subscription, and wherein the request includes initial recipient information corresponding to a recipient;
   processing the initial recipient information to dynamically generate a recipient computational model corresponding to the recipient, wherein the recipient computational model includes an initial set of parameters corresponding to the initial recipient information;
   executing the recipient computational model to generate a prediction associated with the predictive gift subscription, wherein the prediction indicates an initial set of gift choices presentable to the recipient and an initial time interval for presenting the initial set of gift choices;
   updating an application interface to present a set of user interface elements corresponding to the initial set of gift choices, wherein the application interface is implemented on a recipient computing device, and wherein the application interface is updated at the initial time interval;
   receiving feedback corresponding to the prediction, wherein the feedback includes a selection corresponding to the initial set of gift choices provided at the initial time interval;
   updating the recipient computational model based on the feedback and other selections corresponding to other sets of gift choices presented to other recipients as the feedback and the other selections are received, wherein the recipient computational model is updated by updating the initial set of parameters;
   executing the updated computational model to generate a new prediction associated with the predictive gift subscription, wherein the new prediction indicates a new set of gift choices presentable to the recipient and a new time interval for presenting the new set of gift choices.

2. The computer-implemented method of claim 1, wherein the selection corresponds to a future value request to apply a value corresponding to the initial set of gift choices to the new set of gift choices at the new time interval, and wherein the new prediction is generated by the updated computational model according to the future value request.

3. The computer-implemented method of claim 1, further comprising:
   transmitting a request to obtain additional recipient information, wherein when the request is received at the recipient, the recipient is prompted to provide the additional recipient information; and
   dynamically updating the recipient computational model based on the additional recipient information.

4. The computer-implemented method of claim 1, further comprising:
   dynamically configuring an automated bot to communicate the initial set of gift choices and the new set of gift choices, wherein the automated bot is dynamically configured according to the recipient computational model.

5. The computer-implemented method of claim 1, wherein the initial recipient information corresponds to recipient interests and demographic information associated with the recipient.

6. The computer-implemented method of claim 1, wherein the selection corresponds to a recipient request to redeem the initial set of gift choices according to a currency.

7. A system, comprising:
   one or more processors; and
   memory storing thereon instructions that, as a result of being executed by the one or more processors, cause the system to:
      receive a request to generate a predictive gift subscription, wherein the predictive gift subscription allows for predictions corresponding to different gift choices presentable at different time intervals during the predictive gift subscription, and wherein the request includes initial recipient information corresponding to a recipient;
      process the initial recipient information to dynamically generate a recipient computational model corresponding to the recipient, wherein the recipient computational model includes an initial set of parameters corresponding to the initial recipient information;
      execute the recipient computational model to generate a prediction associated with the predictive gift subscription, wherein the prediction indicates an initial set of gift choices presentable to the recipient and an initial time interval for presenting the initial set of gift choices;
      update an application interface to present a set of user interface elements corresponding to the initial set of gift choices, wherein the application interface is implemented on a recipient computing device, and wherein the application interface is updated at the initial time interval;
      receive feedback corresponding to the prediction, wherein the feedback includes a selection corresponding to the initial set of gift choices provided at the initial time interval;
      update the recipient computational model based on the feedback and other selections corresponding to other sets of gift choices presented to other recipients as the feedback and the other selections are received, wherein the recipient computational model is updated by updating the initial set of parameters; and, execute the updated computational model to generate a new prediction associated with the predictive gift subscription, wherein the new prediction indicates a new set of gift choices presentable to the recipient and a new time interval for presenting the new set of gift choices.

8. The system of claim 7, wherein the selection corresponds to a future value request to apply a value corresponding to the initial set of gift choices to the new set of gift choices at the new time interval, from and wherein the new prediction is generated by the updated computational model according to the future value request.

9. The system of claim 7, wherein the instructions further cause the system to:

transmit a request to obtain additional recipient information, wherein when the request is received at the recipient, the recipient is prompted to provide the additional recipient information; and dynamically update the recipient computational model based on the additional recipient information.

10. The system of claim 7, wherein the instructions further cause the system to:

dynamically configure an automated bot to communicate the initial set of gift choices and the new set of gift choices, wherein the automated bot is dynamically configured according to the recipient computational model.

11. The system of claim 7, wherein the initial recipient information corresponds to recipient interests and demographic information associated with the recipient.

12. The system of claim 7, wherein the selection corresponds to a recipient request to redeem the initial set of gift choices according to a currency.

13. A non-transitory, computer-readable storage medium storing thereon executable instructions that, as a result of being executed by one or more processors of a computer system, cause the computer system to:

receive a request to generate a predictive gift subscription, wherein the predictive gift subscription allows for predictions corresponding to different gift choices presentable at different time intervals during the predictive gift subscription, and wherein the request includes initial recipient information corresponding to a recipient;

process the initial recipient information to dynamically generate a recipient computational model corresponding to the recipient, wherein the recipient computational model includes an initial set of parameters corresponding to the initial recipient information;

execute the recipient computational model to generate a prediction associated with the predictive gift subscription, wherein the prediction indicates an initial set of gift choices presentable to the recipient and an initial time interval for presenting the initial set of gift choices;

update an application interface to present a set of user interface elements corresponding to the initial set of gift choices, wherein the application interface is implemented on a recipient computing device, and wherein the application interface is updated at the initial time interval;

receive feedback corresponding to the prediction, wherein the feedback includes a selection corresponding to the initial set of gift choices provided at the first initial time interval;

update the recipient computational model based on the feedback and other selections corresponding to other sets of gift choices presented to other recipients as the feedback and the other selections are received, wherein the recipient computational model is updated by updating the initial set of parameters;

execute the updated computational model to generate a new prediction associated with the predictive gift subscription, wherein the new prediction indicates a new set of gift choices presentable to the recipient and a new time interval for presenting the new set of gift choices.

14. The non-transitory, computer-readable storage medium of claim 13, wherein the selection corresponds to a future value request to apply a value corresponding to the initial set of gift choices to the new set of gift choices at the new time interval, and wherein the new prediction is generated by the updated computational model according to the future value request.

15. The non-transitory, computer-readable storage medium of claim 13, wherein the executable instructions further cause the computer system to:

transmit a request to obtain additional recipient information, wherein when the request is received at the recipient, the recipient is prompted to provide the additional recipient information; and dynamically update the recipient computational model based on the additional recipient information.

16. The non-transitory, computer-readable storage medium of claim 13, wherein the executable instructions further cause the computer system to:

dynamically configuring an automated bot to communicate the initial set of gift choices and the new set of gift choices, wherein the automated bot is dynamically configured according to the recipient computational model.

17. The non-transitory, computer-readable storage medium of claim 13, wherein the initial recipient information corresponds to recipient interests and demographic information associated with the recipient.

18. The non-transitory, computer-readable storage medium of claim 13, wherein the selection corresponds to a recipient request to redeem the initial set of gift choices according to a currency.

19. The computer-implemented method of claim 1, wherein the request includes a subscription length corresponding to the predictive gift subscription, and wherein the recipient computational model determines the initial time interval and the new time interval according to the subscription length.

20. The system of claim 7, wherein the request includes a subscription length corresponding to the predictive gift subscription, and wherein the recipient computational model determines the initial time interval and the new time interval according to the subscription length.

21. The non-transitory, computer-readable storage medium of claim 13, wherein the request includes a subscription length corresponding to the predictive gift subscription, and wherein the recipient computational model determines the initial time interval and the new time interval according to the subscription length.

* * * * *